United States Patent
Matsuzawa et al.

(10) Patent No.: US 10,571,289 B2
(45) Date of Patent: Feb. 25, 2020

(54) INFORMATION PROCESSING DEVICE, INFORMATION PROCESSING METHOD, AND PROGRAM

(71) Applicant: SONY CORPORATION, Tokyo (JP)

(72) Inventors: Sota Matsuzawa, Tokyo (JP); Takashi Ogata, Tokyo (JP); Masashi Ookubo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 136 days.

(21) Appl. No.: 15/527,396

(22) PCT Filed: Oct. 15, 2015

(86) PCT No.: PCT/JP2015/079176
§ 371 (c)(1),
(2) Date: May 17, 2017

(87) PCT Pub. No.: WO2016/111068
PCT Pub. Date: Jul. 14, 2016

(65) Prior Publication Data
US 2017/0328726 A1   Nov. 16, 2017

(30) Foreign Application Priority Data

Jan. 5, 2015 (JP) ................................ 2015-000411
Jan. 5, 2015 (JP) ................................ 2015-000413

(51) Int. Cl.
*G01C 21/34* (2006.01)
*G06F 16/29* (2019.01)
(Continued)

(52) U.S. Cl.
CPC ......... *G01C 21/3484* (2013.01); *G01C 21/26* (2013.01); *G06F 16/00* (2019.01);
(Continued)

(58) Field of Classification Search
CPC ..... G01C 21/3484; G01C 21/26; G06F 16/00; G06F 16/29; G06Q 10/06; G07C 1/10
See application file for complete search history.

(56) References Cited

U.S. PATENT DOCUMENTS

2010/0191697 A1   7/2010   Fukumoto et al.
2011/0081634 A1*  4/2011   Kurata ................... G01C 21/20
                                                                434/236
(Continued)

FOREIGN PATENT DOCUMENTS

CN   103597476 A   2/2014
CN   103905978 A   7/2014
(Continued)

OTHER PUBLICATIONS

Jun. 4, 2018, European Search Report issued for related EP Application No. 15876941.4.
(Continued)

*Primary Examiner* — Mohamed Charioui
*Assistant Examiner* — Catherine T. Rastovski
(74) *Attorney, Agent, or Firm* — Paratus Law Group, PLLC

(57) ABSTRACT

Provided is an information processing device including: an information acquisition unit configured to acquire action information of a user, and space information and time information that are associated with the action information; and a map representation processing unit configured to consider the time information when executing map representation of the action information on a basis of the space information.

16 Claims, 35 Drawing Sheets

(51) Int. Cl.
  *G09B 29/00* (2006.01)
  *G01C 21/26* (2006.01)
  *G09B 29/10* (2006.01)
  *G07C 1/10* (2006.01)
  *G06Q 10/06* (2012.01)
  *G06F 16/00* (2019.01)

(52) U.S. Cl.
  CPC ............ *G06F 16/29* (2019.01); *G06Q 10/06* (2013.01); *G07C 1/10* (2013.01); *G09B 29/00* (2013.01); *G09B 29/10* (2013.01)

(56) References Cited

U.S. PATENT DOCUMENTS

| | | | |
|---|---|---|---|
| 2013/0212168 A1* | 8/2013 | Bonasera | G06F 19/3418 709/203 |
| 2014/0101169 A1 | 4/2014 | Kurata et al. | |

FOREIGN PATENT DOCUMENTS

| | | | |
|---|---|---|---|
| EP | 2720176 | * | 4/2014 |
| EP | 2720176 A1 | | 4/2014 |
| JP | 2010-198595 | | 9/2010 |
| JP | 2011-107977 A | | 6/2011 |
| JP | 2012-230496 | | 11/2012 |
| JP | 2013-003649 | | 1/2013 |
| JP | 2013-239115 | | 11/2013 |
| JP | 2014-002036 | | 1/2014 |
| JP | 2014-191774 A | | 10/2014 |

OTHER PUBLICATIONS

Sep. 25, 2019, Chinese Office Action issued for related CN Application No. 201511009375.5.

* cited by examiner

FIG. 34
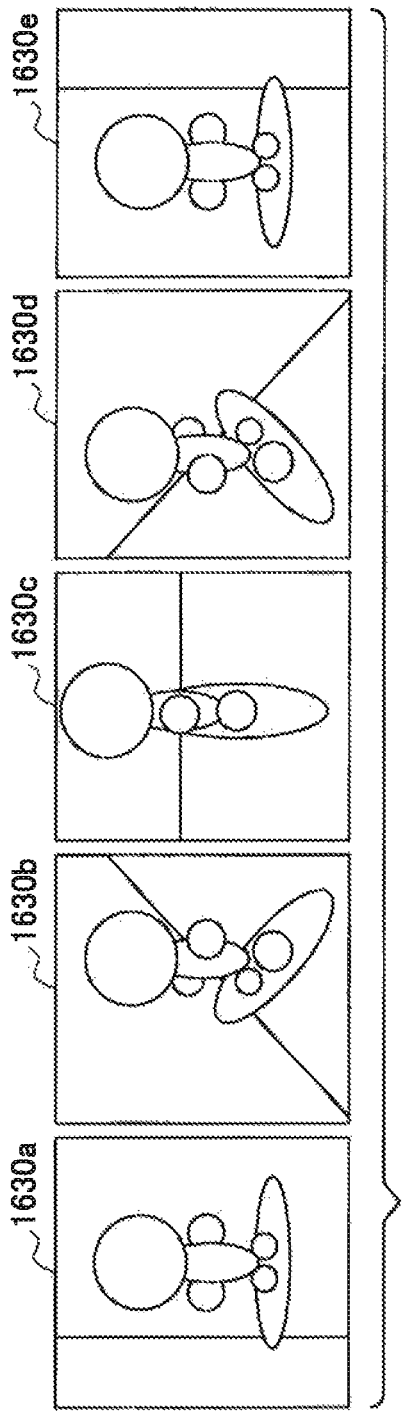
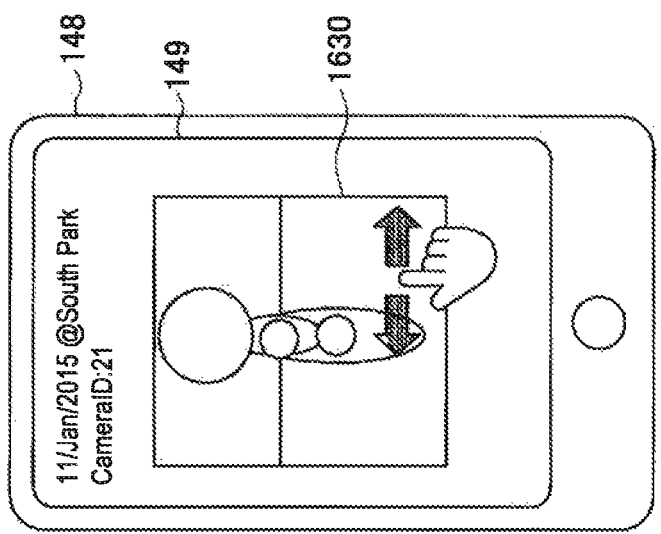

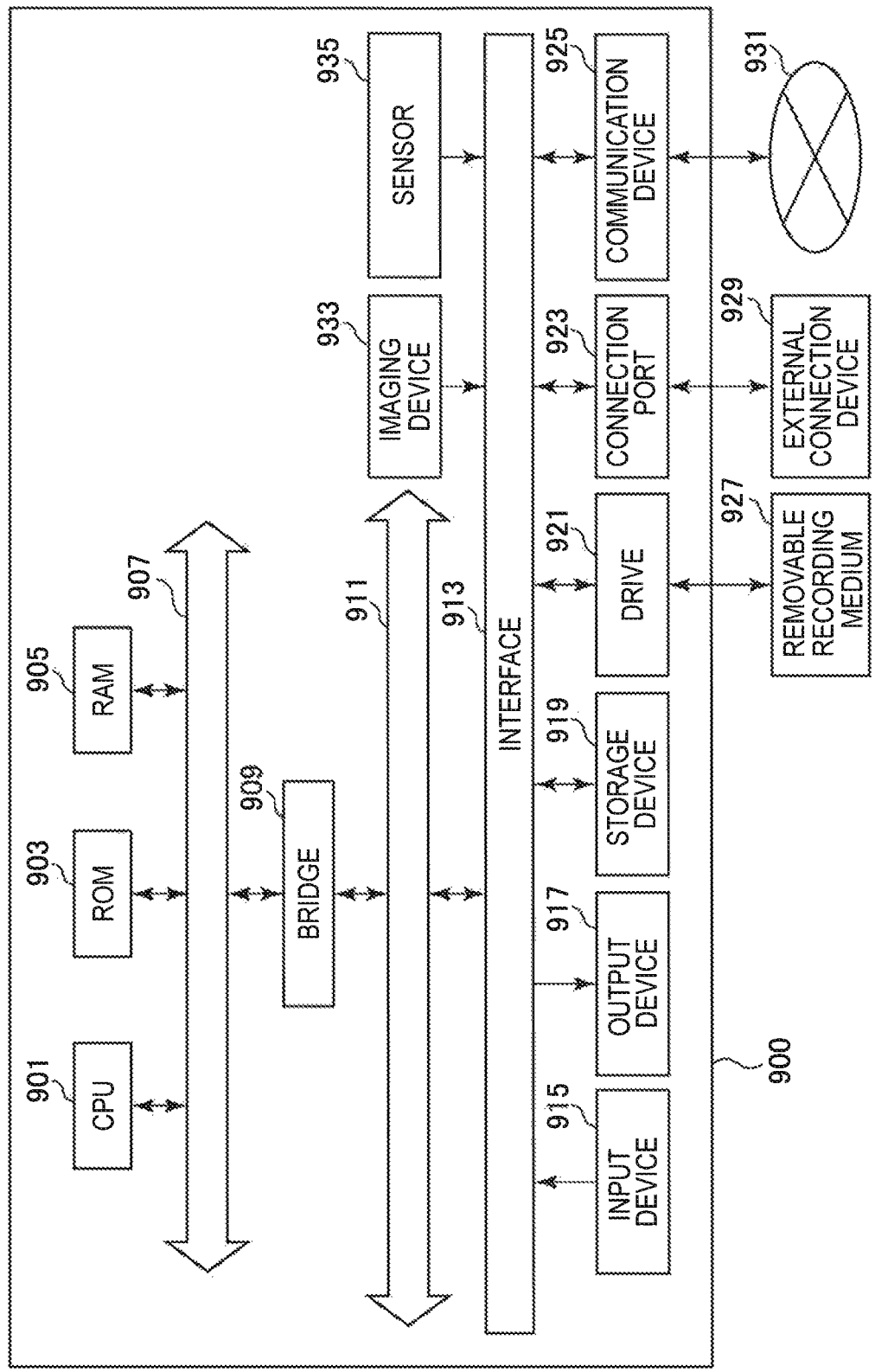

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2015/079176 (filed on Oct. 15, 2015) under 35 U.S.C. § 371, which claims priority to Japanese Patent Application Nos. 2015-000413 and 2015-000411 (both filed on Jan. 5, 2015), which are all hereby incorporated by reference in their entirety.

TECHNICAL FIELD

The present disclosure relates to an information processing device, an information processing method, and a program.

BACKGROUND ART

A variety of technologies for detecting diverse behaviors of a user on the basis of, for example, sensor data provided by sensors installed on the user have been proposed. For example, Patent Literature 1 discloses an information processing device which has a plurality of behavior determination units that are specialized in specific behaviors among behaviors of a user, which are recognized through processing of threshold values of sensor data, and generates behavior information on the basis of determination results of the respective behavior determination units.

CITATION LIST

Patent Literature

Patent Literature 1: JP2010-198595A

DISCLOSURE OF INVENTION

Technical Problem

There are many ways of utilizing a behavior (an action) of a user detected using, for example, the technology described in Patent Literature 1, without being limited to the generation of information. However, it is hard to say that there have been sufficient suggestions about the ways to utilize the behavior so far.

Thus, the present disclosure proposes a novel and improved information processing device, information processing method, and program which can bring a variety of benefits to a user on the basis of a detection result of an action of a user.

Solution to Problem

According to the present disclosure, there is provided an information processing device including: an information acquisition unit configured to acquire action information of a user, and space information and time information that are associated with the action information; and a map representation processing unit configured to consider the time information when executing map representation of the action information on a basis of the space information.

In addition, according to the present disclosure, there is provided an information processing method including: acquiring action information of a user, and space information and time information that are associated with the action information; and considering, by a processor, the time information when executing map representation of the action information on a basis of the space information.

In addition, according to the present disclosure, there is provided a program causing a computer to achieve: a function of acquiring action information of a user, and space information and time information that are associated with the action information; and a function of considering the time information when executing map representation of the action information on a basis of the space information.

Advantageous Effects of Invention

According to the present disclosure described above, it is possible to bring a variety of benefits to a user on the basis of a detection result of an action of a user.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 34 is a diagram for describing a user interface for viewing a free viewpoint video generated through the process shown in FIG. 33.

FIG. 35 is a block diagram illustrating a hardware configuration example of an information processing device according to an embodiment of the disclosure.

MODE(S) FOR CARRYING OUT THE INVENTION

Figure 1:
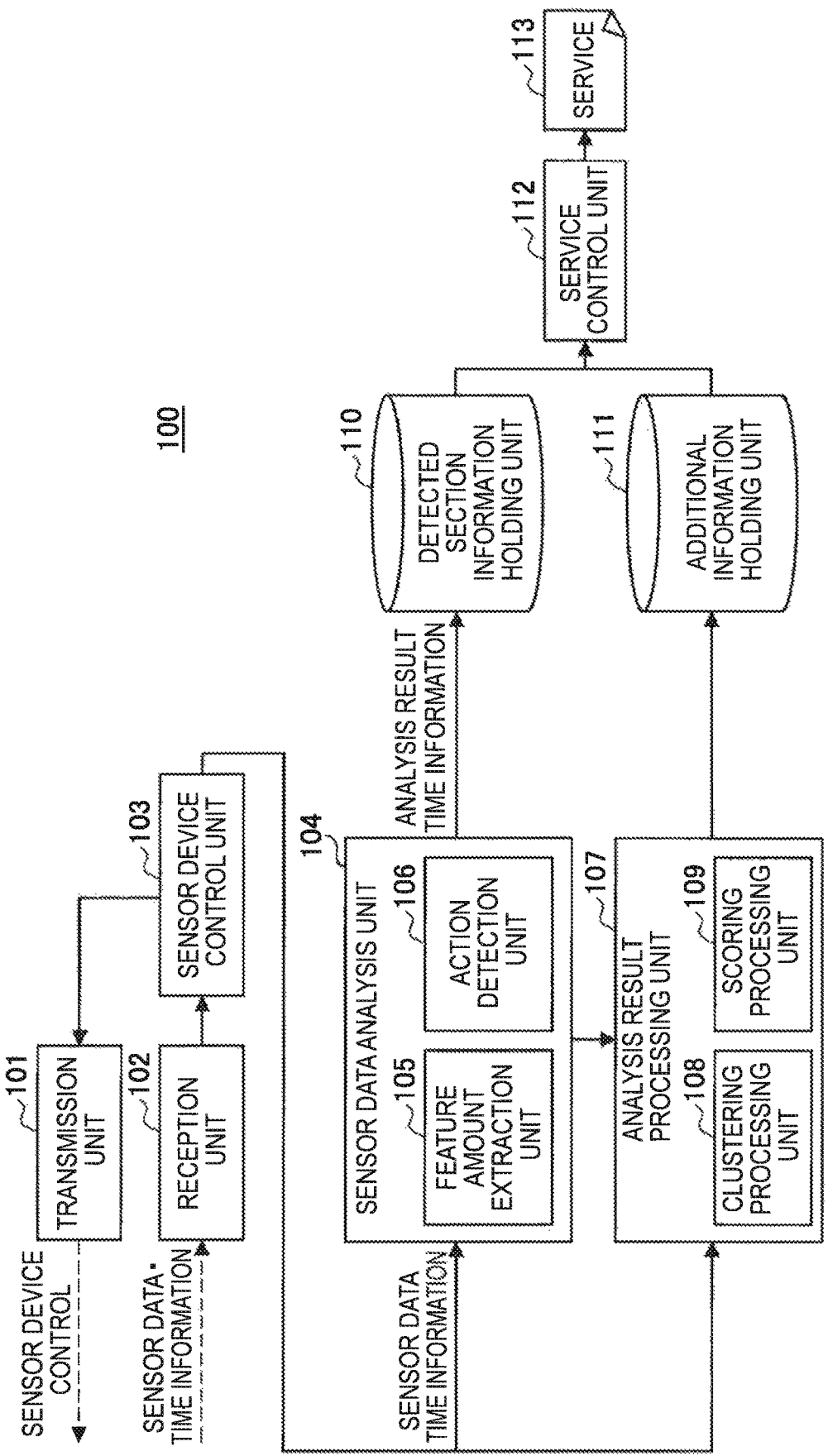
FIG. 1 is a block diagram illustrating a schematic functional configuration of an information processing device according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.

1. Functional configuration of information processing device
2. Examples of action detection process
2-1. Detection of jump-1
2-2. Detection of jump-2
2-3. Detection of turn
3. Examples of additional processes
3-1. Calculation of action score
3-2. Clustering process
3-3. Estimation of sensor mounting state
4. Examples of map representation
4-1. Example of map representation
4-2. Generation of safety map
4-3. Provision of navigation
4-4. Change of action detection setting
4-5. Calculation of level of facility
5. Hardware configuration
6. Supplement
7. Examples of apparatus control
7-1. First example
7-2. Second example
7-3. Third example
7-4. Fourth example
7-5. Fifth example
7-6. Sixth example
7-7. Regarding user profile
8. Hardware configuration
9. Supplement (1. Functional Configuration of Information Processing Device)

FIG. 1 is a block diagram illustrating a schematic functional configuration of an information processing device according to an embodiment of the present disclosure. Referring to FIG. 1, an information processing device 100 includes a transmission unit 101, a reception unit 102, a sensor device control unit 103, a sensor data analysis unit 104, an analysis result processing unit 107, a detected section information holding unit 110, an additional information holding unit ill, and a service control unit 112.

The information processing device 100 can be, for example, a single device constituting a server on a network or a set of devices as will be introduced in several specific examples to be described below. In addition, the information processing device 100 may be a terminal device that communicates with a server via a network or an independently operating terminal device. Alternatively, functions of the information processing device 100 may be realized by distributing them to a server and a terminal device that communicate with each other on a network. The information processing device 100 or hardware configurations of each of a plurality of devices that realize the information processing device 100 will be described below.

The transmission unit 101 and the reception unit 102 are realized by, for example, communication devices that communicate with a sensor device using various wired or wireless communication schemes. The sensor device includes at least one sensor mounted on a user or a piece of equipment used by the user. The transmission unit 101 transmits control signals output by the sensor device control unit 103 to the sensor device. The reception unit 102 receives sensor data and time information (a timestamp) from the sensor device, and inputs the data into the sensor device control unit 103. In the illustrated example, the reception unit 102 realizes a sensor data reception unit that receives sensor data provided by a sensor mounted on a user or a piece of equipment used by the user. Note that, for example, when the information processing device 100 is a terminal device having at least one sensor, more specifically, a mobile device or a wearable device, the sensor data reception unit may be realized by a processor such as a central processing unit (CPU) that executes a driver program for receiving sensor data from a sensor. In addition, the information processing device according to the present embodiment may have, for example, an acquisition unit that acquires sensor data from an external device having a sensor. Here, the acquisition unit is realized by, for example, a processor such as a CPU that executes "a driver program that receives sensor data from an external device having a sensor via the communication device, which realizes the transmission unit 101 and the reception unit 102, or the like." Note that, when the acquisition unit is provided, the information processing device according to the present embodiment may be configured to include no sensor data reception unit.

The sensor device control unit 103 is realized by, for example, a processor such as a CPU operating in accordance with a program stored in a memory. The sensor device control unit 103 acquires sensor data and time information from the reception unit 102. The sensor device control unit 103 provides the data to the sensor data analysis unit 104 and the analysis result processing unit 107. In addition, the sensor device control unit 103 may perform pre-processing on the data when necessary. In addition, the sensor device control unit 103 outputs control signals of the sensor device to the transmission unit 101. In a few embodiments, the sensor device control unit 103 may output the control signals on the basis of feedback on a result of a process of the sensor data analysis unit 104 or the analysis result processing unit 107.

The sensor data analysis unit 104 is realized by, for example, a processor such as a CPU operating in accordance with a program stored in a memory. The sensor data analysis unit 104 executes a variety of analyses using sensor data provided from the sensor device control unit 103. In the illustrated example, the sensor data analysis unit 104 includes a feature amount extraction unit 105 and an action detection unit 106. The feature amount extraction unit 105 extracts various feature amounts from sensor data. The action detection unit 106 detects actions of a user on the basis of the feature amounts extracted from the sensor data by the feature amount extraction unit 105. In the present embodiment, the actions of the user detected by the action detection unit 106 include turns and/or jumps of the user. Furthermore, the action detection unit 106 may detect other actions of the user including walking, running, standing still, moving in a vehicle, and the like. The action of the user can be detected in association with time information (a timestamp) indicating a section in which the action was performed (an action section). The sensor data analysis unit 104 stores analysis results, more specifically, for example, information including action sections of the user detected by the action detection unit 106 in the detected section information holding unit 110. In addition, the sensor data analysis unit 104 provides analysis results to the analysis result processing unit 107.

The analysis result processing unit 107 is realized by, for example, a processor such as a CPU operating in accordance with a program stored in a memory. The analysis result processing unit 107 generates various kinds of additional information to be used by the service control unit 112 in a later stage on the basis of an analysis result of the sensor data analysis unit 104, more specifically, information of the actions of the user detected by the action detection unit 106. In the illustrated example, the analysis result processing unit 107 includes a clustering processing unit 108 and a scoring processing unit 109. For example, when the detected action of the user includes a plurality of actions of the same type, the clustering processing unit 108 may cause the actions to be in clusters on the basis of feature amounts of the actions (which may be feature amounts extracted by the feature amount extraction unit 105 or intermediate feature amounts calculated by the action detection unit 106). In addition, in the same case, the scoring processing unit 109 may calculate scores indicating evaluation of the actions on the basis of the feature amounts. Furthermore, the clustering processing unit 108 and/or the scoring processing unit 109 may calculate new feature amounts on the basis of sensor data provided from the sensor device control unit 103. The analysis result processing unit 107 causes processing results, more specifically, the result of the clustering by the clustering processing unit 108 or information of the scores calculated by the scoring processing unit 109, to be stored in the additional information holding unit Ill together with the time information (the timestamp).

The detected section information holding unit 110 and the additional information holding unit 111 are realized by, for example, various memories or storage devices. The detected section information holding unit 110 and the additional information holding unit 111 temporarily or permanently store information provided from the sensor data analysis unit 104 and the analysis result processing unit 107 as described above. Information stored in the detected section information holding unit 110 and information stored in the additional information holding unit 111 can be associated with each other using, for example, the time information (the timestamp). In addition, the detected section information holding unit 110 and the additional information holding unit 111 may store information regarding each of a plurality of users.

The service control unit 112 is realized by, for example, a processor such as a CPU operating in accordance with a program stored in a memory. The service control unit 112 controls a service 113 using information stored in the detected section information holding unit 110 and/or the additional information holding unit 111. More specifically, the service control unit 112 generates, for example, information to be provided to a user of the service 113 on the basis of information read from the detected section information holding unit 110 and/or the additional information holding unit 111. Note that, when the information processing device 100 is a server, for example, information output by the service control unit 112 can be transmitted to a terminal device via a communication device. In addition, when the information processing device 100 is a terminal device, for example, the information output by the service control unit 112 can be provided to an output device such as a display, a speaker, or a vibrator included in the terminal device.

(2. Examples of Action Detection Process)

Examples of an action detection process executed in an embodiment of the present disclosure will be described below. In these examples, jumps and turns made when a user snowboards are detected. In a case of snowboarding, for example, a sensor device including an acceleration sensor, an angular velocity sensor, and the like may be mounted directly on a user by being embedded in his or her clothes or incorporated into a wearable terminal device or a mobile terminal device. Alternatively, the sensor device may be mounted in snowboarding goods, for example, a snowboard.

Note that an action detection process executed in the present embodiment is not limited to jumps and turns made while snowboarding, and the action detection process may be executed for, for example, jumps and turns performed in sports other than snowboarding. For example, since jumps and turns are actions that can be commonly performed in a variety of sports, jumps and turns can be detected in a detection process to be described below regardless of the type of sport. In addition, in the action detection process executed in the present embodiment, actions other than jumps and turns may be detected. For example various technologies used in the behavior recognition technology disclosed in JP2010-198595A or the like can be applied to such an action detection process.

(2-1. Detection of Jump-1)

Figure 2:
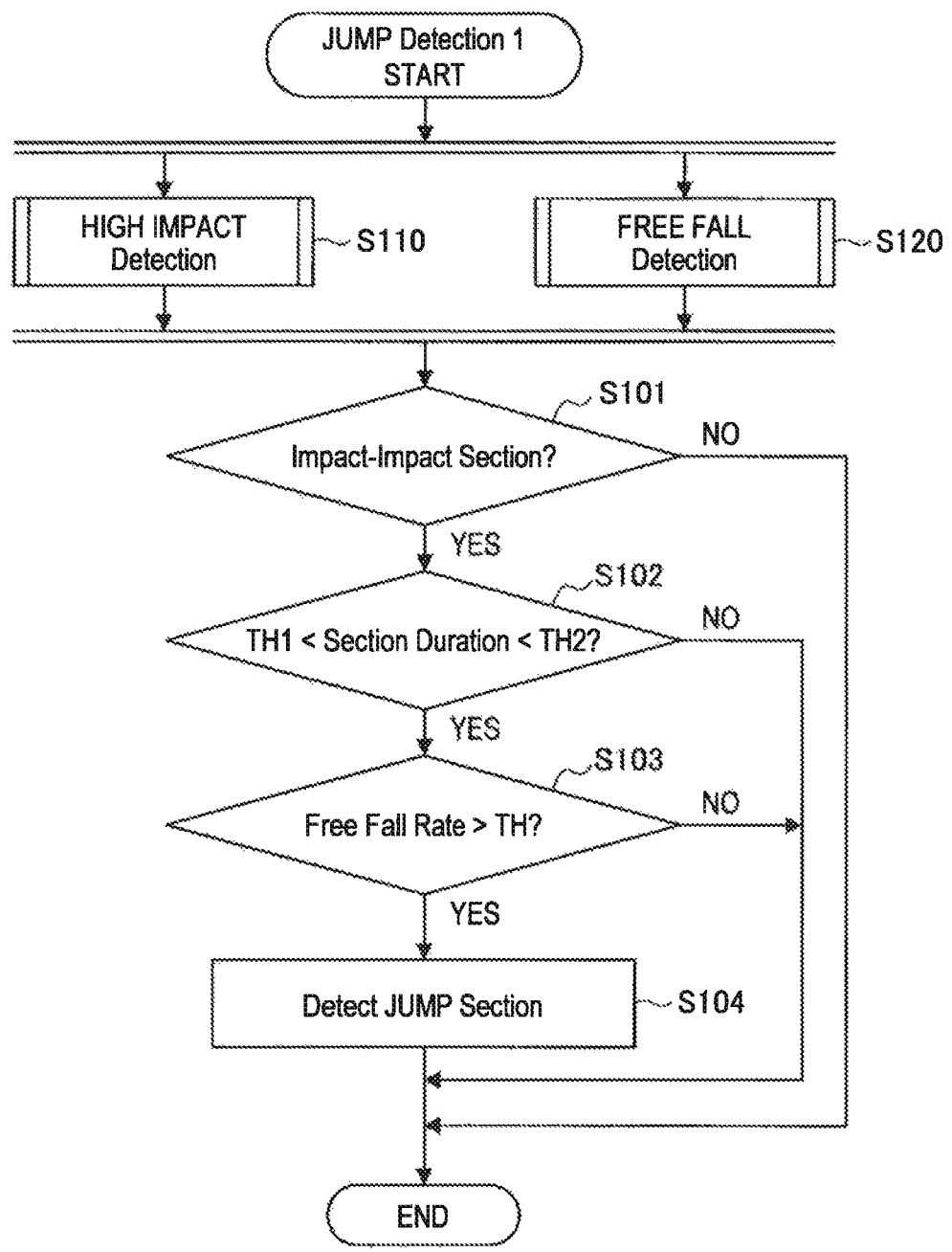
FIG. 2 is a flowchart showing a first example of a process for detecting a jump included in an action of a user in an embodiment of the present disclosure.

FIG. 2 is a flowchart showing a first example of a process for detecting a jump included in an action of a user in an embodiment of the present disclosure. The illustrated process is executed by, for example, the sensor data analysis unit 104 included in the information processing device 100.

First, the sensor data analysis unit 104 executes a high impact detection process (S110) and a free fall detection process (S120) for each predetermined time frame. Note that these processes will be described in detail below. After receiving results of the processes, the action detection unit 106 included in the sensor data analysis unit 104 determines whether a section sandwiched between two high impact sections has occurred (in which it has been estimated that takeoff and landing are performed) (101). When such a section has occurred, the action detection unit 106 determines whether duration of the section is between two threshold values (TH1 and TH2) (S102). The threshold values are set, for example, for the purpose of excluding sections that are determined to be too long or too short for a jump.

When the duration is determined to be between the two threshold values in S102, the action detection unit 106 also determines whether a ratio of a free fall section in the aforementioned section exceeds a threshold value (TH) (S103). When the ratio of the free fall section exceeds the threshold value, the section (the section sandwiched between the two high impact sections) is detected to be a jump section (S104).

Figure 3:
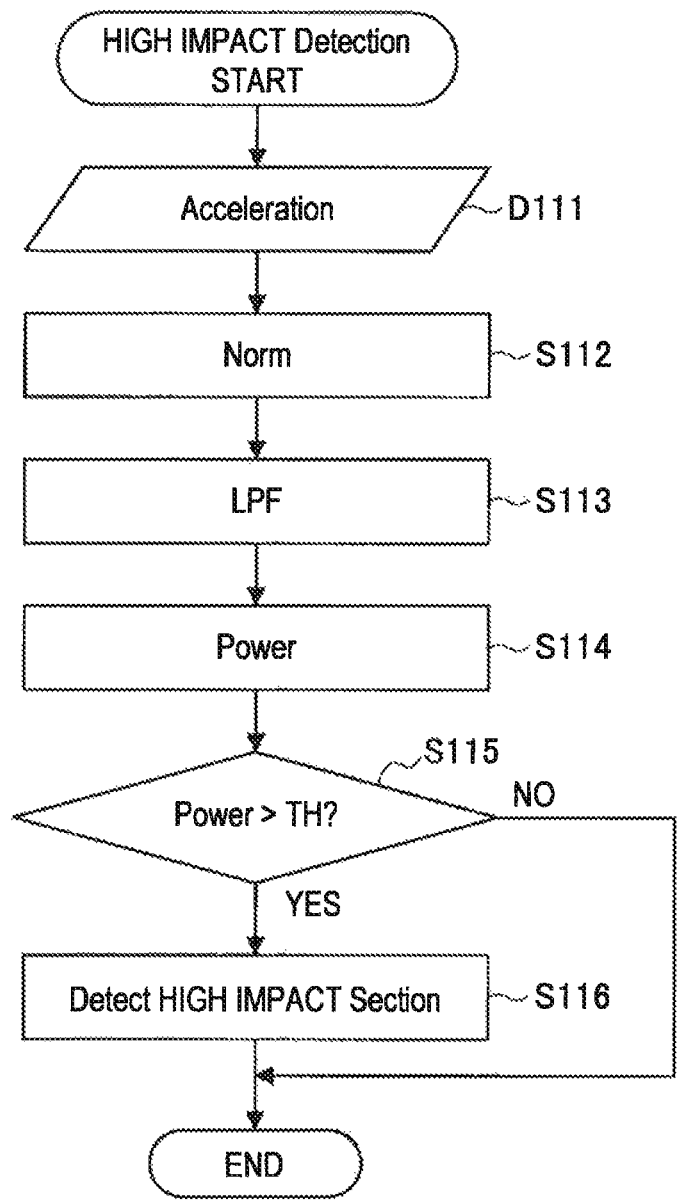
FIG. 3 is a flowchart showing an example of a high impact detection process shown in FIG. 2.

FIG. 3 is a flowchart showing an example of the high impact detection process (S110) shown in FIG. 2. Referring to FIG. 3, acceleration (D111) included in the sensor data is used in the high impact detection process. First, the feature amount extraction unit 105 included in the sensor data analysis unit 104 calculates a norm of acceleration (S112) and then smoothes the norm using a low-pass filter (LPF) (S113). Next, the feature amount extraction unit 105 calculates a power of amplitude for the norm of acceleration that has undergone smoothing for each predetermined time frame (S114). The action detection unit 106 determines whether the power exceeds a threshold value (TH) (S115), and when the power exceeds the threshold value, the corresponding time frame is detected to be a high impact section (S116).

Note that, in the present specification and drawings, appropriate values are set for threshold values denoted as TH, TH1, TH2, and the like in processes. That is, denoting all threshold values as TH does not mean that all of the threshold values have the same value.

Figure 4:
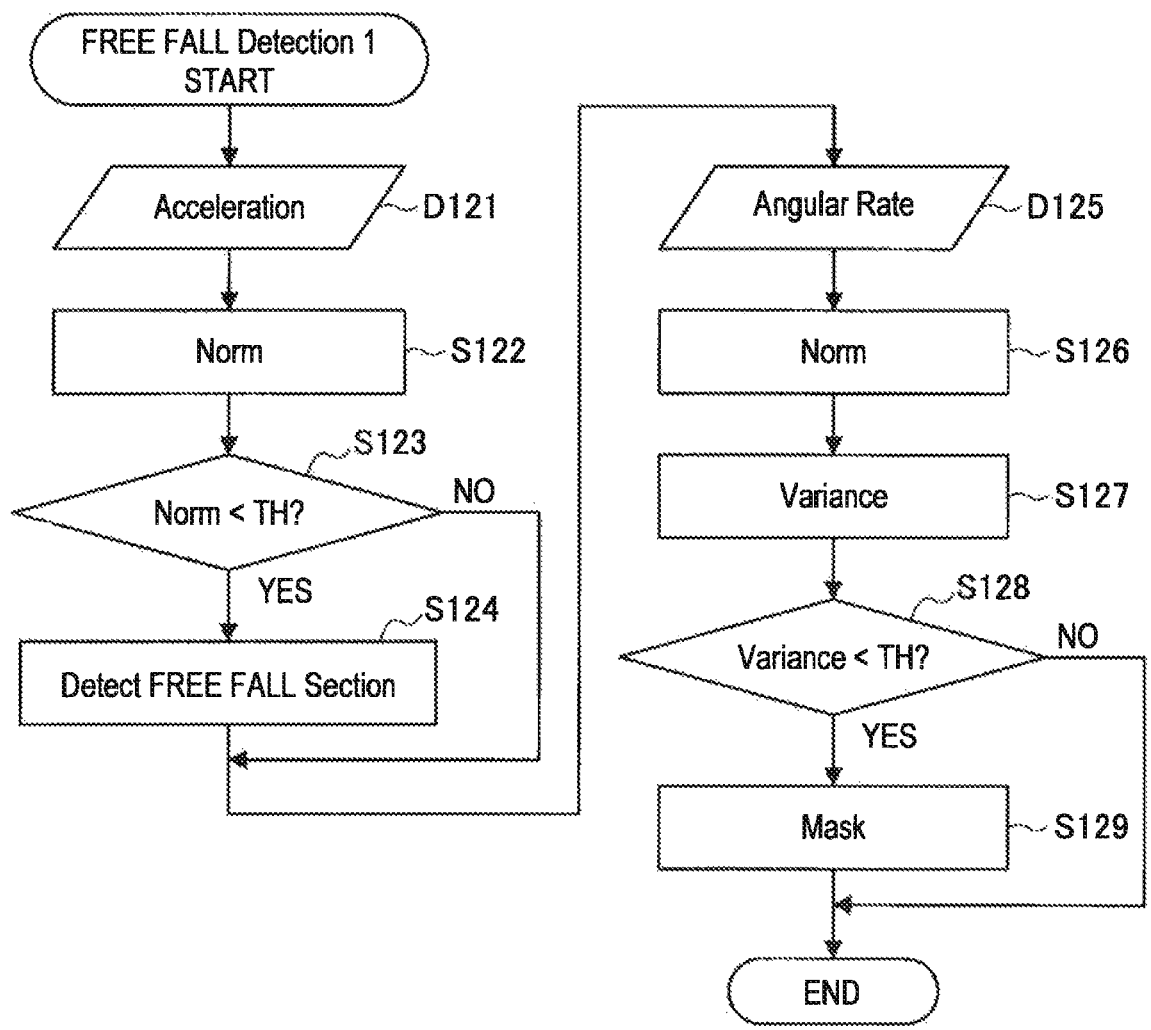
FIG. 4 is a flowchart showing a first example of a free fall detection process shown in FIG. 2.

FIG. 4 is a flowchart showing a first example of the free fall detection process (S120) shown in FIG. 2. Referring to FIG. 4, in the free fall detection process as the first example, acceleration (D121) and angular velocity (D125) included in the sensor data are used. First, the feature amount extraction unit 105 calculates a norm of acceleration (S122), and the action detection unit 106 determines whether the norm of each section is lower than a threshold value (TH) (S123). The action detection unit 106 detects a section in which the norm of acceleration is lower than the threshold value to be a free fall section (S124).

Meanwhile, the feature amount extraction unit 105 also calculates a norm of angular velocity (S126), and also calculates a variance of norms in predetermined time frames (S127). The action detection unit 106 determines whether the variance of the norms of angular velocity is lower than a threshold value (TH) (S128), and when the variance is lower than the threshold value, masks the free fall section detected in S124 (i.e., cancels the determination as a free fall section) (S129). The masking process on the basis of the angular velocity is based on the perspective that, since an angular velocity changes when a user makes a jump, a free fall section in which a change (a variance) of an angular velocity is small is caused due to an action other than a jump.

Note that, in the above-described process, the masking process in S126 to S129 may not be necessarily executed after the free fall section determination process in S121 to S124. For example, the action detection unit 106 may first execute the masking process and not execute the free fall section determination process on a section specified as a section to be masked. Alternatively, the masking process may be executed after the jump section detection process (S104) shown in FIG. 2 and a section temporarily detected as a jump section may be masked. Further, the free fall process (S120) shown in FIG. 4 and the like may not be necessarily executed before the section occurrence determination (S101) shown in FIG. 2, and the free fall detection process may be executed on a corresponding section after the section occurrence determination, for example, before a determination of a ratio of a free fall section (S103).

Figure 5:
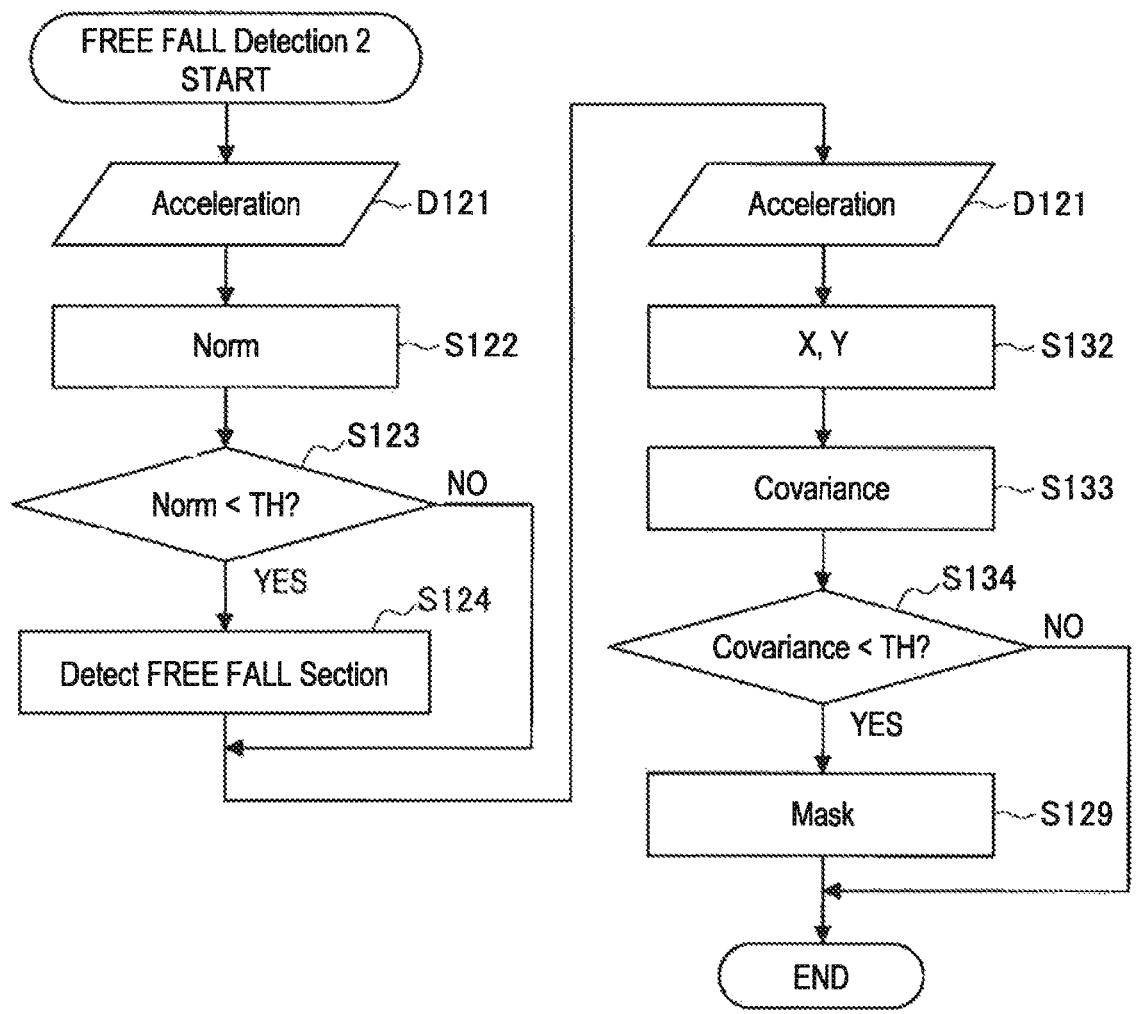
FIG. 5 is a flowchart showing a second example of the free fall detection process shown in FIG. 2.

FIG. 5 is a flowchart showing a second example of the free fall detection process (S120) shown in FIG. 2. Referring to FIG. 5, in the free fall detection process as the second example, the acceleration (D121) included in the sensor data provided by the acceleration sensor mounted on a user or a piece of equipment used by the user is used. In S122 to S124, the feature amount extraction unit 105 and the action detection unit 106 execute similar processes to those of the first example and detect a free fall section.

Meanwhile, in the present example, the feature amount extraction unit 105 extracts an X-axis component and a Y-axis component of acceleration (S132), and also calculates covariance of the X-axis component and the Y-axis component of acceleration (S133). More specifically, for example, when a user walks or runs on a reference plane (which is not limited to a horizontal plane and may be a slope), the feature amount extraction unit 105 uses an axis closest to a traveling direction of the user between coordinate axes of an acceleration sensor as the X axis, and an axis closest to a normal direction of the reference plane as the Y axis, and then calculates the covariance of the acceleration components (the X-axis component and the Y-axis component) in axial directions. The action detection unit 106 determines whether the covariance is smaller than a threshold value (TH) (S134) and masks the free fall section detected in S124 when the covariance is smaller than the threshold value (S129). The masking process based on the covariance of the acceleration is effective when a jump desired to be detected is not a so-called vertical jump that only causes displacement in the normal direction of the reference plane, but is a jump that causes displacement in the traveling direction of the user.

(2-2. Detection of Jump-2)

Figure 6:
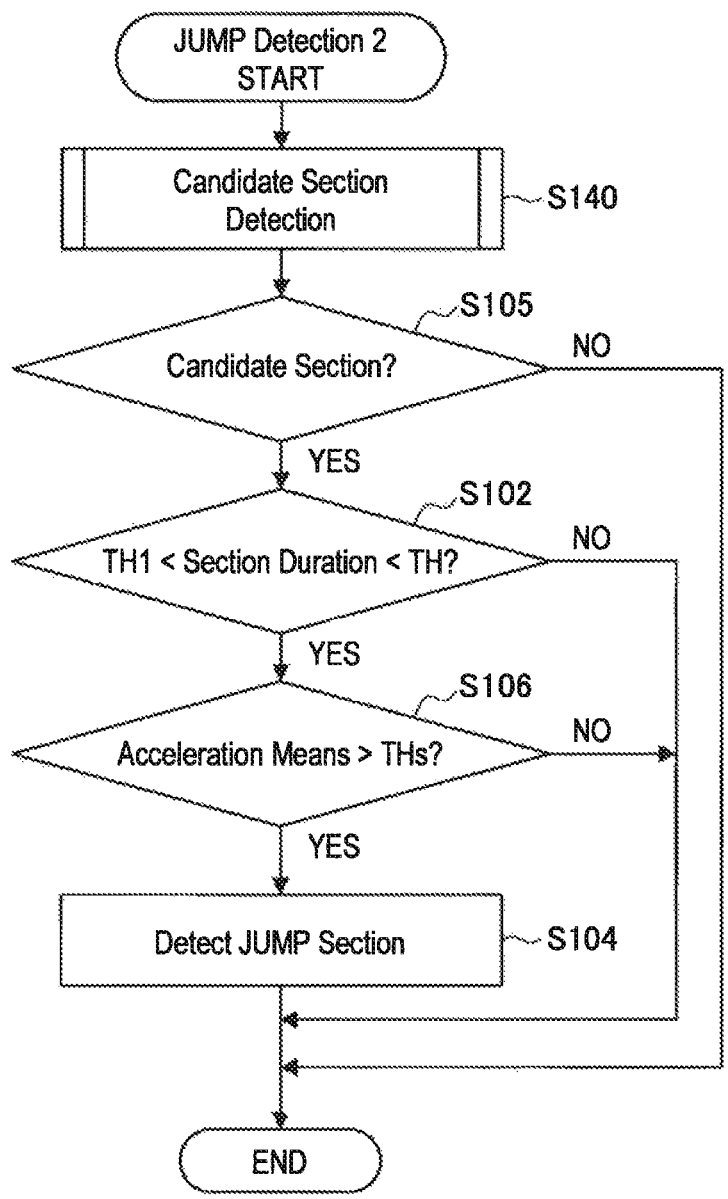
FIG. 6 is a flowchart showing a second example of the process for detecting a jump included in an action of a user in an embodiment of the present disclosure.

FIG. 6 is a flowchart showing a second example of the process for detecting a jump included in an action of a user in an embodiment of the present disclosure. The illustrated process is executed by, for example, the sensor data analysis unit 104 included in the information processing device 100 as in the first example.

First, the sensor data analysis unit 104 executes a candidate section detection process (S140). Note that details of the process will be described below. After receiving the result of the process, the action detection unit 106 included in the sensor data analysis unit 104 determines whether a candidate section has occurred (S105). When a candidate section occurs, the action detection unit 106 determines whether duration of the section is between two threshold values (TH1 and TH2) (S102) as in the first example. When the duration is between the two threshold values, the action detection unit 106 further determines whether means of acceleration in the vertical direction and the horizontal direction of the section exceed their respective threshold values (THs) (S106). When the means of acceleration exceed their respective threshold value, the candidate section is detected to be a jump section (S104).

Figure 7:
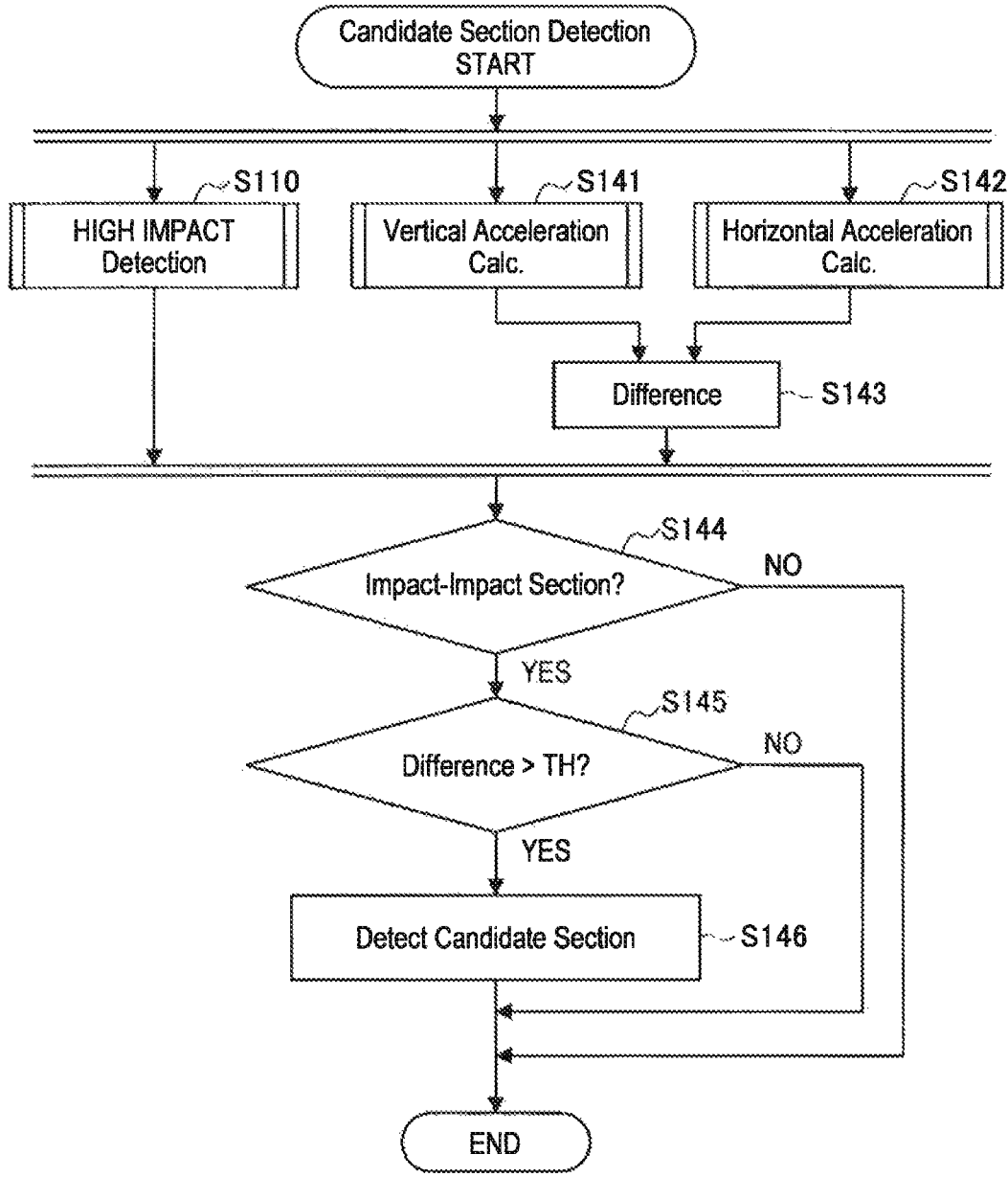
FIG. 7 is a flowchart showing an example of a candidate section detection process shown in FIG. 6.

FIG. 7 is a flowchart showing an example of the candidate section detection process (S140) shown in FIG. 6. Referring to FIG. 7, in the candidate section detection process, the high impact detection process (S110) described with reference to FIG. 3 above, a vertical acceleration calculation process (S141), and a horizontal acceleration calculation process (S142) are executed. Furthermore, the feature amount extraction unit 105 included in the sensor data analysis unit 104 calculates a difference between the vertical direction acceleration and the horizontal direction acceleration respectively calculated in S141 and S142 for each section (S143). Then, the action detection unit 106 determines whether a section sandwiched between two high impact sections has occurred (in which takeoff and landing are estimated to be performed) (S144). When such a section has occurred, the action detection unit 106 determines whether a difference between the vertical direction acceleration and the horizontal direction acceleration calculated in S143 exceeds a threshold value (TH) in the section (S145). When the difference exceeds the threshold value, the section (the section sandwiched between two high impact sections) is determined to be a candidate jump section (S146).

Figure 8:
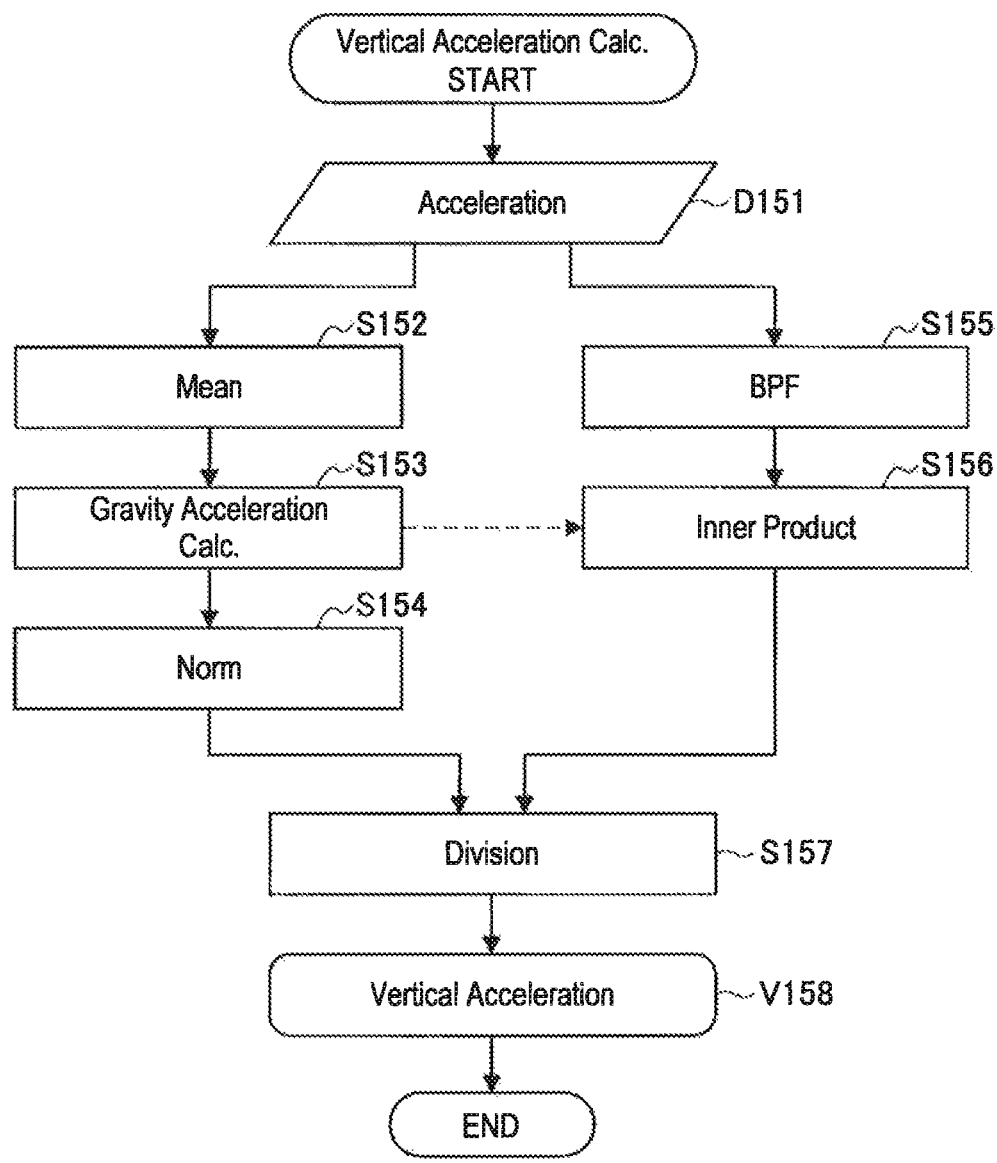
FIG. 8 is a flowchart showing an example of a vertical acceleration calculation process shown in FIG. 7.

FIG. 8 is a flowchart showing an example of the vertical acceleration calculation process (S141) shown in FIG. 7. Referring to FIG. 8, in the vertical acceleration calculation process, acceleration (D151) included in the sensor data is used. First, the feature amount extraction unit 105 included in the sensor data analysis unit 104 calculates the mean of acceleration (a mean) (S152). The mean calculated here can be, for example, a moving average. On the basis of the mean of the acceleration calculated in S152, the feature amount extraction unit 105 executes a gravitational acceleration calculation process (S153). Further, the feature amount extraction unit 105 calculates a norm of the calculated gravitational acceleration (S154). Note that the gravitational acceleration may be calculated on the basis of the mean such as the moving average or by using a filter such as an LPF.

Meanwhile, the feature amount extraction unit 105 processes the acceleration (D151) with a band-pass filter (BPF) separately from the processes of S152 to S154 (S155). In the illustrated example, the BPF is used for the purpose of removing DC components (i.e., gravity components) included in the acceleration with a low frequency band filter and also performing smoothing on the acceleration with a high frequency band filter. Note that the BPF of S155 may be replaced with a combination of other types of filters, for example, an LPF, a high-pass filter (HPF), and the like. The feature amount extraction unit 105 calculates an inner product of the acceleration processed by the BPF and the gravitational acceleration calculated in S153 (S156).

Further, the feature amount extraction unit 105 divides the inner product calculated in S156 by the norm of the gravitational acceleration calculated in S154 (S157). Accordingly, a vertical acceleration (V158) is obtained. In the illustrated example, the vertical acceleration is calculated by projecting an acceleration obtained by removing a gravitation component with the BPF (S155) in a direction of the gravitational acceleration.

Figure 9:
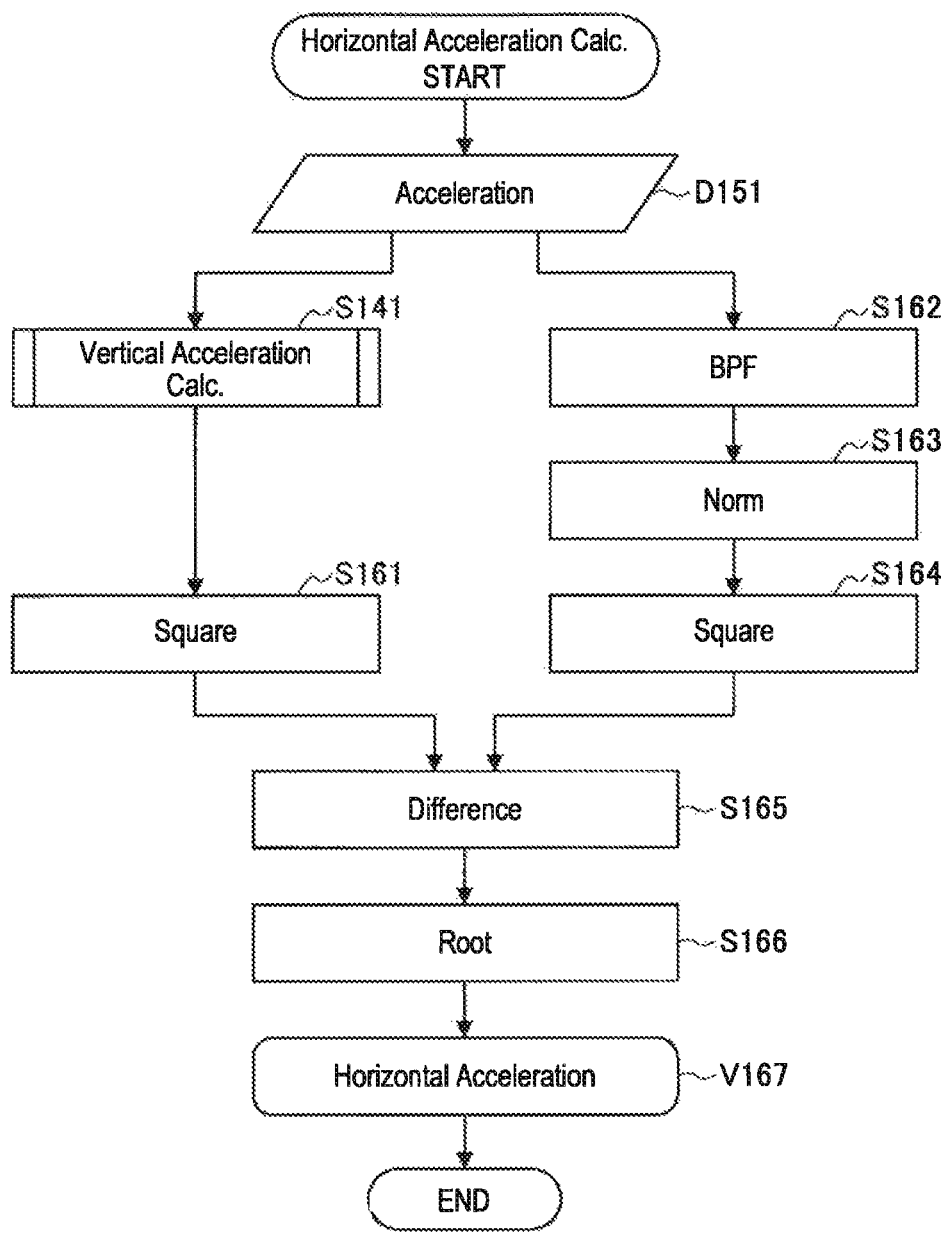
FIG. 9 is a flowchart showing an example of a horizontal acceleration calculation process shown in FIG. 7.

FIG. 9 is a flowchart showing an example of the horizontal acceleration calculation process (S142) shown in FIG. 7. Referring to FIG. 9, the acceleration (D151) included in the sensor data is also used in the horizontal acceleration calculation process. In addition, in the horizontal acceleration calculation process, the vertical acceleration calculated in the vertical acceleration calculation process (S141) described with reference to FIG. 8 is used. More specifically, the feature amount extraction unit 105 included in the sensor data analysis unit 104 squares the vertical acceleration for use (S161).

On the other hand, the feature amount extraction unit acceleration (D151) is processed with the BPF (S162) to remove DC components included in the acceleration and smooth the acceleration. Note that the BPF of S162 may also be replaced with a combination of other types of filters, for example, an LPF, an HPF, and the like. The feature amount extraction unit 105 calculates a norm of the acceleration processed with the BPF (␣163) and squares the norm (S164). Further, the feature amount extraction unit 105 calculates a difference between the square of the vertical acceleration calculated in S161 and the square of the horizontal acceleration calculated in S164 (S165), and obtains the horizontal acceleration (V167) with the difference of the square root (S166).

For the jump detection according to an embodiment of the present disclosure as described above, a total of 3 types of jump detection processes are possible: employing the first example (FIG. 4) of the free fall detection process in the first example (FIG. 2) of jump detection, employing the second example (FIG. 5) of the free fall detection process in the same first example (FIG. 2) of jump detection, and employing the second example (FIG. 6) of jump detection. The sensor data analysis unit 104 that includes the action detection unit 106 may execute each of the three types of jump detection processes and finally detect a jump section on the basis of results of the processes. More specifically, for example, when at least one jump section is detected in the three types of jump detection process, the action detection unit 106 may detect the section as a final jump section. Alternatively, when two or more jump sections are detected, or when all three types of jump section are detected, the action detection unit 106 may detect the sections as final jump sections.

(2-3. Detection of Turn)

Figure 10:
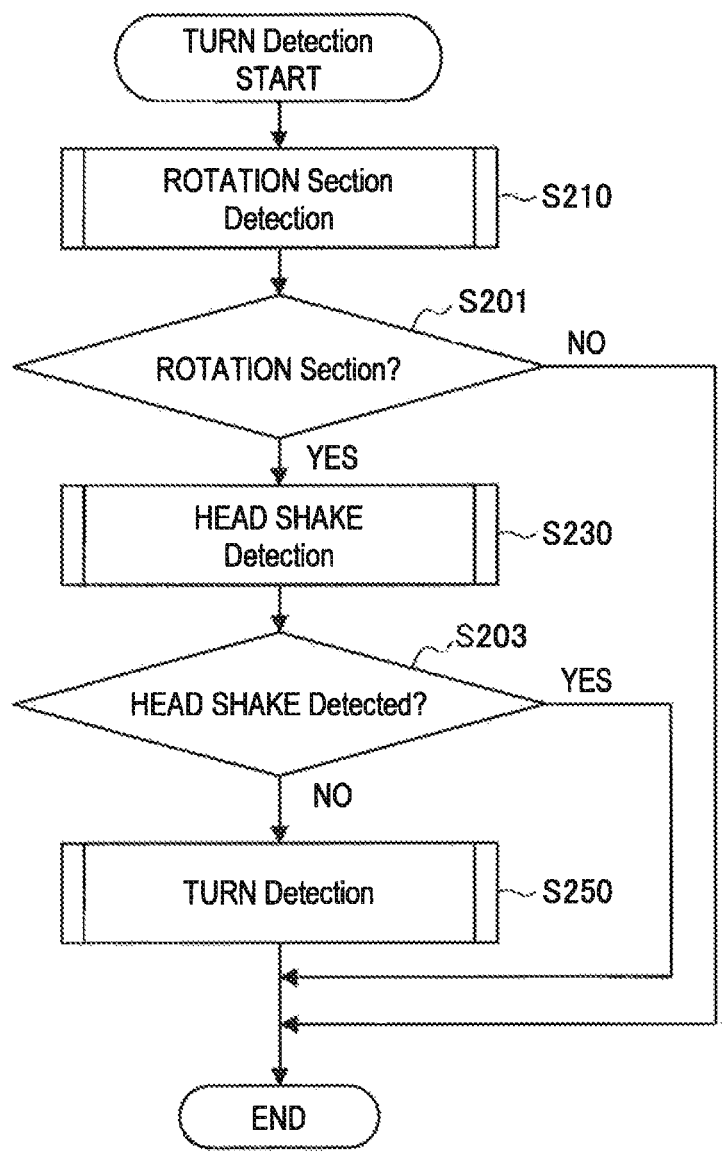
FIG. 10 is a flowchart showing an example of a process for detecting a turn section included in an action of a user in an embodiment of the present disclosure.

FIG. 10 is a flowchart showing an example of a process for detecting a turn section included in an action of a user in an embodiment of the present disclosure. The illustrated process is executed by, for example, the sensor data analysis unit 104 included in the information processing device 100. In the following processes, the sensor data analysis unit 104 detects rotation included in an action of a user (S210), also detects non-turning rotation included in the rotation (S230), and detects a turn from the rotation from which the non-turning rotation has been removed (S250).

Here, the non-turning rotation includes a rotation occurring through a head shake of the user when, for example, a sensor includes a sensor mounted on the head of the user or equipment mounted on the head of the user. The non-turning rotation can also include a rotation occurring through a body motion, more specifically, a rotation occurring through arm-shaking or arm-circling of the user when a sensor includes a sensor mounted on an arm of the user or a piece of equipment mounted on the arm of the user.

In the present embodiment, a turn section can be detected with higher accuracy by the sensor data analysis unit 104 excluding such a non-turning rotation and then detecting the turn section. From that perspective, the non-turning rotation can be said as noise with respect to a turn to be detected, and in the present embodiment, the sensor data analysis unit 104 can also be said to detect a rotation included in an action of the user, detect noise included in the rotation, and detect a turn from the rotation from which noise has been removed.

First, the sensor data analysis unit 104 executes a rotation section detection process (S210). In the present embodiment, a rotation section is defined to be a section in which an angular velocity in a horizontal plane direction exceeds a threshold value. The sensor data analysis unit 104 determines whether a rotation section has occurred (S201). When a rotation section has occurred, the sensor data analysis unit 104 first executes a head shake detection process (S230). Further the sensor data analysis unit 104 determines whether a head shake has been detected (S203), and when no head shake has been detected, further executes a turn detection process (S250). Through these processes, a section in which a head shake occurs (e.g., a section occurring when a sensor is mounted on a head-mounted wearable terminal device or the like) of the user can be removed from the rotation section, and thus a turn section whose rotation radius, angular velocity, duration, and the like satisfy predetermined conditions can be extracted.

Figure 11:
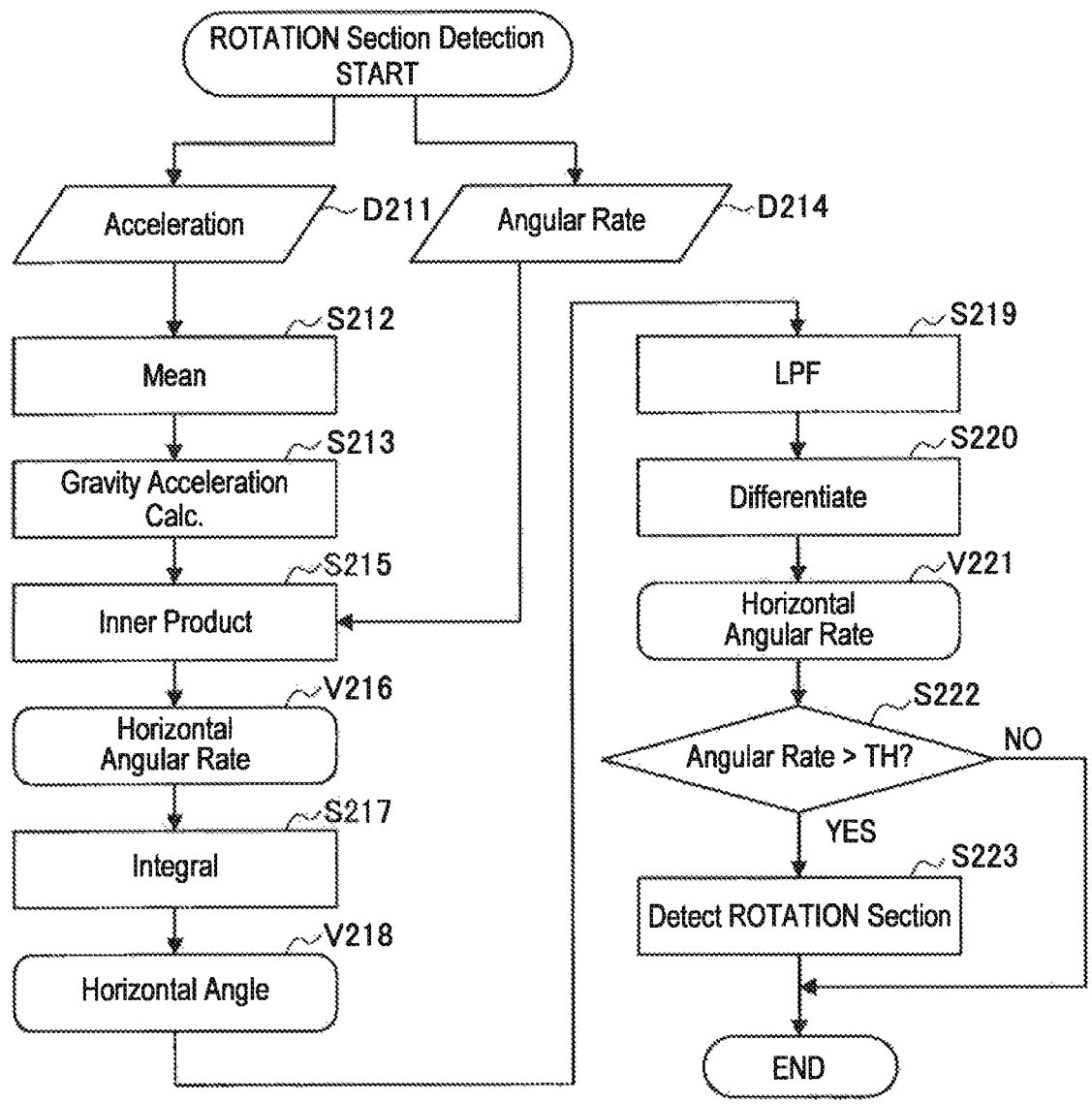
FIG. 11 is a flowchart showing an example of a rotation section detection process shown in FIG. 10.

FIG. 11 is a flowchart showing an example of the rotation section detection process (S210) shown in FIG. 10. Referring to FIG. 11, in the rotation section detection process, acceleration (D211) and an angular velocity (D214) included in the sensor data are used. First, the feature amount extraction unit 105 included in the sensor data analysis unit 104 calculates the mean of the acceleration (S212). Here, the calculated mean can be, for example, a moving average. The feature amount extraction unit 105 executes a gravitational acceleration calculation process on the basis of the mean of the acceleration calculated in S212 (S213). Further, the feature amount extraction unit 105 calculates an inner product of a gravitational acceleration calculated in S213 and the angular velocity (D214) (S215). Accordingly, projection of an angular velocity in a direction of the gravitational acceleration, i.e., an angular velocity (V216) in the horizontal plane direction (around a vertical axis) is obtained.

Here, the feature amount extraction unit 105 first integrates the calculated angular velocity (S217), and calculates an angular displacement (V218) in the horizontal plane direction. The feature amount extraction unit 105 processes the angular displacement with a LPF (S219). Further, the feature amount extraction unit 105 differentiates the angular displacement (S220), thereby obtaining an angular velocity in a horizontal plane direction (V221). As the angular velocity of V221 is first integrated in S217 and the angular displacement after the integration is processed with the LPF in S219, the angular velocity of V221 is smoothed in comparison to an angular velocity of V218, and thus noise is removed from waveforms thereof. The action detection unit 106 included in the sensor data analysis unit 104 determines whether the angular velocity (V221) in the horizontal plane direction exceeds a threshold value (S222), and a section in which the angular velocity direction exceeds the threshold value is detected as a rotation section (S223).

Figure 12:
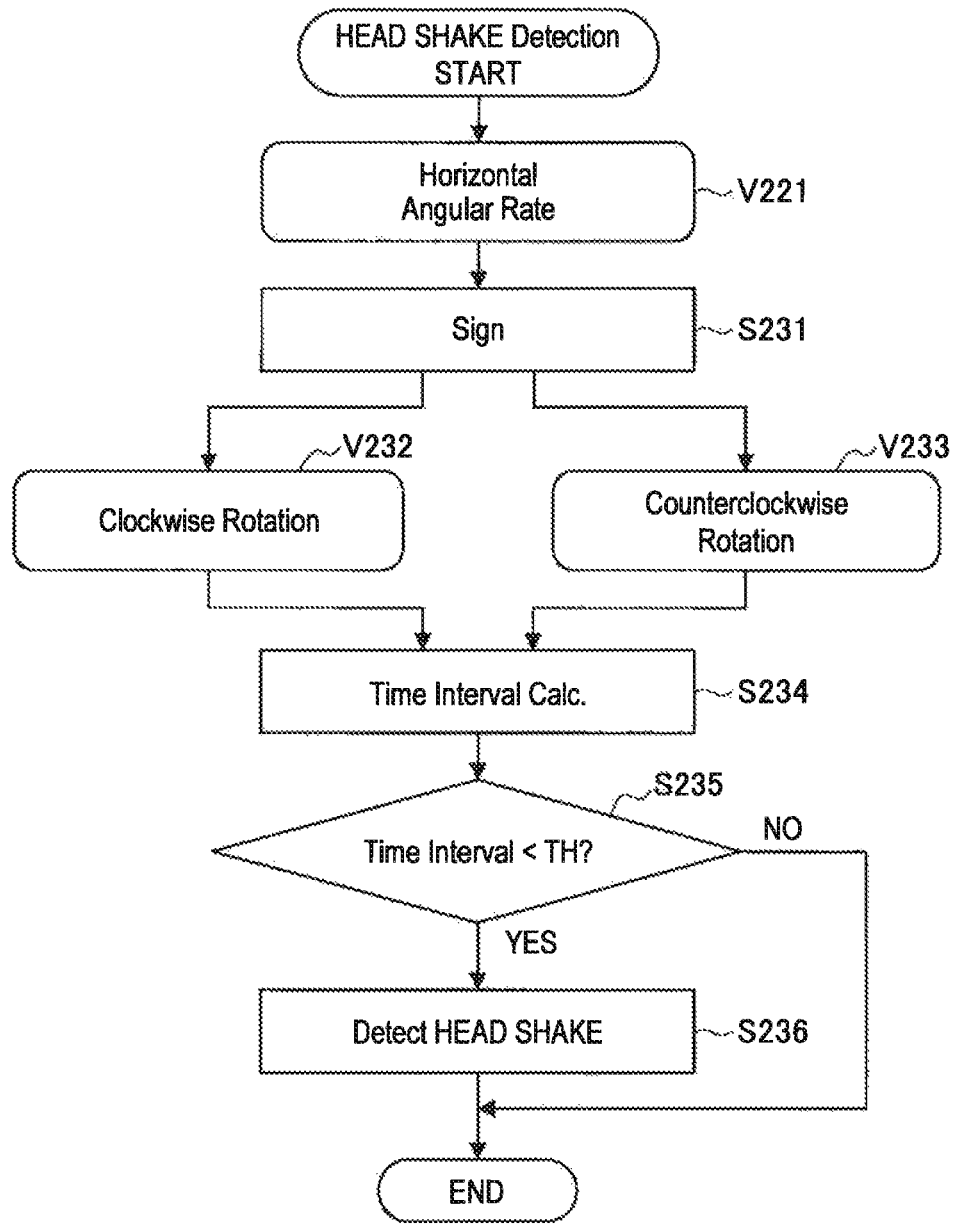
FIG. 12 is a flowchart showing an example of a head shake detection process shown in FIG. 10.

FIG. 12 is a flowchart showing an example of the head shake detection process (S230) shown in FIG. 10. Referring to FIG. 12, in the head shake detection process, the smoothed angular velocity (V221) in the horizontal plane direction calculated in the rotation section detection process shown in FIG. 11 is used. The feature amount extraction unit 105 acquires a sign of the angular velocity (S231). Although any definition of a sign with respect to a direction of a rotation may be possible, a clockwise rotation (V232) and a counterclockwise rotation (V233) are defined as the sign of the angular velocity (V221) in the illustrated example. Further, the feature amount extraction unit 105 calculates a time interval at which a rotation in a reverse direction has occurred (S234). That is, in the illustrated example, the feature amount extraction unit 105 calculates a time interval from the occurrence of the clockwise rotation (V232) to the occurrence of the counterclockwise rotation (V233) and a time interval between the occurrence of the counterclockwise rotation (V233) and the occurrence of the clockwise rotation (V232). The action detection unit 106 determines whether each time interval calculated in S234 is shorter than a threshold value (TH) (S235), and when each time interval is shorter than the threshold value, the occurrence of a head shake is detected (S236).

Figure 13:
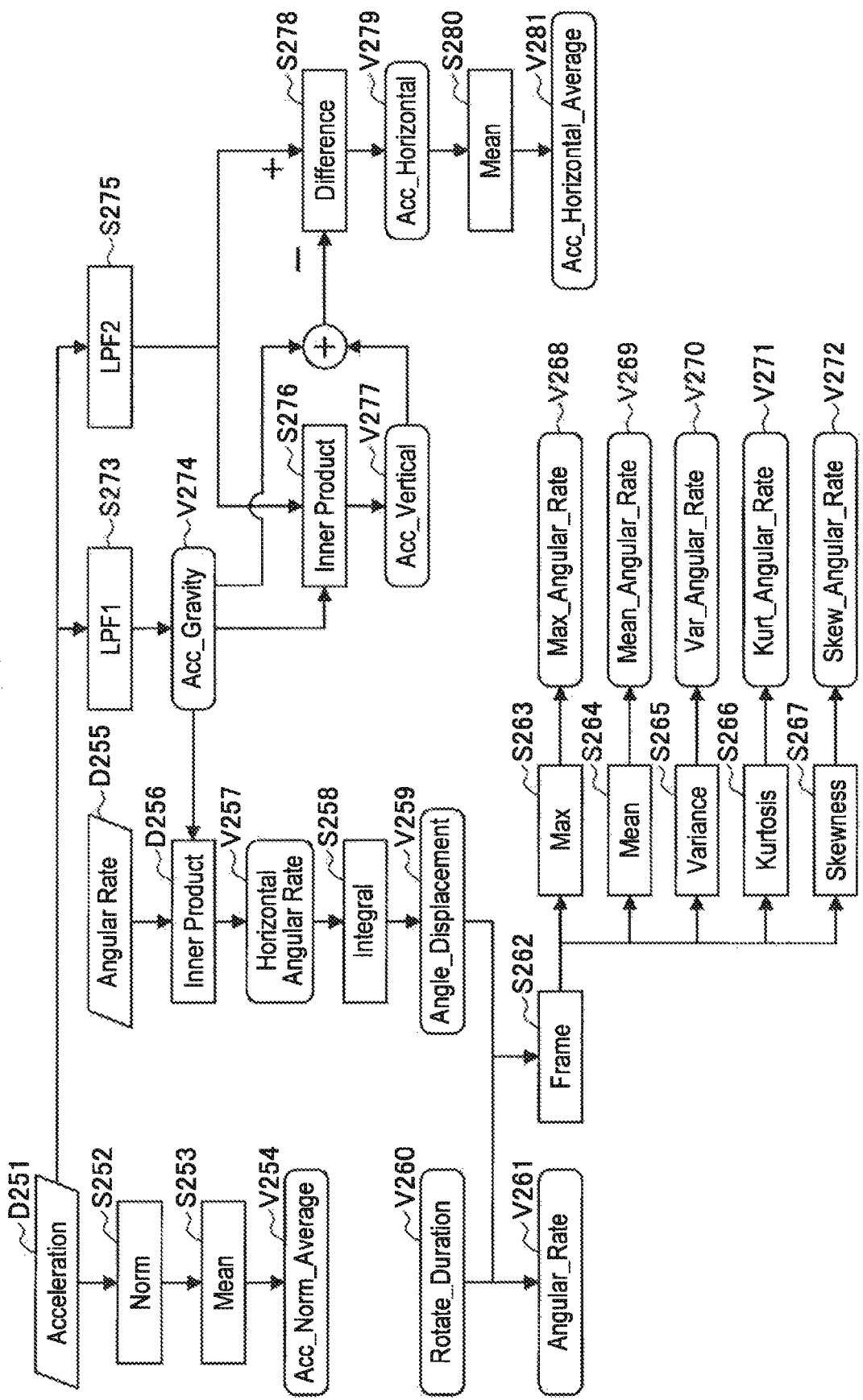
FIG. 13 is a chart showing an example of a turn detection process shown in FIG. 10.

FIG. 13 is a chart showing an example of the turn detection process (S250) shown in FIG. 10. In the turn detection process, the feature amount extraction unit 105 calculates a plurality of feature amounts, and then the action detection unit 106 executes a determination using a threshold value on the basis of the plurality of feature amounts. In FIG. 13, processes of the feature amount extraction unit 105 for calculating each of the feature amounts are shown. Note that, although the processes for calculating each of the feature amounts are described in order below, the processes performed by the feature amount extraction unit 105 may not necessarily be executed in the described order, and can be executed in an arbitrary order as long as prerequisite amounts are acquired or calculated.

First, the feature amount extraction unit 105 calculates a norm of acceleration (D251) included in the sensor data (S252), and calculates the mean of the norm in a predetermined time frame (S253). The average of the norm of acceleration (V254) calculated as described above is used as one of feature amounts for detecting a turn.

Meanwhile, the feature amount extraction unit 105 processes the acceleration (D251) with a first LPF (S273), and calculates gravitational acceleration (V274). Further, the feature amount extraction unit 105 calculates an inner product of an angular velocity (D255) included in the sensor data and the gravitational acceleration (S256). Accordingly, projection of the angular velocity in the direction of the gravitational acceleration, i.e., an angular velocity (V257) in the horizontal plane direction (around the vertical axis), is obtained. The feature amount extraction unit 105 integrates the calculated angular velocity (S258), and calculates angular displacement in a horizontal plane direction (V259). The angular displacement (V259) is also used as one of feature amounts for detecting a turn.

Further, the feature amount extraction unit 105 calculates an angular velocity (V261) on the basis of the angular displacement (V259) and a duration (V260) of a rotation section to be processed. The angular velocity V261 can be smoothed in a longer time frame than the angular velocity D255, (for example, in the entire rotation section. The duration (V260) of the rotation section and an angular change rate (V261) are also used as one type of feature amount for detecting a turn.

In addition, the feature amount extraction unit 105 calculates several feature amounts by analyzing the angular displacement (V259) for a predetermined time frame (S262). More specifically, the feature amount extraction unit 105 calculates a maximum value (S263 and V268), a mean (S264 and V269), a variance (S265 and V270), a kurtosis (S266 and V271), and skewness (S267 and V272) of the angular velocity within the time frame. These feature amounts are also used as feature amounts for detecting a turn.

Meanwhile, the feature amount extraction unit 105 processes the acceleration (D251) with a second LPF (S275). In the illustrated example, while the first LPF (S273) is used to extract the gravitational acceleration (V274) that is a DC component included in the acceleration, the second LPF (S275) is used to smooth the acceleration by filtering out its high frequency area. Thus, pass bands of the LPFs can be set to be different.

The feature amount extraction unit 105 calculates an inner product of the acceleration smoothed by the second LPF (S275) and the gravitational acceleration (V274) extracted by the first LPF (S273) (S276). Accordingly, vertical acceleration (V277) is obtained. Further, the feature amount extraction unit 105 calculates a difference between an acceleration vector composed of the gravitational acceleration (V274) and the vertical acceleration (V277) and the acceleration smoothed by the second LPF (S275) (S278). Accordingly, horizontal acceleration (V279) is obtained. The feature amount extraction unit 105 calculates a mean of horizontal acceleration (S280). The mean of horizontal acceleration (V281) calculated as described above is also used as a feature amount for detecting a turn.

The action detection unit 106 determines whether a turn has occurred on the basis of, for example, the feature amounts extracted from the sensor data as described above. In the illustrated example, the action detection unit 106 executes the determination on the basis of the duration (V260) of the rotation section, the angular displacement (V259) in the horizontal plane direction, the smoothed angular velocity (V261), the mean of the norm of acceleration (V254), the average of the horizontal acceleration (V281), and the maximum value, the mean (V269), the variance (V270), the kurtosis (V271), and the skewness (V272) of the angular velocity within the time frame (V268).

Note that feature amounts to be used in the determination are not limited to the above examples, and, for example, feature amounts other than the above examples may be used or some of the feature amounts of the above example may not be used. For example, types of feature amounts to be used in detection of a turn may be decided from various types of feature amounts that can be extracted from sensor data using main component analysis based on the sensor data obtained when the turn has actually occurred. Alternatively, feature amounts to be used in the determination may be decided on the basis of a propensity of sensor data appearing when a turn has actually occurred. Among the above-described examples, the average of the norm of acceleration (V254) and the average of the horizontal acceleration (V281) are, for example, feature amounts relating to a rotation radius of a turn.

In addition, a threshold value of each feature amount applied to determination by the action detection unit 106 is decided in accordance with, for example, a result of machine learning based on the sensor data obtained when a turn has actually occurred. At this time, whether a turn has actually occurred may be manually decided with reference to, for example, a video of an action simultaneously acquired with the sensor data. Furthermore, a label indicating a type of turn as well as whether a turn has occurred may be given. More specifically, for example, a service provider may give labels that each indicate attributes to an action that is desired to be detected as a turn, desired not to be detected as a turn, or determined to be either or both as a result of referring to a video.

Several examples of the action detection process executed in an embodiment of the present disclosure have been described above. As has already been described, execution of the action detection process in the present embodiment is not limited to jumps and turns occurring during snowboarding, and the action detection process may be executed for jumps and turns occurring in, for example, sports other than snowboarding or scenes other than sports. In addition, an action other than a jump or a turn may be detected in the action detection process executed in the present embodiment. As an example, the action detection unit 106 may detect toppling that occurs in snowboarding or the like. In this case, the feature amount extraction unit 105 may calculate a norm of acceleration similarly to the above-described detection of a jump or a turn, and when the norm of acceleration exceeds a threshold value (e.g., which may be high enough not to appear in normal sliding), the action detection unit 106 may detect the occurrence of toppling.

(3. Examples of Additional Processes)
(3-1. Calculation of Action Score)

The scoring processing unit 109 included in the analysis result processing unit 107 calculates, for example, a score for evaluating an action that has occurred (an action score) for an action section including a jump section and/or a turn section detected through the processes described above with reference to FIGS. 2 to 13. The action score can be calculated by, for example, extracting physical amounts (feature amounts) indicating a quality or characteristics of an action from sensor data for an action section and weighting and adding them. The service control unit 112 generates information regarding the action (e.g., a jump or a turn) on the basis of the score calculated as described above.

With respect to a jump section, for example, duration of the section, angular displacement around the X axis/Y axis/Z axis for the section), a ratio of a free fall section, a magnitude of an impact at the time of takeoff/landing, and the like can be extracted as feature amounts for calculating a score. In addition, with respect to a turn section, for example, duration of the section, a displacement angle, a mean, a maximum value, and a standard deviation of a speed, a maximum value and a standard deviation of an angular velocity, and the like can be extracted as feature amounts for calculating a score.

Note that a coefficient of the weighting and addition can be set, for example, in accordance with a property of an action emphasized in the service 113 provided by the information processing device 100. In addition, a method for calculating an action score using feature amounts is not limited to the weighting and addition, and other computation methods may be used. For example, an action score may be calculated by applying a machine learning algorithm such as a linear regression model.

(3-2. Clustering Process)

Further, the clustering processing unit 108 included in the analysis result processing unit 107 applies a clustering algorithm, such as a k-means method using feature amounts and the like that are extracted for scoring, to action sections including jump sections and/or turn sections, which are detected through the processes described above with reference to FIGS. 2 to 13, and classifies the detected actions into clusters. In a case of jump sections or turn sections, for example, the actions may be classified into clusters on the basis of a length of duration of sections or a magnitude of rotation. The result of clustering is used to extract action sections so that actions, such as various types of jumps or turns, are included in a dynamic image when, for example, a digest dynamic image is provided as a service. In addition, classifying satisfactory and unsatisfactory actions into different clusters will help a user review his or her actions or can be used in coaching for improving actions.

Note that the analysis result processing unit 107 may compute a degree of similarity of action sections on the basis of a correlation coefficient of feature amounts as a similar process to clustering (action sections having a high degree of similarity can be treated in a similar manner to action sections classified into the same cluster). In addition, for example, the analysis result processing unit 107 may prepare feature amount patterns of actions of typical types in advance and determine to what type of action a newly generated action corresponds.

(3-3. Estimation of Sensor Mounting State)

Figure 14:
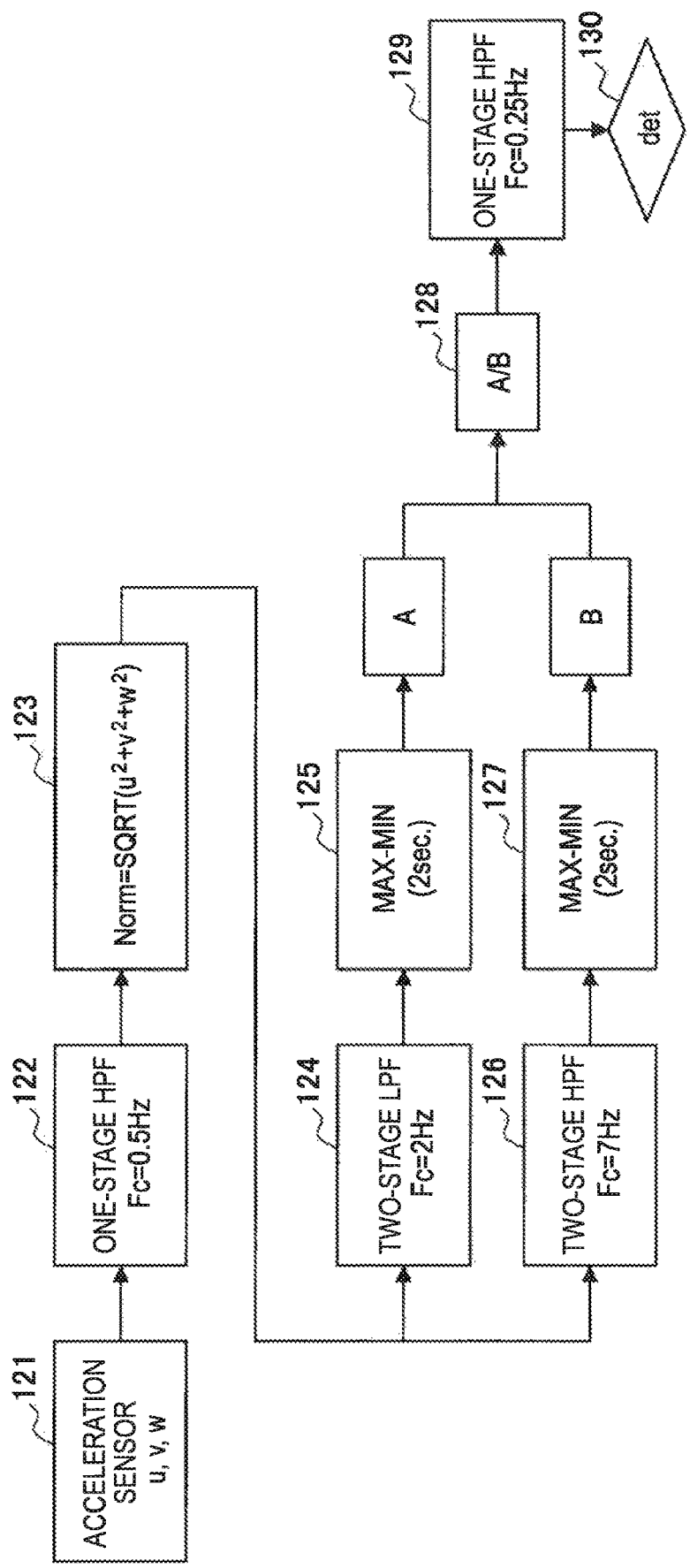
FIG. 14 is a block diagram illustrating an example of a process for estimating a sensor mounting state in an embodiment of the present disclosure.

FIG. 14 is a block diagram illustrating an example of a process for estimating a sensor mounting state in an embodiment of the present disclosure. More specifically, the illustrated configuration determines whether a sensor that provides sensor data is mounted directly on the body of a user or mounted on a piece of equipment used by the user. The process shown is executed by, for example, the sensor data analysis unit 104 included in the information processing device 100. Note that, although specific cutoff frequencies (Fc) of filters and lengths of time frames are described in the illustrated example, these numerical values are merely examples and can be appropriately changed in accordance with actual characteristics of a sensor.

In the illustrated example, the reception unit 102 of the information processing device 100 receives sensor data provided by an acceleration sensor 121 with three axes (u, v, and w). The sensor data analysis unit 104 acquires the sensor data via the sensor device control unit 103. The sensor data analysis unit 104 first processes acceleration included in the sensor data with a one-stage HPF 122 (Fc=0.5 Hz) and then executes a norm calculation 123. Further, using results obtained by processing the norm with a two-stage LPF 124 (Fc=2 Hz) and a two-stage HPF (Fc=7 Hz), the sensor data analysis unit 104 calculates amplitudes (differences between maximum values and minimum values) in a 2-second time frame (125 and 127). Using results (A and B) thereof, A/B is computed (128). The result of the computation is processed with a one-stage HPF 129 (Fc=0.25 Hz), and then threshold determination 130 is executed.

The above-described determination process is based on attenuation of high frequency components of acceleration as the body of a user functions as a LPF when the sensor is mounted directly on the body of the user. A (the amplitude of a low frequency component that has passed the LPF 124)/B (the amplitude of a high frequency component that has passed the HPF) of the above example has a greater value as a high frequency component of original acceleration attenuates more. Thus, in the threshold determination 130, when a value obtained by processing A/B with the HPF 129 is greater than a threshold value, the sensor can be determined to be mounted directly on the body of the user, and when it is not, the sensor can be determined to be mounted on a piece of equipment.

The result of the above-described estimation may be used in, for example, the sensor data analysis unit 104. In this case, the sensor data analysis unit 104 may change the threshold value, values set for the filters, and the like on the basis of whether the sensor is mounted on a body or a piece of equipment in the user action detection process described above. Alternatively, the result of the above-described estimation may be fed back to the sensor device control unit 103 to be used for setting parameters and the like with respect to a measurement of the sensor device or deciding a pre-processing method for sensor data by the sensor device control unit 103 or the like.

In the present embodiment, processes of sensor data may be adaptively controlled on the basis of an estimation of a state of a sensor data provision side, like, for example, the estimation of a sensor mounting state described above. As another example, the sensor data analysis unit 104 may estimate the type of sport in which an action has occurred using an algorithm such as machine learning from intensity of an impact, a pattern of motion, or the like detected by the acceleration sensor or the like. A sport may be estimated for each event that is generally recognized, or for each category such as board sports, water sports, cycling, motor sports, or the like. In addition, for example, when a sensor is mounted on a piece of equipment, the sensor data analysis unit 104 may estimate the type of equipment (e.g., in a case of skiing, whether the sensor is mounted on a ski or a ski pole). A result of the estimation may be used in, for example, control of a threshold, or values set for the filters for detecting an action, like the result of the estimation of a sensor mounting state, may be fed back to the sensor device control unit 103 to be used for controlling the sensor device or deciding a pre-processing method of sensor data.

(4. Examples of Map Representation)

Here, a configuration of a map representation of the information processing device according to the present embodiment will be described with reference to FIG. 1 again. In the information processing device 100 of the present embodiment, an information acquisition unit that acquires action information of a user, and space information and time information associated with the action information, and a map representation processing unit that considers the time information when executing a map representation of the action information on the basis of the space information are realized.

The reception unit 102 of the information processing device 100 receives, for example, position information of a user from a sensor device in addition to sensor data and the time information (the timestamp). At this time, the action detection unit 106 included in the sensor data analysis unit 104 stores information in which an action of the user, which is detected on the basis of the sensor data, is associated with the timestamp and the position information in the detected section information holding unit 110. Accordingly, the service control unit 112 can acquire action information of the user, and the space information (the position information) and time information (timestamp) associated with the action information from the detected section information holding unit 110.

Note that, when a time interval from the reception of sensor data by the reception unit 102 to the detection of the action by the action detection unit 106 is small, the action detection unit 106 may use time information (timestamp) at a time point at which the action was detected instead of the timestamp received along with the sensor data. In addition, when the action detection unit 106 is realized in a terminal device carried by or mounted on the user, the action detection unit 106 may use position information acquired by the terminal device at the time point at which the action was detected instead of the position information received along with the sensor data.

As described above, the service control unit 112 can acquire action information of a user, and space information (position information) and time information (timestamp) associated with the action information from the detected section information holding unit 110. Alternatively, when the analysis result processing unit 107 stores a timestamp and position information provided from the action detection unit 106 along with an action detection result in the additional information holding unit 111 in association with additional information generated on the basis of the action detection result, the service control unit 112 can acquire the generated additional information, and space information (position information) and time information (timestamp) associated with the action information from the additional information holding unit 111.

Note that, in the present specification, action information is not limited to information directly indicating an action of a user detected by the action detection unit 106, and can include various kinds of information relating to the detected action of the user. Thus, in the above-described example, the action information includes not only an action detection result provided by the action detection unit 106, but also additional information generated by the analysis result processing unit 107. In addition, the action information is not limited to actions detected by the action detection unit 106 on the basis of the sensor data, and may include actions detected as the user solely inputs his or her situation.

As described above, the service control unit 112 that has acquired the action information of the user, and the space information (the position information) and time information (timestamp) associated with the action information expresses the action information on a map on the basis of the space information. The map representation includes arranging a display element, for example, text, graphic, an icon, a texture, or the like, corresponding to the action information on the map on the basis of the space information. At this time, the display element may correspond to a single piece of action information or a plurality of pieces of action information, for example, action information generated on the basis of sensor data provided by each of a plurality of users or action information generated on the basis of pieces of sensor data sequentially provided by a single user in a time series manner.

Further, the service control unit 112 considers time information associated with the action information to express the action information on the map. More specifically, for example, the service control unit 112 may decide on a display element corresponding to two pieces of action information associated with different pieces of time information in consideration of a temporal context indicated by the time information. In addition, for example, the service control unit 112 may decide on a display element corresponding to action information associated with a certain piece of time information in consideration of a relationship between a time indicated by the time information and a current time. Several examples of such a map representation of action information will be further described below.

Figure 15:
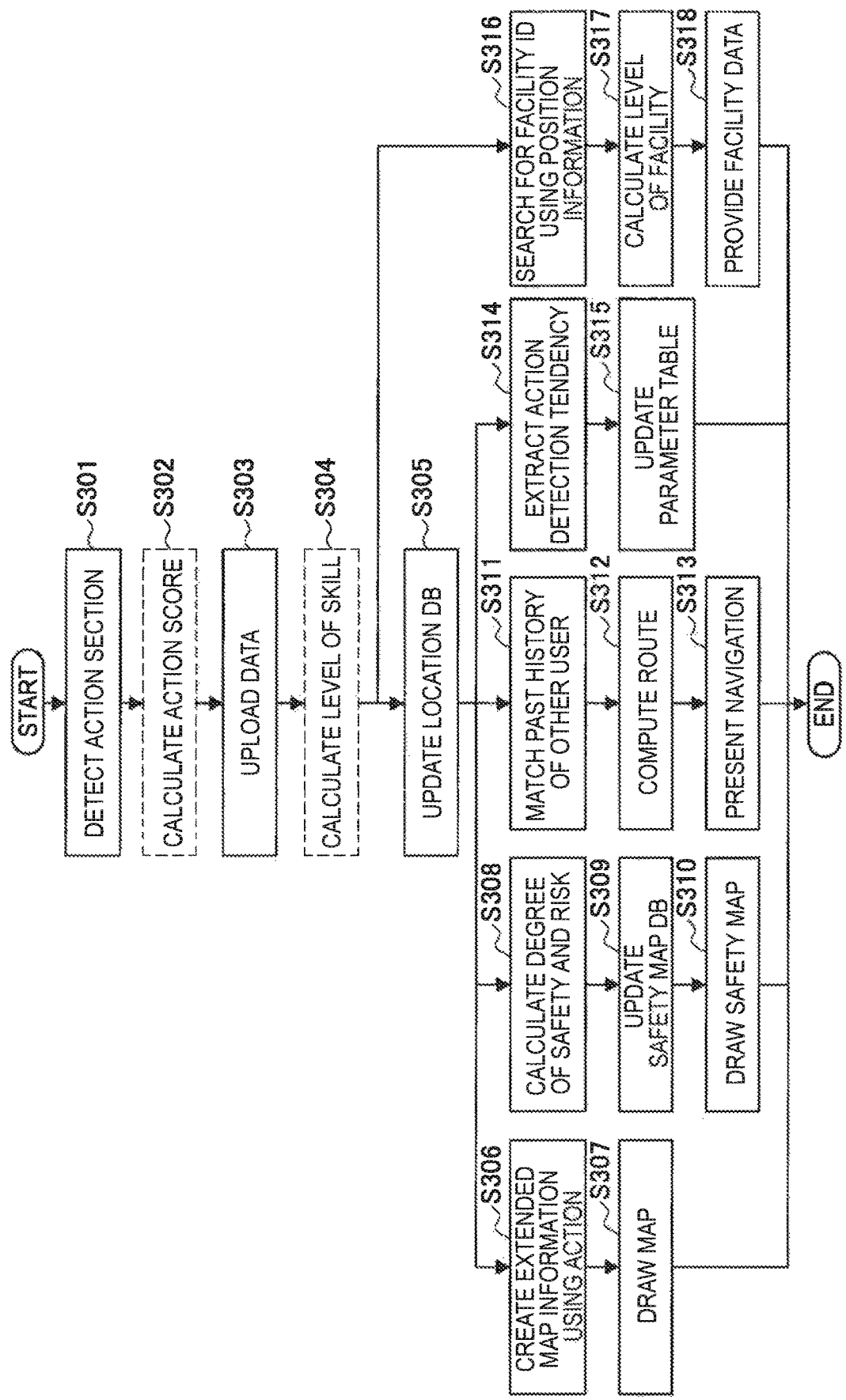
FIG. 15 is a flowchart showing a process including several examples of a map representation of action information in an embodiment of the present disclosure.

FIG. 15 is a flowchart showing a process including several examples of a map representation of action information in an embodiment of the present disclosure.

In the illustrated example, first, the action detection unit 106 included in the sensor data analysis unit 104 detects an action section (S301). The action section may include, for example, a jump section and/or a turn section detected through the processes described above with reference to FIGS. 2 to 13. In addition, the action section may include a section in which another action of a user to be detected on the basis of sensor data, such as walking, running, standing still, moving in a vehicle, or the like, has occurred.

Next, as an additional process, the scoring processing unit 109 included in the analysis result processing unit 107 calculates an action score for the action section detected in S301 (S302). Further, action information relating to the action section and the action score and data including a user ID, position information, separately acquired video data of the action, and the like are uploaded (S303). The uploading of S303 may be, for example, uploading from a server that realizes the functions of the sensor data analysis unit 104 and the analysis result processing unit 107 to a server that realizes the service control unit 112. Alternatively, the uploading of S303 may be uploading from a terminal device that realizes the functions of the sensor data analysis unit 104 and the analysis result processing unit 107 to the server that realizes the service control unit 112. When such servers or terminal devices are the same, the uploading is differently read as, for example, registration in an internal database.

The service control unit 112 that has received the upload of the action section detected with respect to individual users and the action score in S303 calculates, for example, a skill level of the user as an additional process (S304). The skill level is calculated on the basis of, for example, a history of action scores calculated for each user. Thus, in the illustrated example, the server realizing the service control unit 112 can use a database holding histories of action scores of users. In addition, the server may be able to use a database holding skill levels of users, and the service control unit 112 that has calculated the skill level in S304 may update the database for the skill levels.

The service control unit 112 updates a location DB on the basis of the results of the processes up to S304 in several examples (S305). The location DB is realized in, for example, a memory or a storage (which may be an external storage connected to a network) that can be used by the information processing device including the service control unit 112, and stores information of locations within geological areas to be provided by the service control unit 112. In the location DB, action information is associated with space information for defining locations. A location referred to here may be, for example, an arbitrary location defined on a map, a grid having a predetermined size, or a pre-defined discrete spot. The definition of a location differs depending on, for example, use forms of location information to be described below. An example in which the location information is used will be further described below.

(4-1. Example of Map Representation)

The service control unit 112 creates, for example, extended map information using action information associated with space information in the location DB (S306). Further, the service control unit 112 draws, for example, a created map in response to a request of a user (S307). Actions that have respectively occurred at locations with the highest frequency are displayed on the map on the basis of action information with respect to a single or a plurality of users as features of the locations. Here, the service control unit 112 considers time information associated with the action information to create the extended map information.

Figure 16:
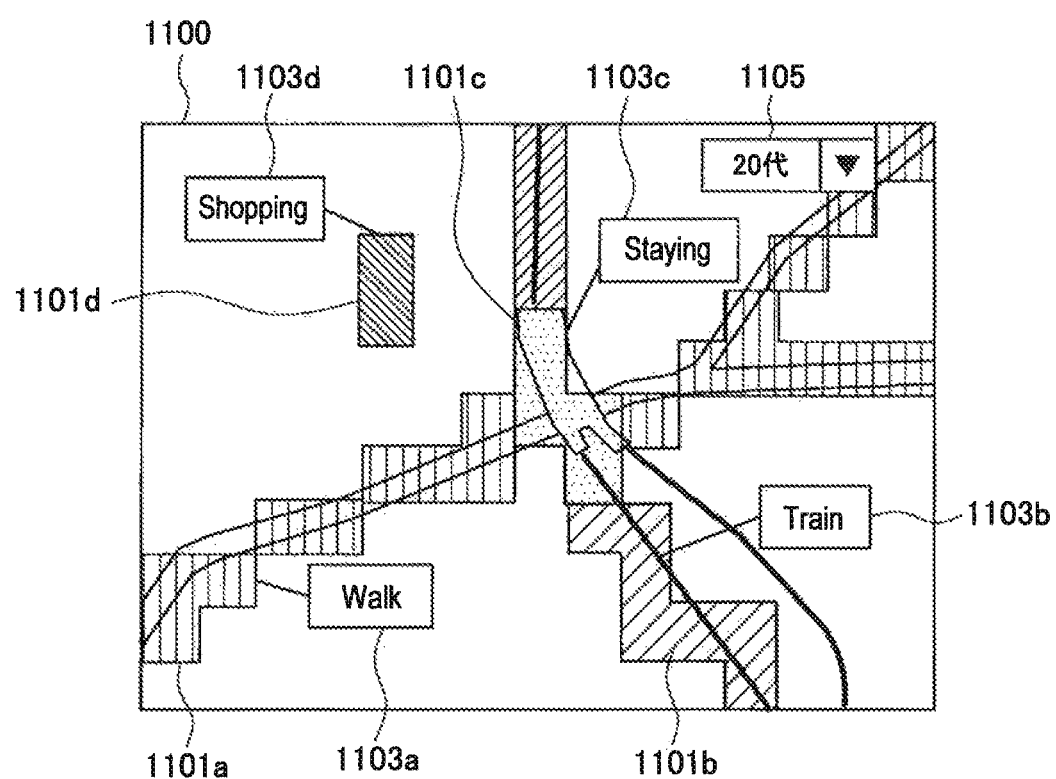
FIG. 16 is a diagram illustrating a first example of a map representation of action information in an embodiment of the present disclosure.

FIG. 16 is a diagram illustrating a first example of a map representation of action information in an embodiment of the present disclosure. In the illustrated example, a map screen 1100 displays patterns 1101 indicating actions that have respectively occurred at locations with high frequencies (a pattern 1101a indicating walking, a pattern 1101b indicating boarding a train, a pattern 1101c indicating staying still, and a pattern 1101d indicating shopping), labels 1103 of the actions (labels 1103a to 1103d corresponding to the patterns 1101a to 1101d), and an attribute selection 1105.

In the illustrated example, it is possible to intuitively ascertain the actions that have respectively occurred at the locations through the patterns 1101 and the labels 1103 on the map screen 1100 of the illustrated example. In addition, in the present example, the service control unit 112 considers a relationship between a time indicated by time information and a reference time to create map information for drawing the map screen 1100. For example, the service control unit 112 executes control such that, as a difference between the time indicated by the time information and the reference time increases, the action information has less influence on map representation.

More specifically, in the example illustrated in FIG. 16, the action information may include scores of a plurality of categories when actions of users are classified into any of the categories (more specifically speaking, the scores may be 1 for a category and 0 for another category of actions specialized by the action detection unit 106, or probabilities of occurrence of actions of each category calculated by the action detection unit 106 may be treated as the scores). In this case, by giving a weight that decreases as a difference between the time indicated by the time information and the current time (the time generated from map information) increases to the scores included in the action information associated with common space information (the position information) and summing the results, the service control unit 112 may decide a category of a representative action associated with common space information in a map representation on the map screen 1100.

In other words, with respect to grids included in the map screen 1100, the service control unit 112 gives a weight based on the time information to the scores of the categories (e.g., walking, train, staying still, shopping, and the like) indicated by the action information associated with space information of the grids and sums the results. As a result, a category for which the highest score has been calculated becomes a category of a representative action associated with a corresponding grid. The patterns 1101 and the labels 1103 displayed on the map screen 1100 correspond to categories of representative actions decided as described above.

Alternatively, the service control unit 112 may cause the patterns 1101 and the labels 1103 to be displayed within the map screen 1100 on the basis of one piece of action information out of available action information which is associated with time information indicating a time of which a difference from the current time is smaller than a threshold value. In this case, the action information extracted on the basis of the difference between the current time and the time indicated by the time information may be uniformly treated, or a process of weighting of scores or the like may be further executed in accordance with the relationship between the current time and the time indicated by the time information as described above.

With the configuration described above, actions occurring in real time can be easily displayed by the patterns 1101 and the labels 1103 on the map screen 1100, and thus actions of users that occur during a time-limited event, an unexpected event, or the like can be appropriately expressed. Note that, a time at which map information is generated may be automatically decided as the current time, or an arbitrary past time may be decided through a user operation or the like as a time that can substitute for the current time. Thus, the current time described in the present specification may be differently read as a reference time for generation of map information.

In addition, for example, the service control unit 112 may cause the patterns 1101 and the labels 1103 to be displayed on the map screen 1100 or execute control such that action information, which is associated with time information having an attribute that is in common with the current time (the time at which map information is generated), more specifically, action information indicating an action that occurred in, for example, the same time slot or season as the current time, has greater influence on the map representation. Similarly to the above-described example, the service control unit 112 may give a weight, which increases as attribute commonality with the current time increases, to scores included in the action information. Alternatively, the service control unit 112 may cause the patterns 1101 and the labels 1103 to be displayed on the map screen 1100 on the basis of a piece of action information out of the available action information, which is associated with the time information whose attribute commonality with the current time exceeds a threshold value.

More specifically, the service control unit 112 may generate map information selectively using action information associated with the same time slot (e.g., morning, afternoon, evening, night, or the like) as the current time. In addition, the service control unit 112 may generate map information selectively using action information associated with the same season (e.g., spring, summer, a vacation season, or the like) as a current season. Note that a time slot, a season, and the like may be arbitrarily selected in the attribute selection 1105 which will be described next. In other words, the attribute selection 1105 is not limited to the selection of an attribute of a user associated with the action information, and may be used in a selection of an attribute of time information associated with the action information.

In addition, in the illustrated example, an attribute of a user whose action is to be displayed using the patterns 1101 and the labels 1103 can be selected with the attribute selection 1105. For example, an age of the user can be selected with attribute selection 1105 as illustrated (20s is selected). In this case, the service control unit 112 generates map information with action information of the user having the selected attribute. In another example, another attribute of the user, more specifically, sex or an occupation, can be selected with the attribute selection 1105. Alternatively, the service control unit 112 may automatically select an attribute of the user whose action is to be displayed for map information in accordance with an attribute or a user or the like who provides the map information.

Figure 17:
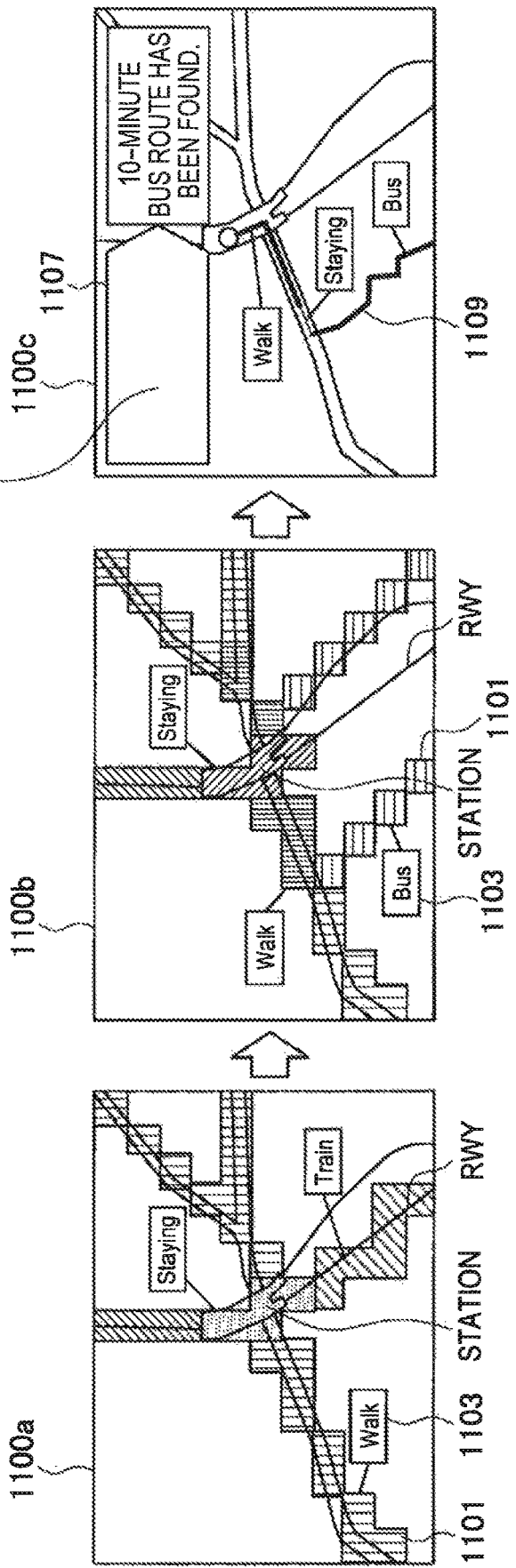
FIG. 17 is a diagram illustrating an example in which the map representation of the example shown in FIG. 16 changes in real time.

FIG. 17 is a diagram illustrating an example in which the map representation of the example shown in FIG. 16 changes in real time. In the illustrated example, actions displayed using the patterns 1101 and the labels 1103 change as illustrated in a map screen 1100b as a result of the fact that an operation of a railway (RWY) transportation service stops ahead of a station (STATION) displayed at the center of a map screen 1100a, which is similar to the example shown in FIG. 16, due to an accident More specifically, the patterns 1101 indicating that a user is on board the train that are displayed along the railway (RWY) gradually disappear, and a new pattern 1101 and label 1103 indicating that the user is on board a bus are instead displayed along another location (a bus route).

Further, in this case, route navigation 1109 based on conditions 1107 that are pre-set or input by a user may be displayed as illustrated on a map screen 1100c. The route navigation 1109 is displayed by, for example, extracting a combination of actions that meet the conditions 1107 from the latest user action detection result as illustrated on the map screen 1100b. More specifically, the route navigation 1109 of the illustrated example is displayed as a combination of walking from the station, staying still, and then boarding the bus. When, for example, the illustrated railway (RWY) is included in a route on which the user plans to travel (which can be determined on the basis of a result of a route search executed in advance, a schedule, and a route on which the user routinely travels), the service control unit 112 may automatically provide route navigation as illustrated on the map screen 1100c on the basis of the fact that no action of another user on board the train is detected thereon as illustrated on the map screen 1100b.

Figure 18:
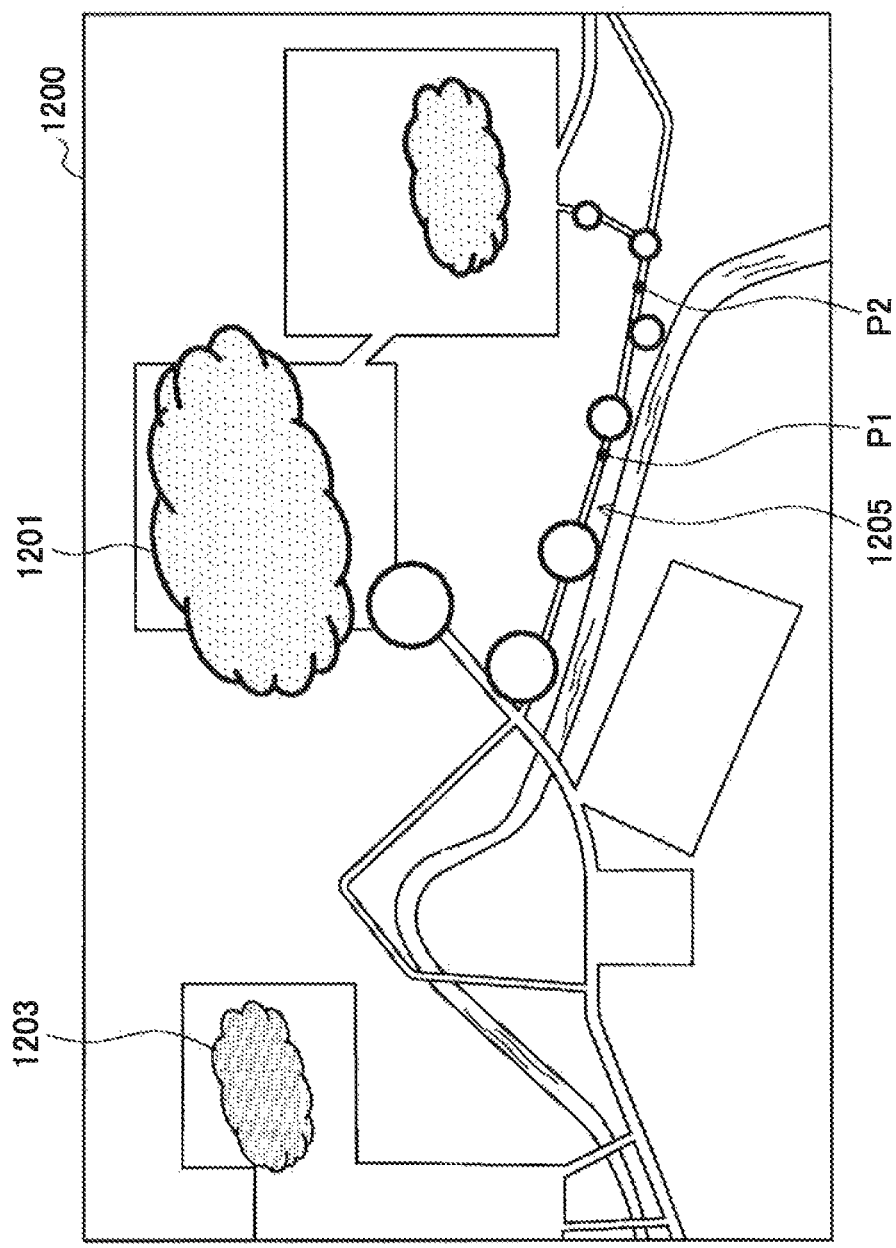
FIG. 18 is a diagram illustrating a second example of a map representation of action information in an embodiment of the present disclosure.

FIG. 18 is a diagram illustrating a second example of a map representation of action information in an embodiment of the present disclosure. In the illustrated example, icons 1201, 1203, and 1205 indicating actions occurring at high frequencies at respective locations are displayed on a map screen 1200. More specifically, the map screen 1200 can show actions occurring, for example, at a venue of an outdoor music festival. In addition, the icons 1201 and 1203 indicate surges of users gathered at the venue and the icon 1205 indicates a movement of the users between venues. With the icons 1201, 1203, and 1205, actions occurring at respective locations can also be intuitively ascertained on the map screen 1200. In addition, also in the present example, the service control unit 112 considers time information associated with action information to create map information for drawing the map screen 1200.

More specifically, for example, the service control unit 112 may give a weight as in the first example described above so that an action that has occurred at a time closer to a current time (a time at which a map is generated) is more strongly reflected. Alternatively, the service control unit 112 may limit action information to be used to specify actions at respective locations to the latest information associated with a time in a predetermined range from the current time. Since the map screen 1200 indicates an action that has occurred at a venue of a music festival as described above, the action occurring during the festival can significantly differ from an action occurring at another time. In such a case, causing an action that has occurred at a time closer to the current time to be more strongly reflected on the map information is effective.

In addition, for example, when actions at respective locations are to be specified, the service control unit 112 may give a weight to action information so that an action that occurred at a time having a common attribute with the current time (the time at which map information is generated), more specifically, during a previous music festival or before the previous music festival, are more strongly reflected. Similarly to the first example, the service control unit 112 may further weight action information on the basis of a time slot, a season, or the like. Although no element for selecting an attribute on the map screen 1200 is illustrated, a similar element to the attribute selection 1105 of the first example can be displayed, and thus an attribute of time information associated with action information to be displayed or an attribute of a user can be selected.

Further, in the example of the map screen 1200, a temporal context of a time indicated by time information associated with action information is considered when specifying actions (displayed with the icons 1201, 1203, and 1205) of respective locations. For example, a movement of a user indicated by the icon 1205 may be determined on the basis of the association of a plurality of pieces of action information, which are each associated with a series of timestamps, with position information changing along a route of the user.

At this time, a direction of the movement can be specified on the basis of the temporal context of the time indicated by the time information associated with the action information. For example, first action information associated with a position P1 shown in FIG. 18 (a position indicated by first space information) and second action information associated with a position P2 (a position indicated by second space information) are assumed. In this case, when time information associated with the second action information indicates a time later than time information associated with the first action information, it is determined that a movement of the user from the position P1 to the position P2 has occurred.

Note that, in the determination of the movement, a condition that action information indicates an action resulting from a movement such as walking or running may be set, or the action information may indicate another type of action such as staying still or jumping. Since users sometimes perform sluggish movements in a venue of a festival, there can also be cases in which movements of users are detected on the basis of positions indicated by space information associated with action information and a temporal context of a time indicated by time information as described above.

In addition, in the example with respect to the map screen 1200, the scoring processing unit 109 included in the analysis result processing unit 107 uses action scores calculated on the basis of action information to specify actions performed at respective locations. For example, all of the icons 1201 and 1203 indicate surges of users gathered at venues. The surges of users are detected on the basis of, for example, how many users are gathered at the venues. At this time, the scoring processing unit 109 calculates action scores of jumps, and the service control unit 112 may cause the icon 1201, which indicates a greater surge, to be displayed when there are many users who are actively jumping. In addition, when the fact that many users have gathered but are modestly jumping or not jumping is indicated 16 using an action score, the service control unit 112 may cause the icon 1203 indicating a gentle surge to be displayed. In addition, not only actions detected on the basis of a value of an acceleration sensor or the like as in the above-described example, but also information of pulses, sweating, or the like detected by a biological sensor mounted on a user may be used for detecting a surge of users. Furthermore, since the action information is associated with the time information in the present embodiment, it is possible to separately display a venue in which a surge is about to begin and a venue in which a surge has already passed its peak even though degrees of instantaneous surges are the same in the venues on the basis of whether the number of gathered users or jumping users is continuously increasing or decreasing.

A variety of modified examples of the present embodiment can be made in addition to the two examples described above with reference to FIGS. 16 to 18. For example, actions are not limited to the exemplified patterns, text, and icons, and may be displayed on a map using an animation using human symbols or avatars. In addition, action scores may be reflected not only in the display of icons as in the example shown in FIG. 18 but also a density of a pattern in the example shown in FIGS. 16 and 17 or a font of text. In addition, the actions displayed on the map may be classified into pre-given categories or in accordance with a result of clustering by the clustering processing unit 108 included in the analysis result processing unit 107.

In addition, the above-described example is not limited to a downtown area or a venue of a festival shown in FIGS. 16 to 18, and can be applied to maps of a variety of locations. For example, with respect to a fireworks festival, maps indicating how to access a venue (walking, using a bicycle, and the like), and how users can enjoy the venue (standing, sitting, eating, and the like) can be provided. In addition, in a case of a ski resort (a terrain park), for example, it is possible to display information that displays whether a slope is congested on the basis of many sliding users, displays a long waiting time for a ski lift (when actions of staying still continuously for a long time are detected prior to an action of getting on the ski lift or the like), or displays bumpiness created on snow (since the snow changes every day, a map display based on the latest actions is effective) on the basis of the fact that there are many jumping users. In addition, a jump with a long air time may be separately detected from normal jumps, and a ski course on which many such jumps are detected may be specified as a slope for high level skiers. In this case, skill levels of users may be considered to specify a slope.

(4-2. Generation of Safety Map)

With reference to FIG. 15 again, for example, the service control unit 112 calculates a degree of safety and/or risk using the action information associated with the space information in the location DB (S308). Further, the service control unit 112 updates a safety map DB on the basis of the calculated degree of safety and/or risk (S309), and draws a safety map on the basis of the content of the safety map DB in accordance to, for example, a request of the user (S310).

Here, the degree of safety and/or risk may be calculated for, for example, a location on a course at which a specific sport is performed, like a ski or snowboarding course, a running course, or the like. More specifically, for example, a degree of risk may be determined to be high for a location at which many toppling actions are detected during skiing or snowboarding. At this time, a skill level of a user associated with a toppling action may be considered. Likewise, a degree of safety may be considered to be high for a location at which many successful actions are detected during skiing or snowboarding. In this case, a skill level of a user associated with a successful action may also be considered.

In a case of skiing or snowboarding, for example, a location at which users with a high skill level have toppled is assumed to have a high degree of risk. On the other hand, a location at which users with a high skill level have not toppled but only users with a low skill level have toppled is assumed to have a low degree of risk for users with a high skill level. In addition, a location at which no users with a low skill level have toppled and at which the users with a low skill level have succeeded in jumping and turning is assumed to have a low degree of risk or a high degree of safety.

Here, as described above, a skill level can be calculated on the basis of an action score by the service control unit 112 as an additional process with respect to an analysis result of sensor data. The action score can be calculated by the scoring processing unit 109 included in the analysis result processing unit 107. Thus, when a skill level of a user who has executed an action is considered to create a safety map in the present embodiment, the service control unit 112 can be said to consider information of an action score included in the action information further.

In addition, in a case of running, for example, a degree of risk can be estimated additionally using information of a pulse, sweating, or the like detected by a biological sensor mounted on a user. More specifically, the action detection unit 106 may detect jogging at a constant tempo as an action. In this case, when a user suddenly ends a jogging action performed at a given temp without lowering a speed or a transition to walking (running suddenly stops) and a tension state of the user is simultaneously indicated on the basis of information of a pulse, sweating, or the like (the user trembles), the service control unit 112 can assume that a dangerous incident has occurred on a running route (e.g., the user almost had a collision with a car, a bicycle, or another runner). The service control unit 112 can assume a location at which many dangerous incidents detected as described above have occurred to have a high degree of risk. The example is not limited to sports, and a degree of safety and/or risk may be calculated likewise for a driving route and a walking route.

In a case of skiing and snowboarding, a degree of risk or safety of courses changes every second in accordance with atmospheric conditions, for example, temperatures, weathers, and the like. For example, the same location of a course that is safe one day can be dangerous the next day, or that is dangerous in the morning can be safe as the temperature rises in the afternoon. Likewise, a degree of risk or safety of a running course or a driving course can change every second in accordance with atmospheric conditions, traffic situations, and the like. For this reason, also in the present example in which a safety map is generated, for example, reflecting an action that has occurred at a time closer to a current time more strongly on map information as in the examples described above with reference to FIGS. 16 to 18 is effective.

Figure 19:
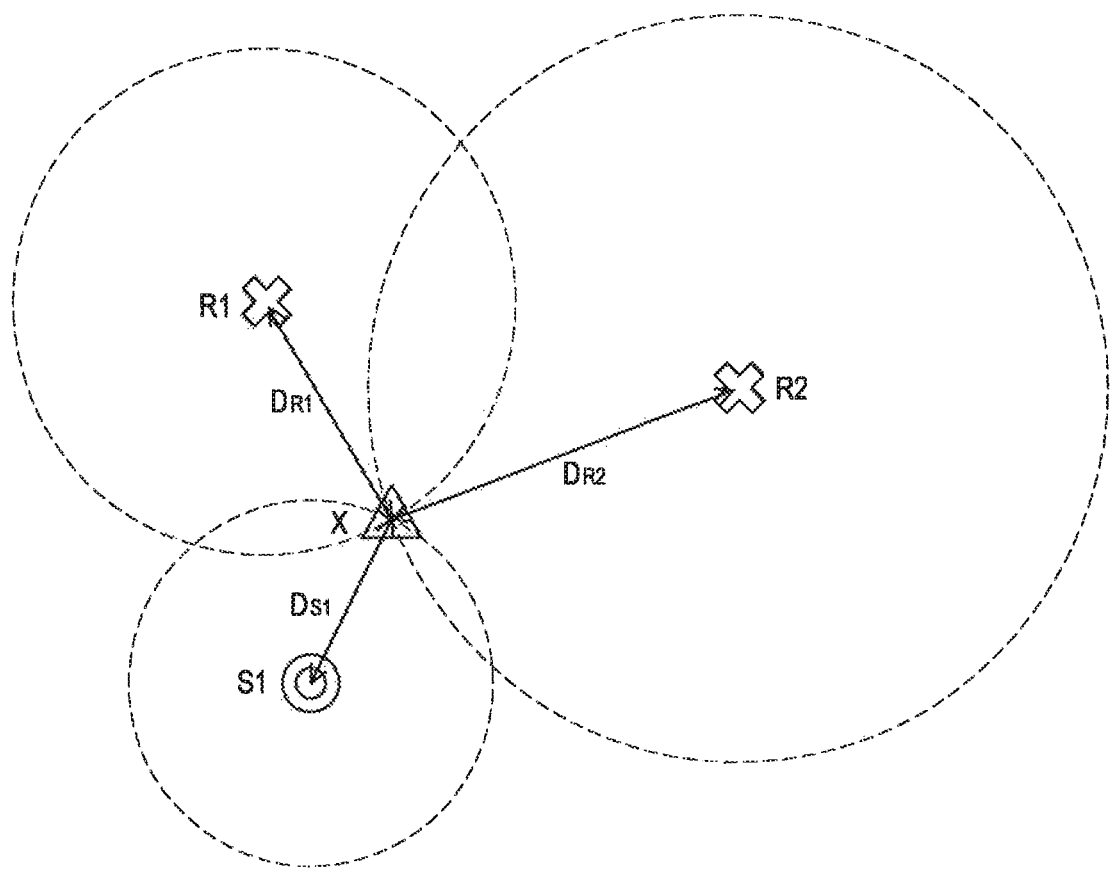
FIG. 19 is a diagram illustrating an example of safety map generation in an embodiment of the present disclosure.

FIG. 19 is a diagram illustrating an example of safety map generation in an embodiment of the present disclosure. In FIG. 19, an example of a method of estimating a degree of risk or safety of an entire course from an action detected at a limited location when, for example, degrees of risk or safety are consecutively distributed as in a ski or snowboarding course is shown. In the drawing, R1 and R2 represent positions at which toppling has occurred, S1 represents a position at which an action has succeeded, and X represents an arbitrary position of which a degree of risk or safety is to be calculated. A process for generating a safety map in the illustrated example will be further described below.

First, the service control unit 112 calculates, for example, degree-of-risk scores $P_{R1}$ and $P_{R2}$ for the positions R1 and R2, and a degree-of-safety score $P_{S1}$ at the position S1 using the following formulas 1 to 3.

[Math. 1]

$$P_{R1} = W_{LV} \cdot \text{Power}_{R1} \cdot W_R \cdot \frac{1}{t_{PASS\_R1}} \quad \text{(Formula 1)}$$

$$P_{R2} = W_{LV} \cdot \text{Power}_{R2} \cdot W_R \cdot \frac{1}{t_{PASS\_R2}} \quad \text{(Formula 2)}$$

$$P_{R1} = W_{LV} \cdot \text{Score}_{S1} \cdot W_S \cdot \frac{1}{t_{PASS\_S1}} \quad \text{(Formula 3)}$$

Here, $W_{LV}$ is a weighting coefficient corresponding to a skill level of a user associated with toppling or a successful action. In the degree-of-risk scores $P_{R1}$ and $P_{R2}$ (a negative evaluation of an actions), the scores are corrected to be higher as a skill level of a user is higher since $W_{LV}$ is inserted thereinto. Meanwhile, in the degree-of-safety score Psi (a positive evaluation of actions), the score is corrected to be lower as a skill level of a user is higher since an inverse of $W_{LV}$ is inserted thereinto. Power$_{R1}$ and Power$_{R2}$ are intensities of impacts detected at a time of toppling. In this example, an intensity of an impact is treated as if it corresponds to an action score of toppling. Score$_{S1}$ is an action score calculated for a successful action (e.g., a jump or a turn).

In addition, $W_R$ and $W_S$ are weighting coefficients respectively set for an action (e.g., toppling) corresponding to a degree-of-risk score and an action (e.g., a successful jump or turn) corresponding to a degree-of-safety score. $t_{PASS\_R1}$, $t_{PASS\_R2}$, and $t_{PASS\_S1}$ are elapsed times after the occurrence of the respective actions occur until generation of a safety map (e.g., a current time). As is understood from the fact that inverses of the times are respectively inserted into $P_{R1}$, $P_{R2}$, and $P_{S1}$, influence of an action on the degree-of-safety scores and degree-of-risk score decreases in the present embodiment as time elapses after the action occurs. Note that, although the degree-of-safety scores and degree-of-risk score are set to be inversely proportional to the elapsed time in the illustrated example, the scores may be set to be inversely proportional to an arbitrary function including the elapsed time.

Next, the service control unit 112 averages the calculated degree-of-risk scores and degree-of-safety score with respect to distances from each of the positions R1, R2, and S1 to a position X, which is a calculation target, sums the results, and thereby calculates a score $P_X$ of the position X.

[Math. 2]

$$P_X = \frac{P_{S1}}{D_{S1}} - \frac{1}{2}\left(\frac{P_{R1}}{D_{R1}} + \frac{P_{R2}}{D_{R2}}\right) \quad \text{(Formula 4)}$$

Here, $D_{R1}$, $D_{R2}$, and $D_{S1}$ are the distances from the positions R1, R2, and S1 to the position X illustrated in FIG. 19. When the score $P_X$ is calculated in the above example, the degree-of-safety scores are summed as positive values and the degree-of-risk scores are summed as negative values. Note that, although the summed degree-of-safety scores and degree-of-risk scores decrease in inverse proportion to the distances in the illustrated example, the scores may decrease in inverse proportion to an arbitrary function including the distances. In this case, values of the weighting coefficients $W_R$ and $W_S$ may be adjusted to make determinations that, the position X is relatively safe if the score $P_X$ has a positive value, and the position X is relatively dangerous if the score $P_X$ has a negative value.

Note that the calculation of the score $P_x$ shown in the above-described Formula 4 can be generalized as the following Formula 5 when there are positions R1 to Rm (m=1, 2, ...) at which toppling has occurred and positions S1 to Sn (n=1, 2, ...) at which actions have succeeded. In the case of Formula 5, if it is assumed that no action to which a degree-of-safety score or a degree-of-risk score is likely to be given has occurred at the position X (space information indicating the position X is not associated with the action information), the action information associated with the space information indicating the position X can be said to be estimated on the basis of a distance between a position Sk or Rj (a position indicated by the space information associated with the action information) at which an action to which a degree-of-safety score or a degree-of-risk score is likely to be given and the position X.

[Math. 3]

$$P_X = \frac{1}{n}\sum_{k=1}^{n}\frac{P_{Sk}}{D_{Sk}} - \frac{1}{m}\sum_{j=1}^{m}\frac{P_{Rj}}{D_{Rj}} \quad \text{(Formula 5)}$$

When, for example, the generation of such a safety map is implemented for a ski resort, it is possible to reflect an environmental change of a slope on the safety map by generating the map on the basis of the latest action information. In addition, a degree-of-risk score and a degree-of-safety score may be calculated in accordance with a skill level of a user who will refer to the safety map. In this case, for example, the above-described weighting coefficient $W_{LV}$ corresponding to the skill level of the user may be set to be variable in accordance with the skill level of the user who will refer to the safety map (e.g., the coefficient $W_{LV}$ may be set to be 1 when a skill level of a user who performed an action is the same as the skill level of the user who will refer to the safety map).

With the configuration described above, for example, a safety map appropriate for an environmental condition, such as a time slot or a climate, and a skill level of each user can be created, and thereby a course in which users can enjoy downhill skiing safely can be provided. For example, a case in which a place freezes in the morning so that even users with a high skill level (advanced users) topples thereon, but snow falls and piles up in the afternoon so that users with a low skill level (beginning users) can safely slide thereon is considered. According to the present embodiment, a course including the place is not presented to at least beginning users as a safe course in the morning, but can be presented even to the beginning users as a safe course from the afternoon on.

The safety map described in the above example is not necessarily limited to being generated for a course of a sport such as skiing, and may be generated for, for example, daily lives. More specifically, for example, when there is a road whose surface is in a bad condition due to rainfall or snowfall, it is possible to search for a route for safely moving to a destination by bypassing the road (e.g., which is determined to be dangerous on the basis of the fact that toppling of another user or the like has actually occurred) or a route on which a user can arrive at a destination within a shortest time while fully aware of risk.

In addition, the standard of safety and risk in the above-described example may be replaced with another standard of positivity and negativity, specifically, for example, a standard of comfort and discomfort. As such an example, in case of train transportation, for example, when an inside of a train is detected to be congested, an action of boarding the train is understood as a discomfort action, and a route for comfortably moving to a destination avoiding a congested line and a route on which a user can arrive at a destination within the shortest time while fully aware of the congestion may be searched for.

(4-3. Provision of Navigation)

Referring to FIG. 15 again, for example, the service control unit 112 may provide navigation on the basis of a past action history of another user using action information associated with space information stored in the location DB. More specifically, the service control unit 112 executes matching an action history of a first user detected up to a certain time point with a past action history of another user (a second user) on the basis of space information for (S311). In the matching, for example, action history of the second user detected along a similar traveling route to a traveling route of the first user up to a certain time point can be extracted. At this time, the action history may be extracted in consideration of an associated skill level of the user. In addition, the action history may be extracted in consideration of an action history of the first user detected in the past. The service control unit 112 may match the action history of the first user and the action history of the second user in consideration of a co-occurrence probability and a transition probability. The service control unit 112 computes a route on the basis of the extracted action history (S312) and presents the first user with navigation (S313).

Figure 20:
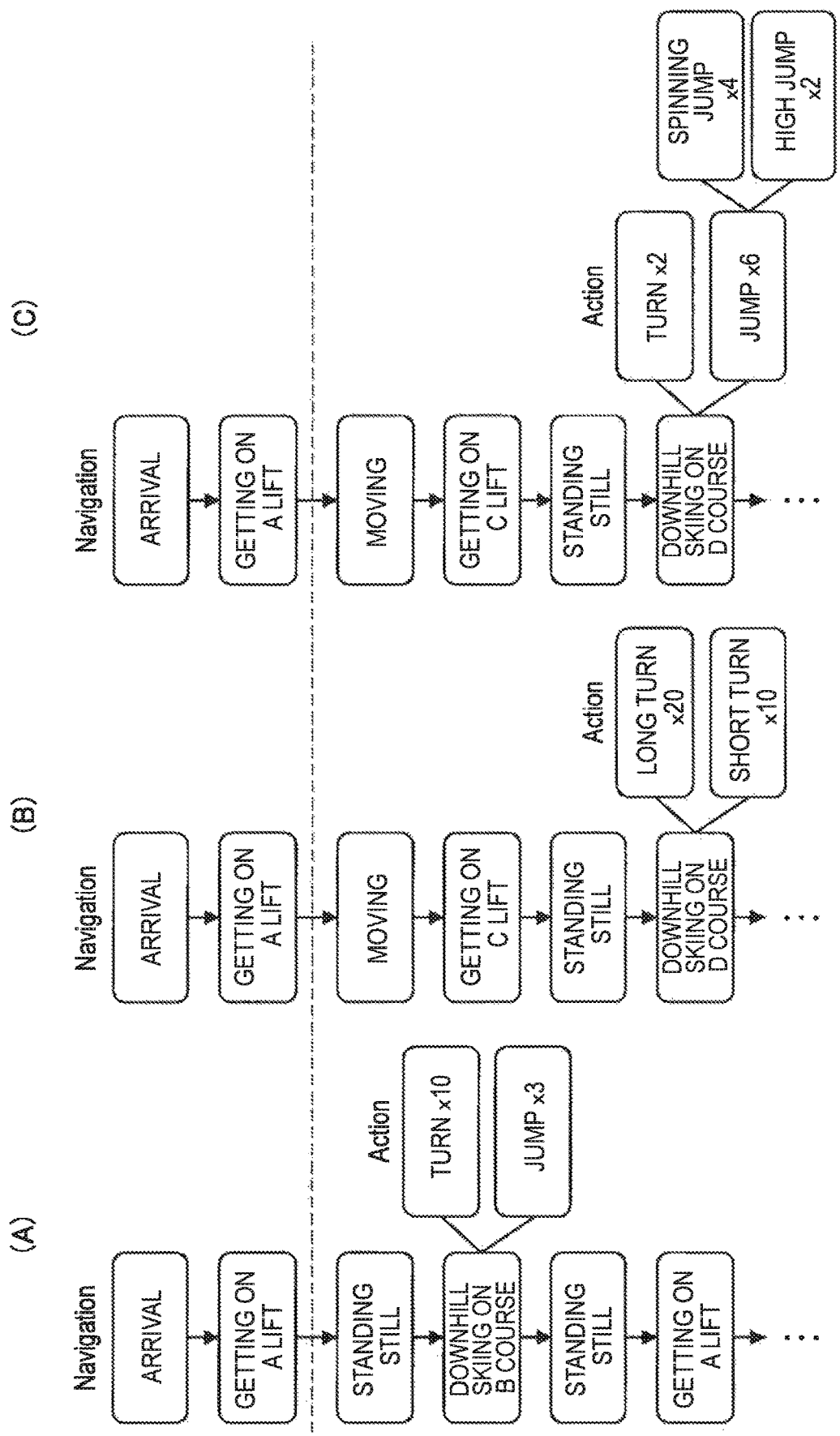
FIG. 20 is a diagram for describing an example of navigation in consideration of a skill level and an action history in an embodiment of the present disclosure.

FIG. 20 is a diagram for describing an example of navigation in consideration of skill levels and action histories in an embodiment of the present disclosure. In FIG. 20, examples of three types of navigation (A) to (C) for a ski resort. It is assumed that, for example, the first user arrives at the ski report and gets on a lift A. At this time, when the first user is a beginning user with a low skill level, the service control unit 112 presents the illustrated route (A). The route (A) is, for example, a route extracted on the basis of the past action history of the second user who is also a beginning user, and includes downhill skiing on a course B.

Thereafter, it is assumed that the first user has actually skied down the course B and performed actions including a turn and a jump. Here, when it is detected that action scores of the actions were high or the actions were failures (toppling or the like), the service control unit 112 repeatedly presents the first user with the route (A) including downhill skiing of the course B for the next time. When it is detected that scores of actions such as a turn and a jump performed by the first user when the first user actually skies down the course B are high and the actions were not failures (toppling or the like), the service control unit 112 presents the first user getting on the lift A again with a route (B) or (C) extracted on the basis of past actions of a second user who is an intermediate user with a high skill level. With respect to the routes, downhill skiing of a course D is included.

Here, for example, when an action score for a turn of the first user obtained when the first user skies down the B course is particularly high, the service control unit 112 presents the route (B) including navigation for a course of the course D which passes a location at which many turns occur. In addition, when an action score for a jump of the first user is particularly high, the service control unit 112 presents the route (C) including navigation for a course of the course D which passes a location at which many jumps occur. The navigation for the courses included in the routes (B) and (C) are provided on the basis of, for example, routes on which users who performed especially many turns and users who performed especially many jumps among users who skied down the course D in the past. Note that, when the first user actually skies down the course D in accordance with the presentation of the route (B) or (C) and a failure (toppling or the like) in an action such as a turn or a jump has been detected, the service control unit 112 may present the first user with the route (A) again.

Note that, when the first user is an intermediate user with a high skill level in the above-described example, the service control unit 112 may present the first user with the route (B) or (C) from the beginning. In this case, which one of the route (B) appropriate for performing many turns or the route (C) appropriate for performing many jumps should be presented can be determined on the basis of a ratio between turns and jumps performed in actions with respect to a past action history of the first user (not relating to position information) or action scores of turns and actions included in the action history.

A process for providing the above-described navigation can be described as follows. In the above example, the action information acquired by the service control unit 112 includes a first action information series (corresponding to the action of the first user) associated with a first series of space information (which corresponds to a route from arrival at a ski resort to getting on the lift A) and a second action information series (corresponding to the action of the second user) associated with a second series of space information (the route (A), (B), or (C)). The second action information series is associated with time information indicating a time earlier than the first action information series. At this time, on the basis of the fact that a first traveling route indicated by the first series of space information partially coincides with a second traveling route indicated by the second series of space information (a part from the arrival at the ski resort to the getting on the lift A), the service control unit 112 provides navigation to a user (the first user) associated with the first action series on the basis of the second action information series associated with the second series of the space information indicating the remaining part of the second traveling route (a part after the user gets off the lift A).

With the above-described configuration, navigation is provided on the basis of a route other users select and then an action that occurs in the present embodiment, unlike, for example, navigation for detecting a shortest route from a current location to a destination using Dijkstra's algorithm. Thus, it is possible in the present embodiment to present routes that differ depending on purposes even in navigation for the same location to a user.

As an example other than a ski resort, in a case of a presentation of a route to go down a mountain, when a first user walks (hikes) down the mountain, navigation based on an action history of a second user who walked down the mountain in the past is presented, and when the first user runs (trails) down the mountain, navigation based on an action history of a second user who ran down the mountain in the past can be provided. In addition, a condition for searching for the action history of the second user may be set on the basis of an attribute or preference including a skill level of the first user without being limited to a history of actions that the first user actually performed thus far. Furthermore, by setting a weight for easing detection of an action history of the second user that satisfies a condition such as a time slot, a season, or weather, there is a high possibility of navigation appropriate for a current situation of the first user being provided.

(4-4. Change of Action Detection Setting)

Referring to FIG. 15 again, for example, the service control unit 112 may change a setting for action detection using action information associated with space information stored in the location DB. More specifically, the service control unit 112 extracts an action detection tendency for each position indicated by the space information from information stored in the location DB (S314). The service control unit 112 adjusts the setting for action detection in accordance with the extracted action detection tendency. More specifically, the service control unit 112 updates a parameter table that, for example, the action detection unit 106 included in the sensor data analysis unit 104 refers to (S315).

Figure 21:
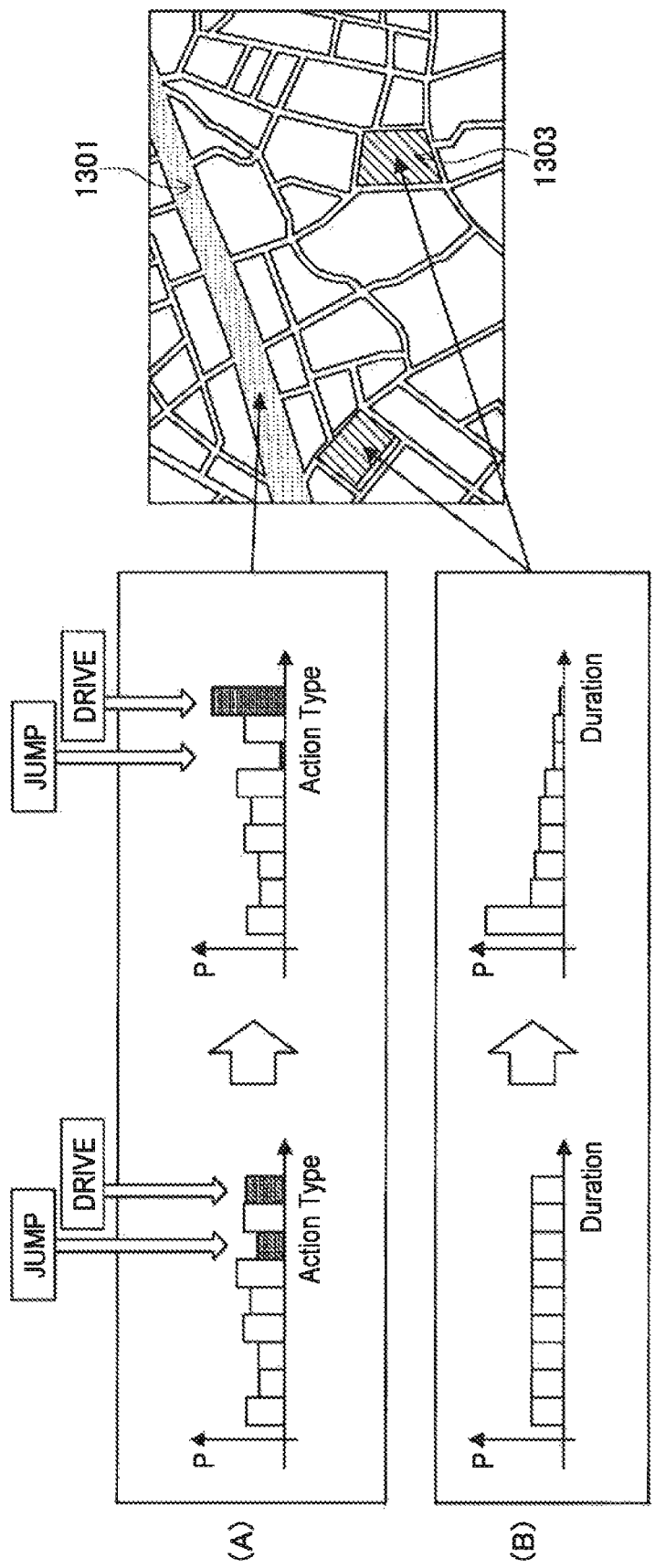
FIG. 21 is a diagram for describing an example of a change in an action detection setting in an embodiment of the present disclosure.
Figure 22:
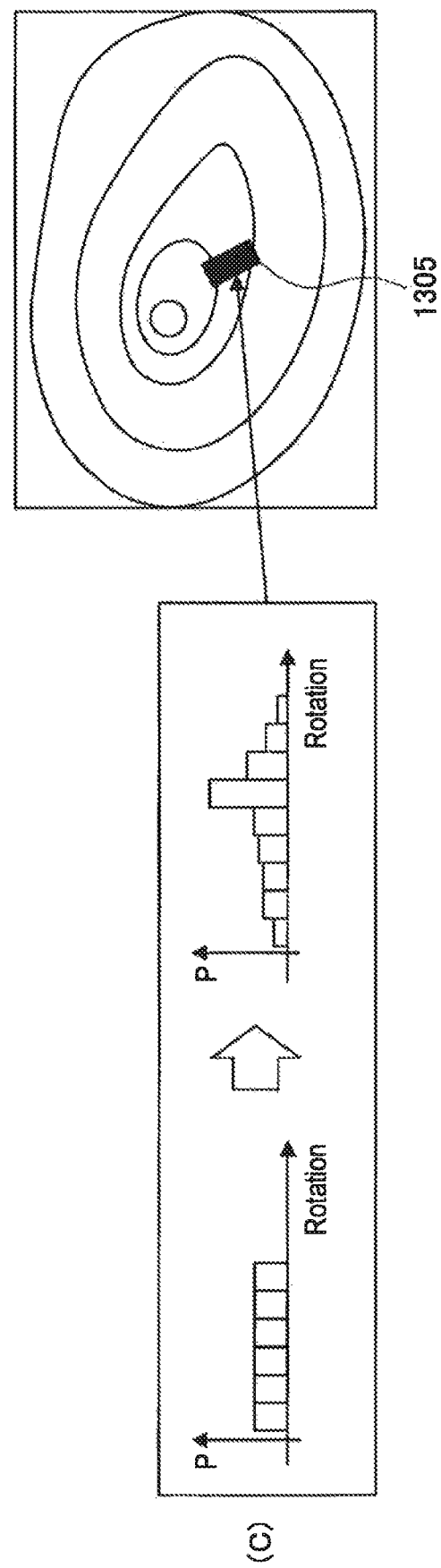
FIG. 22 is a diagram for describing an example of a change in an action detection setting in an embodiment of the present disclosure.

FIGS. 21 and 22 are diagrams for describing examples of changes in action detection settings in an embodiment of the present disclosure. (A) is an example of a change in an action detection setting for an area of an illustrated road 1301. In this example, since many pieces of action information associated with space information indicating the area of the road 1301 in the location DB indicate "drive," "jump," which is sometimes detected, is assumed to be an erroneous detection, and a probability of "jump" is lowered and a probability of "drive" is raised in a setting of parameter of an occurrence probability for each type of action in that area. Thus, in the area of the road 1301, for example, there is a high probability that a confusing action, for which it is hard to determine whether the action is "jump" or "drive," will be determined as "drive," and consequently, a probability that "jump," which is an erroneous detection, will be detected is lowered.

(B) is an example of a change in an action detection setting for an illustrated area 1303. There is a nightclub in the area 1303, jumps of users, who are amused by provided music, with a short duration in a vertical direction tend to be consecutively detected. In this case, with respect to a detection probability of jumps for each duration, a detection probability of jumps with a short duration may be raised. Accordingly, jumps are precisely detected, and a flourishing nightclub can be expressed on a map using, for example, a frequency of jumps or the number of jumping users (e.g., this example can be applied to the example of a music festival shown in FIG. 18 in the same manner).

(C) is an example of a change in an action detection setting for a place of a kicker 1305 provided on a course of a ski resort. There is a tendency in the kicker that jumps including rotations are detected as actions. For example, snowboarding jumps are frequently accompanied by a lot of rotation (e.g., in excess of 360 degrees) that is not likely to normally occur. Thus, when a place of the kicker 1305 is given in advance or the presence of the kicker 1305 is assumed on the basis of a detection result of an action (in which many jumps are detected during downhill snowboarding), a range of an amount of rotation detectable in action detection may be expanded (e.g., a normal range of 360 degrees may be expanded to a range including 720 degrees or 1080 degrees), and then a detection probability of a jump may be raised.

(4-5. Calculation of Level of Facility)

Referring to FIG. 15 again, for example, the service control unit 112 searches position information included in the data uploaded in S303 for an ID of a facility in which an action has been detected (S316), calculates a level of the facility on the basis of a distribution of an action score of the action detected in the facility and a skill level of a user who has performed each action (S317), and provides facility data including information of the level of the facility (S318).

When a level of a facility is calculated, for example, a low level (indicating a low level of difficulty) may be given to a facility in which low-scoring actions of many users are detected regardless of their skill levels. On the other hand, a high level (indicating a high level of difficulty) may be given to a facility in which high-scoring actions of users having high skill levels are detected. In addition, detection of an action such as toppling (indicating a failure of an attempted action) may also be reflected on a level of a facility. A level indicating a degree of popularity in accordance with the number of users whose actions are detected can also be calculated without limiting the calculation to a level indicating a level of difficulty as described above.

Note that a facility can have a variety of forms, for example, a course, a court, a field, and the like, depending on a type of sport in which an action occurs. In addition, with respect to an example of skiing, facilities can be defined in various units, like a park including a plurality of courses, a specific jump ramp on a course, and the like. Likewise in other sports, facilities can be defined in various units. In addition, although it is assumed in the illustrated example that an ID of a facility is searched for on the basis of position information, the service control unit 112 may specify an ID of a facility from space information associated with action information with reference to the location DB.

(5. Hardware Configuration)

Figure 23:
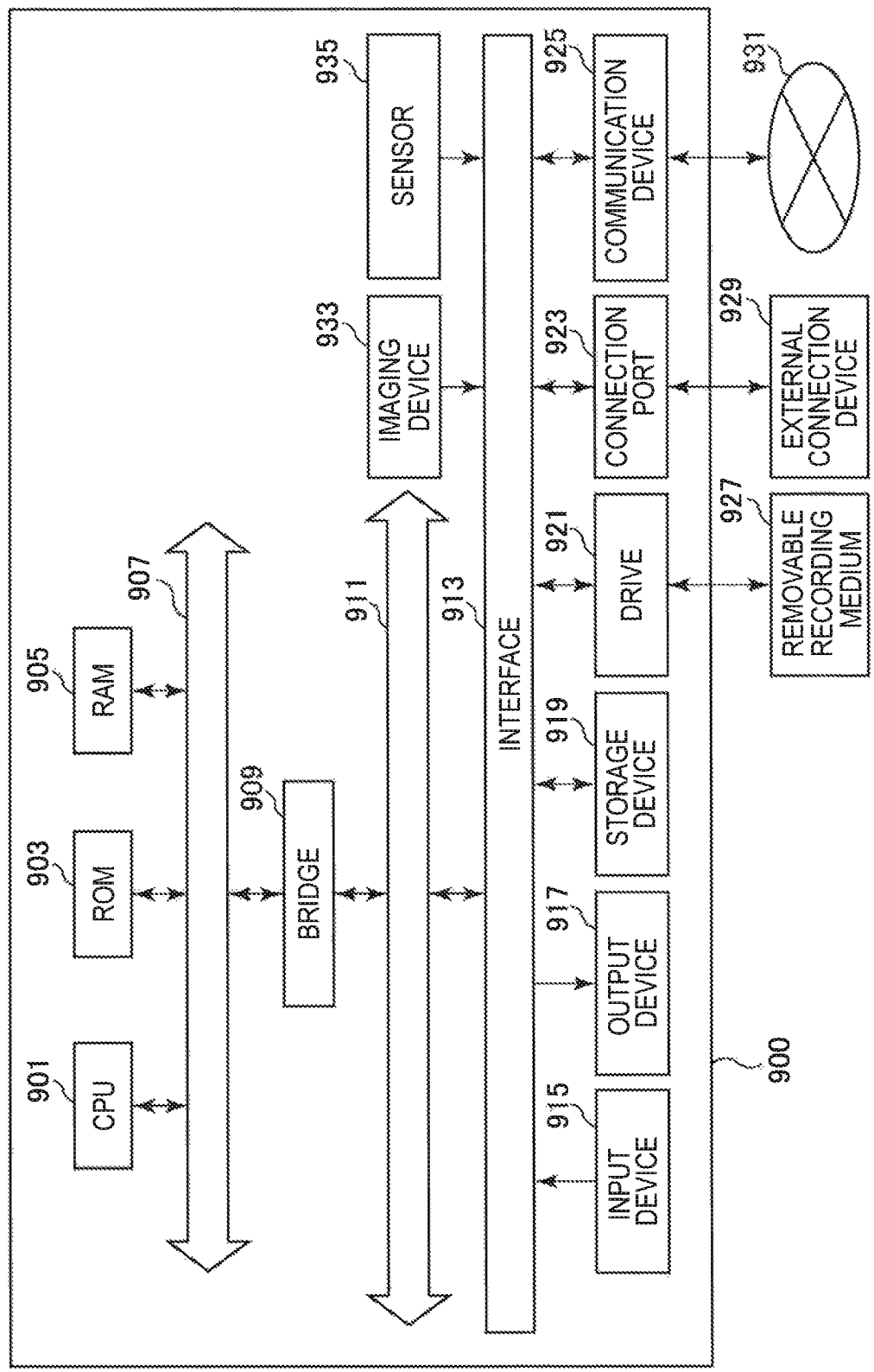
FIG. 23 is a block diagram illustrating a hardware configuration example of an information processing device according to an embodiment of the present disclosure.

Next, with reference to FIG. 23, a hardware configuration of an information processing device according to an embodiment of the present disclosure is explained. FIG. 23 is a block diagram illustrating a hardware configuration example of an information processing device according to the embodiment of the present disclosure.

The information processing device 900 includes a central processing unit (CPU) 901, read only memory (ROM) 903, and random access memory (RAM) 905. In addition, the information processing device 900 may include a host bus 907, a bridge 909, an external bus 911, an interface 913, an input device 915, an output device 917, a storage device 919, a drive 921, a connection port 923, and a communication device 925. Moreover, the information processing device 900 may include an imaging device 933, and a sensor 935, as necessary. The information processing device 900 may include a processing circuit such as a digital signal processor (DSP), an application-specific integrated circuit (ASIC), or a field-programmable gate array (FPGA), alternatively or in addition to the CPU 901.

The CPU 901 serves as an arithmetic processing apparatus and a control apparatus, and controls the overall operation or a part of the operation of the information processing device 900 according to various programs recorded in the ROM 903, the RAM 905, the storage device 919, or a removable recording medium 927. The ROM 903 stores programs, operation parameters, and the like used by the CPU 901. The RAM 905 transiently stores programs used when the CPU 901 is executed, and various parameters that change as appropriate when executing such programs. The CPU 901, the ROM 903, and the RAM 905 are connected with each other via the host bus 907 configured from an internal bus such as a CPU bus or the like. The host bus 907 is connected to the external bus 911 such as a Peripheral Component Interconnect/Interface (PCI) bus via the bridge 909.

The input device 915 is a device operated by a user such as a mouse, a keyboard, a touch panel, a button, a switch, and a lever. The input device 915 may be a remote control device that uses, for example, infrared radiation and another type of radiowave. Alternatively, the input device 915 may be an external connection device 929 such as a mobile phone that corresponds to an operation of the information processing device 900. The input device 915 includes an input control circuit that generates input signals on the basis of information which is input by a user to output the generated input signals to the CPU 901. A user inputs various types of data to the information processing device 900 and instructs the information processing device 900 to perform a processing operation by operating the input device 915.

The output device 917 includes an apparatus that can report acquired information to a user visually, audibly, or haptically. The output device 917 may be, for example, a display device such as a liquid crystal display (LCD) or an organic electro-luminescence (EL) display, an audio output device such as a speaker or a headphone, or a vibrator. The output device 917 outputs a result obtained through a process performed by the information processing device 900, in the form of video such as text and an image, sounds such as voice and audio sounds, or vibration.

The storage device 919 is an apparatus for data storage that is an example of a storage unit of the information processing device 900. The storage device 919 includes, for example, a magnetic storage device such as a hard disk drive (HDD), a semiconductor storage device, an optical storage device, or a magneto-optical storage device. The storage device 919 stores therein the programs and various data executed by the CPU 901, various data acquired from an outside, and the like.

The drive 921 is a reader/writer for the removable recording medium 927 such as a magnetic disk, an optical disc, a magneto-optical disk, and a semiconductor memory, and built in or externally attached to the information processing device 900. The drive 921 reads out information recorded on the mounted removable recording medium 927, and outputs the information to the RAM 905. The drive 921 writes the record into the mounted removable recording medium 927.

The connection port 923 is a port used to connect devices to the information processing device 900. The connection port 923 may include a Universal Serial Bus (USB) port, an IEEE1394 port, and a Small Computer System Interface (SCSI) port. The connection port 923 may further include an RS-232C port, an optical audio terminal, a High-Definition Multimedia Interface (HDMI) (registered trademark) port, and so on. The connection of the external connection device 929 to the connection port 923 makes it possible to exchange various data between the information processing device 900 and the external connection device 929.

The communication device 925 is a communication interface including, for example, a communication device for connection to a communication network 931. The communication device 925 may be, for example, a communication card for a wired or wireless local area network (LAN), Bluetooth (registered trademark), a near field communication (NFC), or a wireless USB (WUSB). The communication device 925 may also be, for example, a router for optical communication, a router for asymmetric digital subscriber line (ADSL), or a modem for various types of communication. For example, the communication device 925 transmits and receives signals in the Internet or transits signals to and receives signals from another communication device by using a predetermined protocol such as TCP/IP. The communication network 931 to which the communication device 925 connects is a network established through wired or wireless connection. The communication network 931 may include, for example, the Internet, a home LAN, infrared communication, radio communication, or satellite communication.

The imaging device 933 is an apparatus that captures an image of a real space by using an image sensor such as a charge coupled device (CCD) and a complementary metal oxide semiconductor (CMOS), and various members such as a lens for controlling image formation of a subject image onto the image sensor, and generates the captured image. The imaging device 933 may capture a still image or a moving image.

The sensor 935 is various sensors such as an acceleration sensor, an angular velocity sensor, a geomagnetic sensor, an illuminance sensor, a temperature sensor, a barometric sensor, a pressure sensor, a distance sensor, and a sound sensor (microphone). The sensor 935 acquires information regarding a state of the information processing device 900 such as a posture of a housing of the information processing device 900, and information regarding an environment surrounding the information processing device 900 such as luminous intensity and noise around the information processing device 900. The sensor 935 may include a global navigation satellite system (GNSS) receiver that receives GNSS signals to measure latitude, longitude, and altitude of the apparatus.

The example of the hardware configuration of the information processing device 900 has been described. Each of the structural elements described above may be configured by using a general purpose component or may be configured by hardware specialized for the function of each of the structural elements. The configuration may be changed as necessary in accordance with the state of the art at the time of working of the present disclosure.

(6. Supplement)

The embodiments of the present disclosure may include, for example, the above-described information processing device, the above-described system, the information processing method executed by the information processing device or the system, a program for causing the information processing device to exhibits its function, and a non-transitory physical medium having the program stored therein.

(7. Examples of Apparatus Control)

Several examples of apparatus control included in an embodiment of the present disclosure will be described below.

(7-1. First Example)

Figure 24:
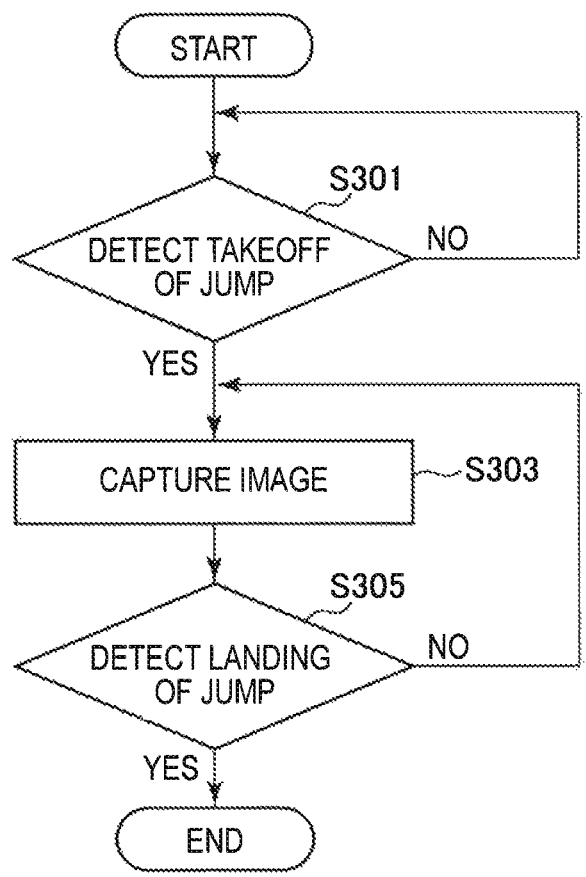
FIG. 24 is a flowchart showing a process of a first example of apparatus control included in an embodiment of the present disclosure.

FIG. 24 is a flowchart showing a process of a first example of the apparatus control included in an embodiment of the present disclosure. In the present example, capturing an image or a video in which an action (more specifically, a jump) is caught is executed on the basis of a detection result of the action. The action detected in the present example is an action occurring in a series of states of a user (e.g., sliding during snowboarding), and the service control unit 112 executes apparatus control differently for a first section corresponding to a section in which the action has been detected and a second action in which no action has been 16 detected. More specifically, the service control unit executes apparatus control such that the captured video or image is recorded for the first section and no video or image is recorded for the second section. The service control unit, for example, executes apparatus control such that the captured video or image is specified and recorded for the first section.

In the illustrated example, first, the action detection unit 106 included in the sensor data analysis unit 104 detects takeoff of a jump (S301). When the takeoff has been detected, the service control unit 112 executes consecutive image capturing using an imaging device such as a digital video camera paired with a sensor device (S303). Not that the consecutive image capturing may be, for example, consecutive capturing of still images or videos. The image capturing is continued until the action detection unit 106 detects a landing of the jump (S305).

As a specific process, the action detection unit 106 executes, for example, the jump detection process illustrated in FIG. 2 or FIG. 6 in real time. The service control unit 112 continuously executes capturing of images of the action (the jump) and controls the imaging device such that an image or a video captured for a predetermined time (that is longer than duration of the jump) is buffered. When the action detection unit 106 has detected a jump section, the service control unit 112 controls the imaging device such that images or a video captured from the start of the jump section (the takeoff) to the end thereof (the landing) are recorded. When such control using buffering is executed, recording of the images or video can be started slightly earlier than the takeoff. Likewise, recording of the images or video may be continued slightly later than the landing.

Also in the following examples, the first section corresponding to a section in which the action detection unit 106 has detected an action does not necessarily coincide exactly with an action section, and may include, for example, an earlier part or a later part of the action section as in the above-described example, or may be a section deviated on a time axis while corresponding to the action section.

Figure 25:
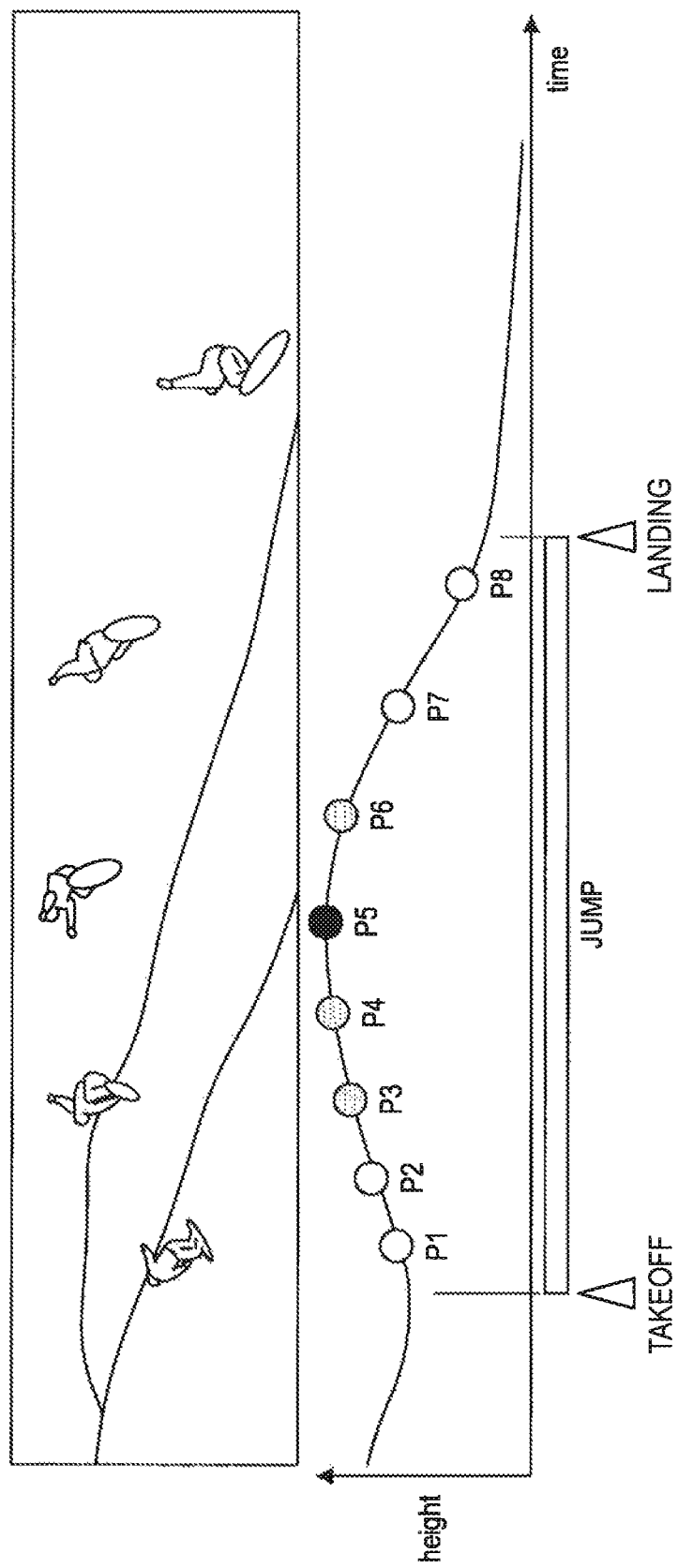
FIG. 25 is a diagram for further describing an image or a video captured in the first example of the apparatus control included in an embodiment of the present disclosure.

FIG. 25 is a diagram for further describing an image or a video captured in the first example of the apparatus control included in an embodiment of the present disclosure. In the illustrated example, still images P1 to P8 are captured during a time from takeoff to landing of a jump detected by the action detection unit 106. By compositing the above captured images, for example, such an illustrated sequential image can be obtained.

When height information of a user extracted from sensor data is available as an additional configuration, image capturing can be controlled on the basis of the height of the user during jumping. More specifically, the service control unit 112 may control an imaging device such that still images are captured at a peak of the height of the user (an apex of a jump). More specifically, the service control unit 112 may extract still images with a predetermined interval from frame images consecutively captured by the imaging device having an image (the still image P5) captured at the apex of the jump as a reference. Note that the height information can be extracted from, for example, barometric pressure detected by a barometric pressure sensor, information acquired by a Real Time Kinematic-Global Positioning System (RTK-GPS), or the like. When barometric pressure is used, an apex of a jump may be detected as a time point at which a height has a maximum value as described above or a time point at which barometric pressure starts rising.

(7-2. Second Example)

Figure 26:
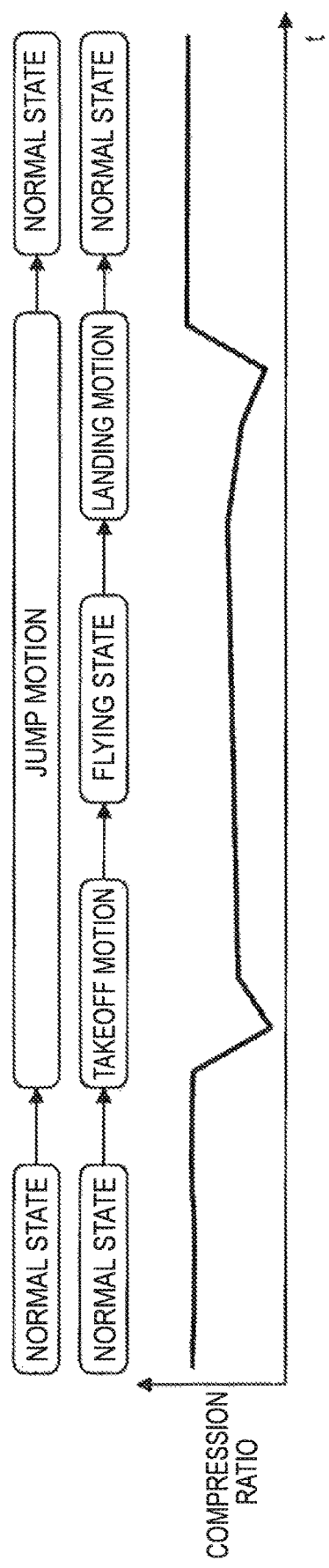
FIG. 26 is a diagram for describing a second example of the apparatus control included in an embodiment of the present disclosure.

FIG. 26 is a diagram for describing a second example of the apparatus control included in an embodiment of the present disclosure. In the illustrated example, a compression ratio of a video in which an action (more specifically, a jump) has been captured is controlled on the basis of a detection result of the action. The detected action of the present example is an action occurring in a series of states of a user (e.g., sliding during snowboarding), and the service control unit 112 executes apparatus control differently for a first section corresponding to a section in which the action has been detected and a second section in which no action has been detected.

In the illustrated example, when the action detection unit 106 has detected a jump section, the service control unit 112 controls an imaging device such as a digital video camera paired with a sensor device such that a video of that section (a jumping motion) is recorded at a different compression ratio from previous and successive sections thereof (a normal state). Accordingly, the video of the jumping motion is recorded at a lower compression ratio than that of the normal state. Since a low compression ratio is applied only to the jump section, image quality of the jump section that can be a highlight of the video can be improved while a data size of the entire video is suppressed. Furthermore, the service control unit 112 may set different compression ratios for a section of a takeoff motion and a landing motion included in the jump section and for a section of a flying state. In this case, the service control unit 112 may temporarily further reduce the compression ratio for the section of a takeoff motion and a landing motion as illustrated.

As a more specific process, the action detection unit 106 executes the jump detection process shown in FIG. 2 or FIG. 6, for example, in real time. The service control unit 112 controls the imaging device such that capturing of images of an action (a jump) is continuously executed and a video captured for a predetermined time (that is longer than duration of the jump) is buffered in a non-compressed state or a low-rate compressed state. When the action detection unit 106 has detected a jump section, the service control unit 112 controls the imaging device such that a video including a start point (takeoff) to an end point (landing) of the jump section is recorded at a low compression ratio and a video of the other sections (the normal state) is recorded at a high compression ratio. Further, the service control unit 112 may set a section having a predetermined length immediately after the start of the jump section to immediately before the end as a section of a takeoff motion and a landing motion, and may cause a video of the section to be recorded at a lower compression ratio. Alternatively, the action detection unit 106 may execute, for example, the high impact detection process shown in the FIG. 3, and a high impact section detected in the process may be treated as the section of the takeoff motion and the landing motion included in the jump section.

Figure 27:
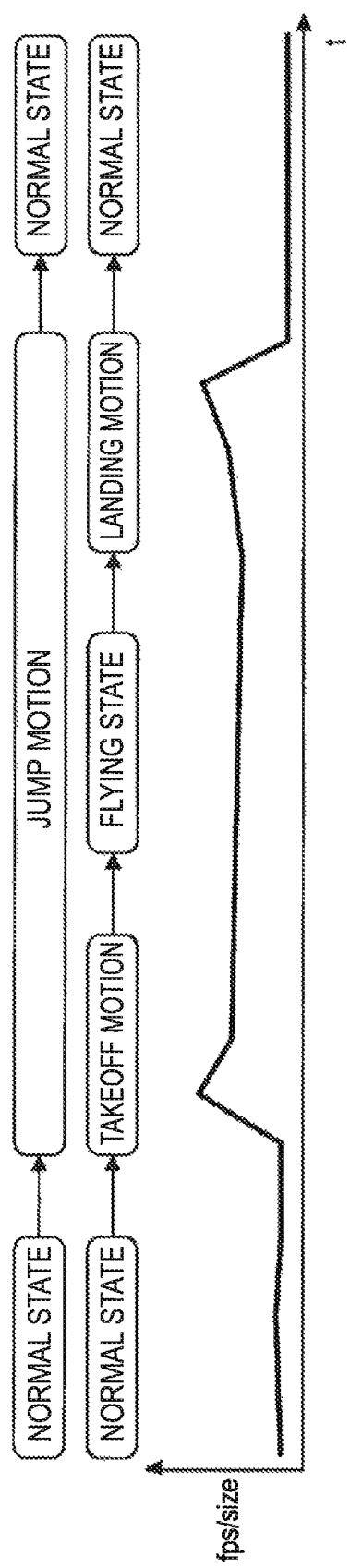
FIG. 27 is a diagram for describing a second example of the apparatus control included in an embodiment of the present disclosure.

FIG. 27 is also a diagram for describing the second example of the apparatus control included in one embodiment of the present disclosure. In the illustrated example, a frame rate or a size of a video in which an action (specifically, a jump) is captured is controlled on the basis of a detection result of the action.

In the illustrated example, when the action detection unit 106 has detected a jump section, the service control unit 112 controls an imaging device such as a digital video camera paired with a sensor device such that a video is recorded in the section (jump motion) at a different frame rate (fps) and with a different size from previous and successive sections (the normal state). During the jump motion, the video is recorded at a higher frame rate than the normal state and with a greater size than the normal state. By increasing the frame rate and the size only for the jump section as in the example shown in FIG. 26 described above, image quality of the jump section that can be a highlight of the video can be improved while a data size of the whole video is suppressed. Further, the service control unit 112 may set different frame rates and image sizes for a section of a takeoff motion and a landing motion included in the jump section and for a section of the flying state. In this case, the service control unit 112 may temporarily further increase the frame rate or the size for the section of the takeoff motion and the landing motion as illustrated.

As a more specific example, the action detection unit 106 executes the jump detection process shown in FIG. 2 or FIG. 6, for example, in real time. The service control unit 112 controls the imaging device such that capturing of images of an action (a jump) is continuously executed and a video captured for a predetermined time (that is longer than duration of a jump) is buffered at a maximum frame rate or with a maximum (original) size. When the action detection unit 106 has detected a jump section, the service control unit 112 controls the imaging device such that a video including a start point (takeoff) to an end point (landing) of the jump section is recorded at a high frame rate and/or with a large size and a video of the other sections (the normal state) is recorded at a low frame rate and/or with a small size. Further, the service control unit 112 may set a section having a predetermined length from immediately after the start of the jump section to immediately before the end as a section of a takeoff motion and a landing motion and may cause a video of the section to be recorded at a higher frame rate and/or with a larger size. Alternatively, the action detection unit 106 may execute, for example, the high impact detection process shown in the FIG. 3, and a high impact section detected in the process may be treated as a section of a takeoff motion and a landing motion included in the jump section.

As another example, the service control unit 112 may control a level of collection of sound included in a video in the same manner as the control of a compression ratio, a frame rate, and a size as described above. For example, the service control unit 112 may execute similar control over a turn section detected in the above-described turn detection process shown in FIG. 10 as well as over takeoff and landing sections included in a jump section or the jump section. Examples of detected action sections and control corresponding thereto are shown in Table 1 below.

TABLE 1

| | Compression ratio | Frame rate | Image size | Level of collection of sound |
|---|---|---|---|---|
| Jump | Low | High | Large | Unchanged |
| Turn | Low | High | Large | High |
| Head shake | High | Low | Small | Low |
| Takeoff/landing | Low | More Higher | Large | High |

In addition, as still another example, the service control unit 112 may control the quality of a video on the basis of an action score calculated by the scoring processing unit 109 included in the analysis result processing unit 107. More specifically, for example, the service control unit 112 may set a lower compression ratio, a higher frame rate, a larger image size, and/or a higher level of collection of sound for an action having a higher action score. At this time, for example, when an action score gradually changes within an action section, the quality of a video may be changed in accordance with the action score even within the action section. Alternatively, the quality of a video may be set to be constant within the same action section even in such a case.
(7-3. Third Example)

Figure 28:
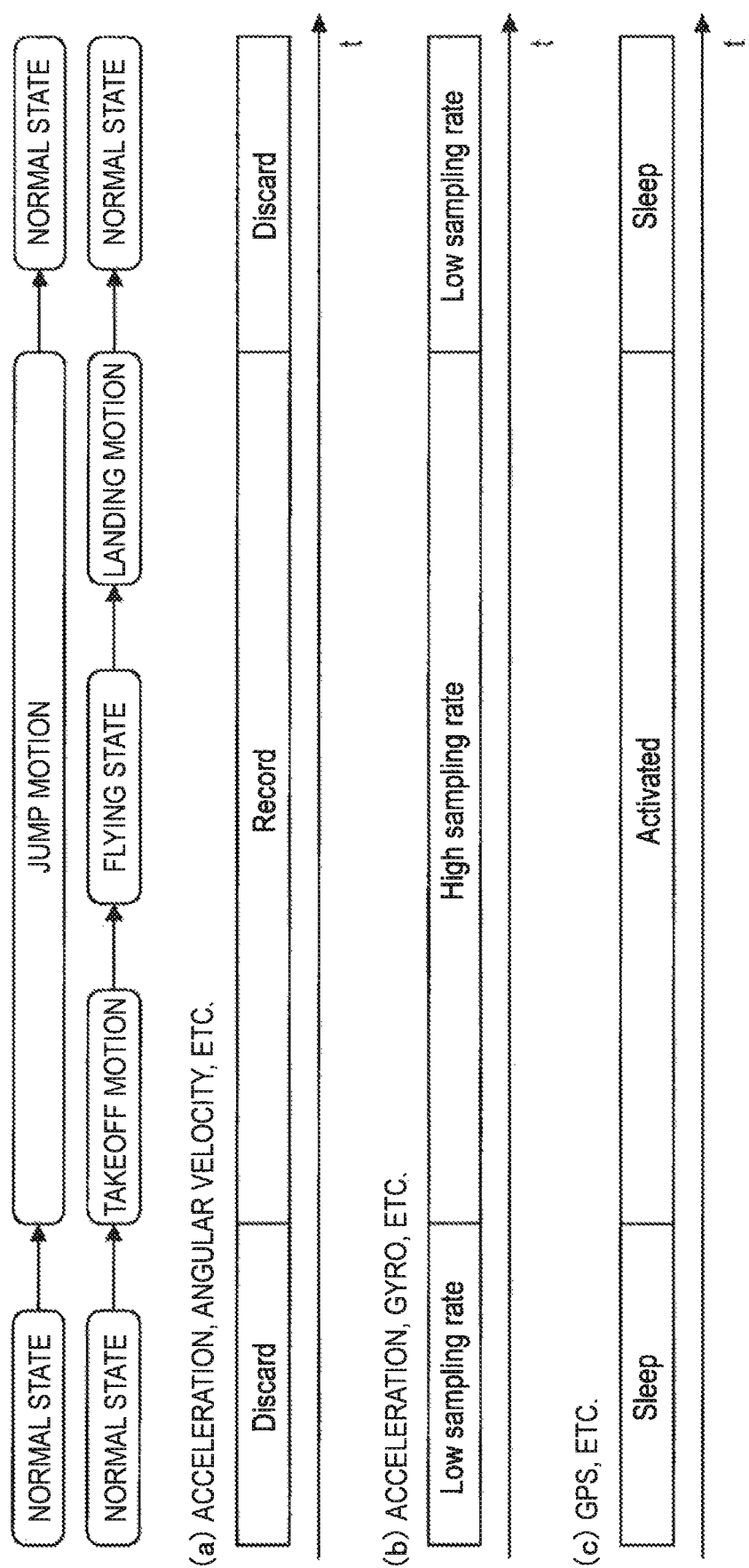
FIG. 28 is a diagram for describing a third example of the apparatus control included in an embodiment of the present disclosure.

FIG. 28 is a diagram for describing a third example of the apparatus control included in an embodiment of the present disclosure. In the illustrated example, a recording of sensor data or a sensor device itself is controlled on the basis of a detection result of an action (specifically, a jump). An action detected in the present example is an action occurring in a series of states of a user (e.g., sliding during snowboarding), and when the action detection unit 106 has detected a jump section, the sensor device control unit 103 controls the section (a jump motion) differently from previous and successive sections (the normal state) with respect to control of the sensor device or sensor data provided by the sensor device.

For example, as illustrated in (a), while the sensor device control unit 103 controls the sensor device such that data, such as acceleration and an angular velocity included in sensor data, is recorded along with an analysis result after analysis by the sensor data analysis unit 104 during a jump motion, and the data is discarded after the analysis in the normal state. Alternatively, as illustrated in (b), the sensor device control unit 103 may control the sensor device such that the data, such as acceleration and an angular velocity included in the sensor data, is recorded at a high sampling rate along with the analysis result after analysis by the sensor data analysis unit 104 during the jump motion, and the data is recorded at a low sampling rate in the normal state.

Further, in the above-described (a) or (b), the sensor device control unit 103 may cause the data to be recorded at different sampling rates for the flying state and for sections of a takeoff motion and a landing motion included in a jump section. More specifically, the sensor device control unit 103 may cause the data to be recorded at a higher sampling rate for the sections of a takeoff motion and a landing motion.

In the present embodiment, the acceleration data and the angular velocity included in the sensor data are used by the sensor data analysis unit 104 for analysis. For example by recording the sensor data along with an analysis result after analysis, a waveform can be displayed on the basis of the sensor data when an action image is reproduced or analysis can be executed again later. However, if many types of sensor data are recorded at a high sampling rate, for example, a size of sensor data increases. Thus, in the present example, the size of the sensor data is controlled by only recording sensor data that has a high possibility of being used in the display of information of re-analysis and is acquired in an action section (which is not limited to a jump section, and a turn section or other type of section is possible), or by lowering a sampling data of sensor data recorded in the action section or other type of section.

Further, as illustrated in (c), for example, the sensor device control unit 103 may control a sensor device such that a GPS receiver mounted on the sensor device is set to be in a sleep mode in the normal state and to be activated during a jump motion. Position information acquired while the GPS receiver is activated is, for example, provided to the analysis result processing unit 107 or the service control unit 112 via the sensor device control unit 103. Alternatively, the position information may be provided to the sensor data analysis unit 104 and stored in the detected section information holding unit 110 along with a detection result of the action section.

Note that, when the action detection unit 106 executes the jump detection process shown in FIG. 2 or FIG. 6, for example, a time at which a jump section is detected is later than landing of the jump. In such a case, the sensor device control unit 103 may transmit a control signal to the sensor device such that a sensor, such as a GPS receiver, is activated at the time at which the jump section is detected, and may transmit a control signal to the sensor device such that, after the sensor is activated for a predetermined time from the detection, more specifically, for example, for a time sufficient to acquire accurate position information, the sensor is set to be in the sleep mode again. In this case, the section in which the sensor is activated after the detection of the jump section is a section corresponding to a section in which an action is detected (the jump section and the section in which the sensor is activated do not necessarily overlap).

When, for example, the analysis result processing unit 107 generates additional information regarding an action (information regarding an action score or a cluster), there are many cases in which it is not necessary to precisely specify a position at which the action has occurred (e.g., to an extent that a trace of a user can be drawn for an action section) and the position may be specified to an extent that, for example, a facility at which the action has occurred can be specified. In such a case, even if a sensor is activated after the detection of the action, information sufficient to generate such information can be obtained.

In the present embodiment, although the position information is not necessarily used in the analysis of the sensor data analysis unit 104, it may be used in the generation of additional information by the analysis result processing unit 107 or the generation of information by the service control unit 112. Here, in the present embodiment, the analysis result processing unit 107 and the service control unit 112 generate information regarding an action section such as the jump section of the illustrated example as described above. Thus, for example, by activating a sensor of a sensor device which provides sensor data that does not directly contribute to detection of an action, such as position information, only for action sections, power consumption of the sensor device can be reduced. Note that control over the sensor data may be executed such that continuously provided sensor data is recorded only for an action section or a sampling rate is raised only for the action section when the sensor data is continuously recorded as in the example of (a) or (b) described above.

Note that a type of sensor data to be controlled in (a), (b), or (c) is not limited to the above-described examples, and control can be performed differently in accordance with a type of sensor data provided by the sensor data, a type of sensor data to be used when detecting an action, a type of sensor data to be used when generating additional information, and the like. There may be cases in which the above-described control in (c) is possible, for example, in regards to acceleration or an angular velocity. In addition, the data to be controlled can include all other types of sensor data, for example, barometric pressure, geomagnetism, and the like.

(7-4. Fourth Example)

Figure 29:
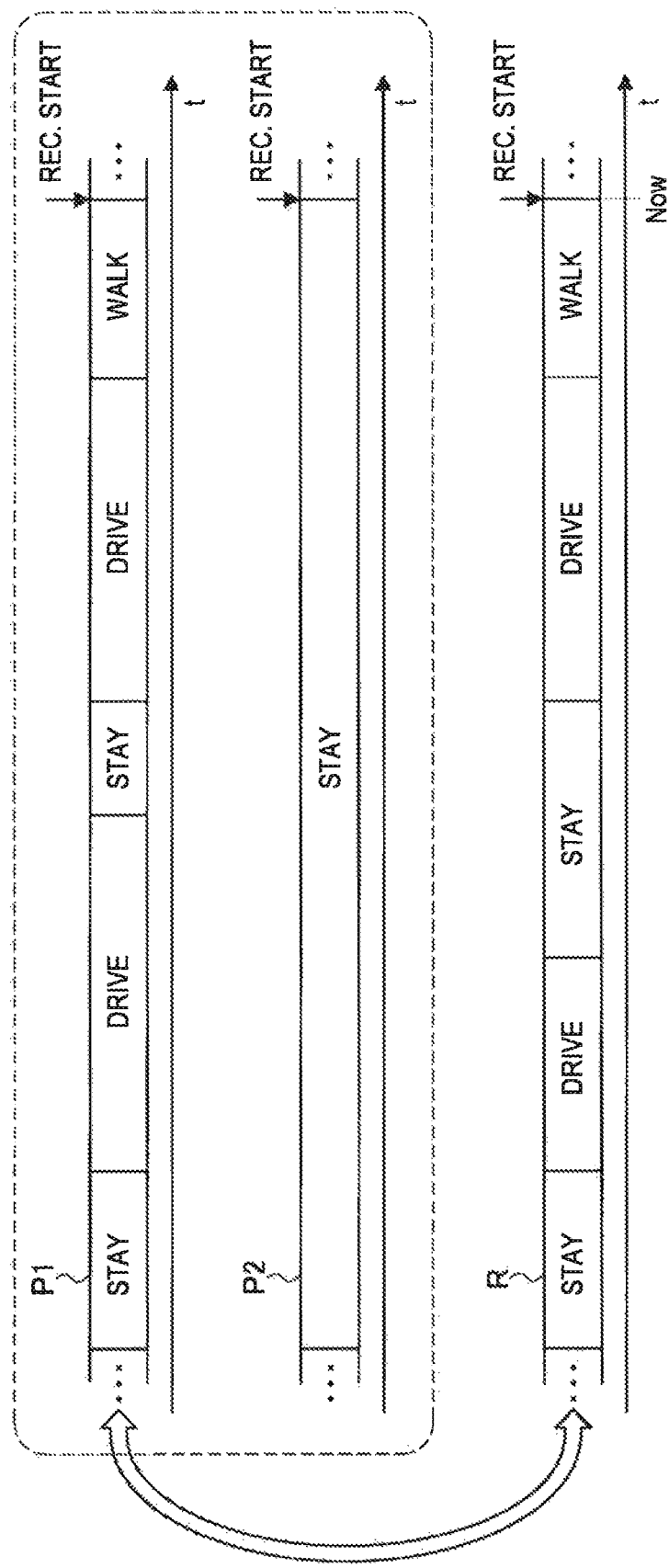
FIG. 29 is a diagram for describing a fourth example of the apparatus control included in an embodiment of the present disclosure.

FIG. 29 is a diagram for describing a fourth example of the apparatus control included in an embodiment of the present disclosure. In the illustrated example, appropriate apparatus control is realized by comparing the latest history of action detection to a past history thereof.

In the illustrated example, the action detection unit 106 included in the sensor data analysis unit 104 detects the latest action history R including staying still, driving, walking, and the like. Then, recording of a video performed by an imaging device such as a digital camera paired with the information processing device 100 starts at a current moment (Now). Here, the service control unit 112 searches for a past action history similar to the latest action history R from the detected section information holding unit 110. The search is executed using a condition that, for example, the past action history is an action history recorded before recording of a video is started and that walking is detected after a repetition of staying still and driving. Alternatively, a degree of similarity between the action histories may be calculated using an algorithm such as a Hidden Markov Model (HMM) and a k-Nearest Neighbors (k-NN) method. In addition, a range of determination of similarity may be widened by using not only an action detected as a result of the search but also sensor data, more specifically, position information, barometric pressure (height), and the like.

In the illustrated example, as a result of the search, a past action history P1 that is similar to the latest action history R is found. Thus, the service control unit 112 reads the setting of an imaging device when the video was recorded in the past action history P1 (setting information is stored in, for example, the detected section information holding unit 110 along with information of a detected action section), and applies a similar setting to an imaging device that has started recording of a video at a current moment (Now). More specifically, the service control unit 112 controls the imaging device in accordance with the read setting information. All the latest action history R and the past action history P1 can be, for example, action histories of outdoor hiking or the like. An appropriate setting of the imaging device in that case can be different from, for example, an appropriate setting when staying still has occurred in an indoor place, like when an illustrated past action history P2 occurred (in which staying still was a main action). In the present example, the service control unit 112 detects a difference in such settings in advance on the basis of action histories and automatically changes a setting of an imaging device, and thus a user can record a video with an appropriate setting from the beginning.

(7-5. Fifth Example)

Figure 30:
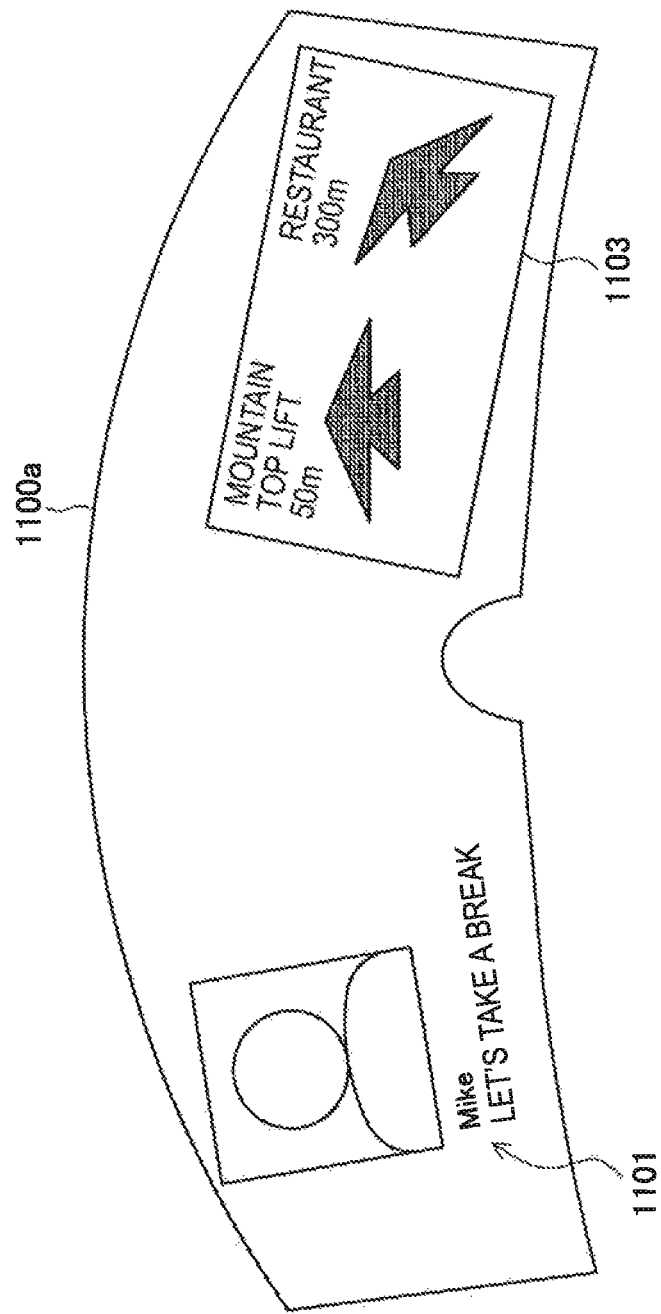
FIG. 30 is a diagram for describing a fifth example of the apparatus control included in an embodiment of the present disclosure.
Figure 31:
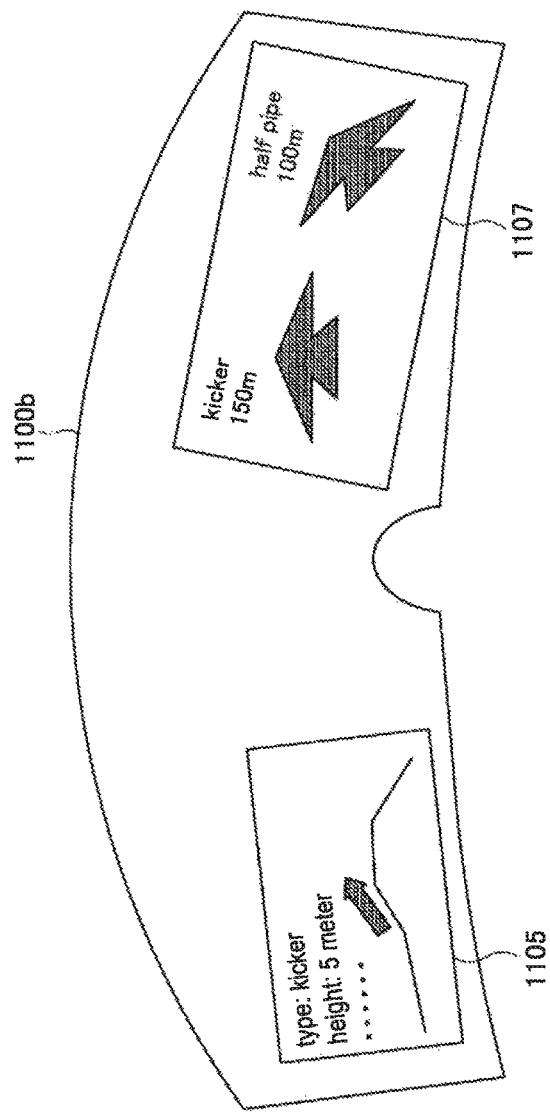
FIG. 31 is a diagram for describing a fifth example of the apparatus control included in an embodiment of the present disclosure.

FIGS. 30 and 31 are diagrams for describing a fifth example of the apparatus control included in an embodiment of the present disclosure. In the illustrated example, a display of images on a head-mounted display (HMD) mounted on a user who is snowboarding is controlled on the basis of an action detection result.

A communication window 1101 and a facility navigation 1103 are displayed on a screen 1100*a* of the HMD illustrated in FIG. 30. Images thereof are superimposed on an image of a real space visually perceived by the user on the screen 1100*a* in a transmissive manner. Meanwhile, a guide 1105 about a structure (a kicker in the illustrated example) on a course and a course navigation 1107 are displayed on a screen 1100*b* of the HMD illustrated in FIG. 31.

In the present example, the service control unit 112 causes the screens 1100*a* and 1100*b* to be selectively displayed on the HMD on the basis of, for example, a detection result of an action of the user by the action detection unit 106 included in the sensor data analysis unit 104. More specifically, for example, when the action detection unit 106 continuously detects a jump section or a turn section as described above, the service control unit 112 determines that the user is sliding (which is a situation requiring caution) while snowboarding and presents information, which relates to the situation of the sliding user, such as information that is on the screen 1100*b*. On the other hand, when the action detection unit 106 has detected no jump section or turn section for a predetermined period of time or longer, the service control unit 112 determines that the user is not sliding (the user is moving or taking a break) and presents information such as information that is on the image 1100*a*.

Information that can be provided on the screen 1100*a* is useful, for example, for the user, but the provision is not appropriate because it may distract attention of the user during sliding. The user may manually turn off the display of the HMD when he or she starts sliding; however, there is a possibility of the operation being annoying or the user forgetting to turn on the display after he or she finishes sliding. For this reason, it is useful to set information displayed on the HMD to be automatically switched as in the above-described example. The service control unit 112 may provide information for sliding during sliding as in the above-described example, or substantially turn off the display so that the HMD displays no image during sliding. In addition, the service control unit 112 may inform the user of information that is not provided during sliding due to the switching off of display of the HMD using sound or vibration.

As another example, the service control unit 112 may control the presentation of information by a variety of devices on the basis of a detection result of an action without being limited to an HMD. For example, when it is determined that a user is sliding on the basis of a detection result of an action, the service control unit 112 may suppress a sound-based or vibration-based incoming alert of a mobile phone of the user. Note that similar control can be performed not only when the user is sliding but also when the user is assumed to be concentrating on an action on the basis of a detection result of the action.

(7-6. Sixth Example)

Figure 32:
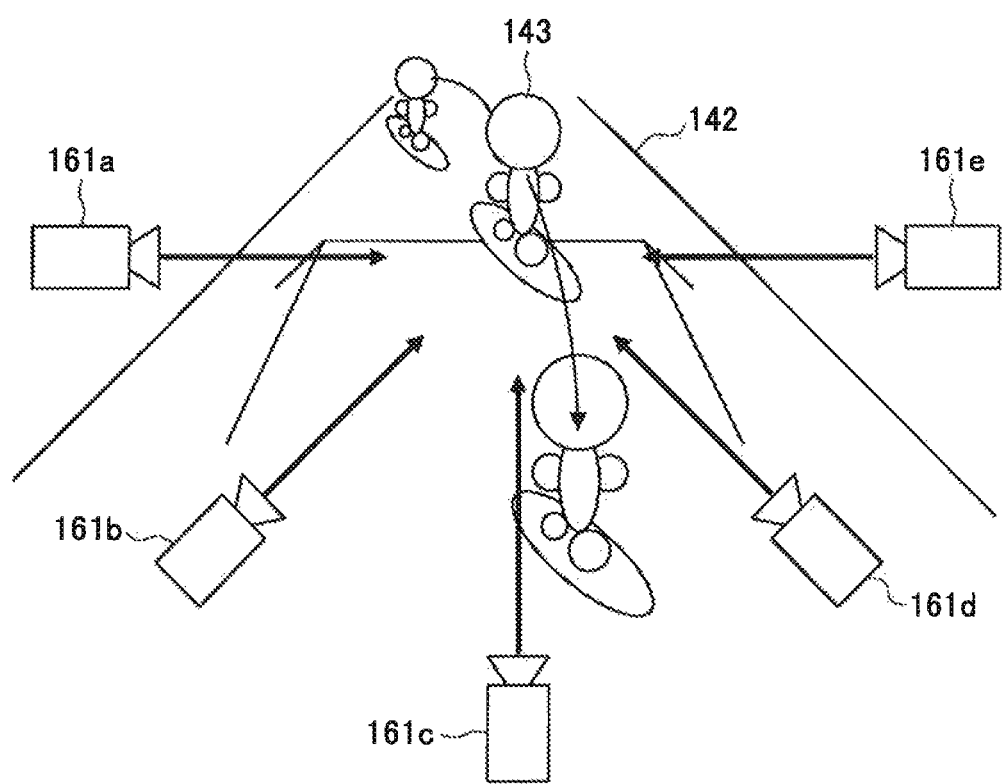
FIG. 32 is a diagram for describing a concept of a sixth example of the apparatus control included in an embodiment of the present disclosure.

FIG. 32 is a diagram for describing a concept of a sixth example of the apparatus control included in an embodiment of the present disclosure. Referring to FIG. 32, on a snowboarding course 142 (an example of a facility), cameras 161 installed in the facility acquire videos of a user 143 sliding during snowboarding. In the present example, the cameras 161 include a plurality of cameras 161*a* to 161*e*. The cameras 161*a* to 161*e* may include cameras installed at the facility or smartphones, digital cameras, and the like carried by the user, a friend of the user, and the like. If the videos acquired using the cameras are combined, a free viewpoint video of the user performing an action is obtained.

Figure 33:
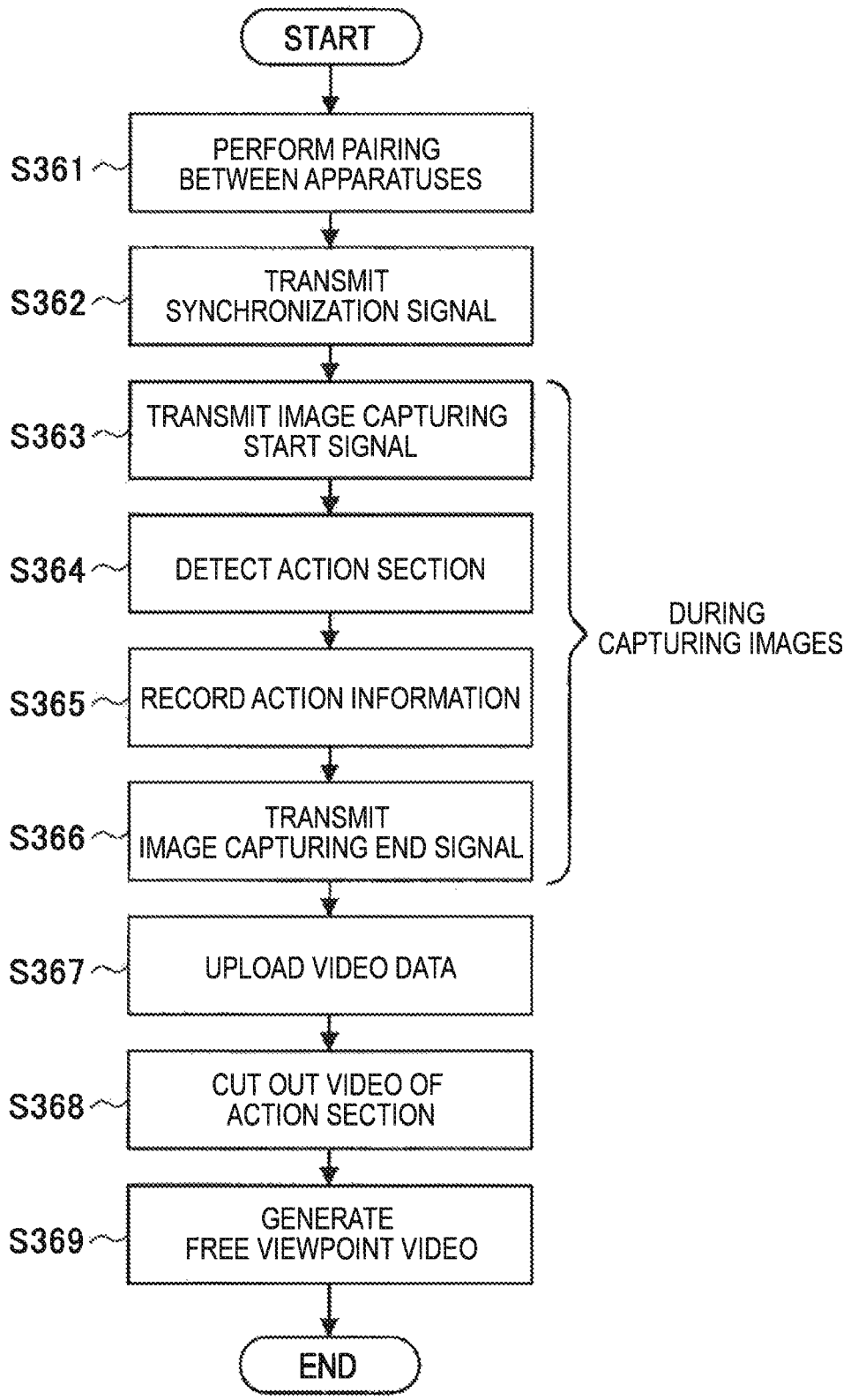
FIG. 33 is a flowchart showing a process of information output in a sixth example included in an embodiment of the present disclosure.

FIG. 33 is a flowchart showing a process of information output in a sixth example included in an embodiment of the present disclosure. In the illustrated example, first, the sensor device control unit 103 of the information processing device 100 performs pairing between apparatuses used as the cameras 161 shown in FIG. 32 (which are digital cameras, smartphones, and the like; these will also be referred to as camera devices below) and a sensor device (S361). The pairing is performed using a communication means of, for example, Bluetooth (registered trademark), a wireless LAN, or the like. Note that the camera device may be disposed to face a preset area in which an action will be performed at a time of pairing, or to face a preset area after the pairing until the action is executed.

After the pairing is completed, for example, the sensor device control unit 103 transmits a synchronization signal to each of the camera devices at a timing at which the sensor device is activated or the like (S362) to synchronize a time of the sensor device with that of the camera devices (a timestamp given to sensor data and video data). After the synchronization is completed, the sensor device control unit 103 transmits an image capturing start signal to each of the sensor devices (S363). The camera devices that have received the image capturing start signal start capturing images to acquire video data.

When the action detection unit 106 detects, for example, an action section using sensor data provided by the sensor device during capturing images (S364), action information is recorded in the detected section information holding unit 110 (S365). An end of the image capturing may be decided through, for example, a user operation, or the sensor device control unit 103 may automatically decide the end of the image capturing when no action section is detected for a predetermined period of time or longer, the sensor device is turned off, or the like. When the end of the image capturing is decided, the sensor device control unit transmits an image capturing end signal to each of the camera devices (S366). After the end of the image capturing, each of the camera devices uploads the acquired video data to the information processing device 100 (S367).

After the uploading of S367, the service control unit 112 of the information processing device 100 cuts out a video of a first section (e.g., which may include front and rear parts of the action section) corresponding to the action section in accordance with information of the action section detected by the action detection unit 106 (S368). Further, the service control unit 112 generates a free viewpoint video for the first section using the video data provided from each of the camera devices (S369). More specifically, for example, the service control unit 112 generates point cloud data from the video data provided from each of the camera devices. Note that there are many methods for providing the free viewpoint video other than the method using point cloud data, and the service control unit 112 may generate data for providing the free viewpoint video using any such method. A technology for providing a free viewpoint video is disclosed in, for example, JP 2007-133660A or the like.

FIG. 34 is a diagram for describing a user interface for viewing the free viewpoint video generated through the process shown in FIG. 33. In the illustrated example, a free viewpoint video 1630 is displayed on a display 149 of a terminal device 148 (a mobile device such as a tablet or a smartphone in the illustrated example). A user can change a viewpoint of the free viewpoint video with, for example, an operation input via a touch panel provided on the display 149, and cause the display 149 to display a video, for example, the illustrated videos 1630*a* to 1630*e*.

As a modification of the present example, three dimensional object data of an action section may be provided instead of or along with a free viewpoint video. In this case, a process of the service control unit 112 of the information processing device 100 performed until a video of the action section is cut out from a video provided from each of the camera devices is similar to S361 to S368 of the process shown in FIG. 33. The generation of the three dimensional object data is also similar to the generation of the free viewpoint video in that a three dimensional space including an object is subject to modeling. Thus, three dimensional object data can be generated on the basis of videos acquired by the plurality of above-described camera devices (the cameras 161 illustrated in FIG. 32), information of depths of the videos additionally measured by the camera devices, or the like.

When the three dimensional object data is provided, for example, three dimensional object data of a time designated by a user in an action section may be transmitted to a terminal device of the user without change. Alternatively, the three dimensional object data of the designated time may be output using a 3 dimensional printer, and an output object may be provided to the user (which may be distributed on the spot or delivered). For example, a free viewpoint video may be generated along with three dimensional object data, and a scene of an action section output as a three dimensional object may be selected while the free viewpoint video is presented to a user through the user interface illustrated in FIG. 34.

(7-7. Regarding User Profile)

In an embodiment of the present disclosure as described above, a user profile can be created using a type of action detected in the past. For example, a profile of a "high level jumper" can be given to a user for which a high action score was calculated without problem for his or her action of jumping. In addition, a profile of a "low level jumper" can be given to a user who got a low action score for his or her jumping or whose toppling was detected during jumping.

Processes of the apparatus control according to the present embodiment may differ using, for example, the above-described profiles. For example, a profile of a user may be reflected on a decision of a presence of a record or a recording method of sensor data in the example illustrated in FIG. 28. More specifically, when a user is a high level jumper, sensor data of a jump of a user who seldom topples over may be exactly recorded at a higher sampling rate. Since it is a matter of course that a high level jumper will succeed in jumping, if a rare failure is closely analyzed, it will be considered as support for further achievement. Conversely, when a user is a low level jumper, sensor data of a successful jump during which no toppling is detected may be exactly recorded at a higher sampling rate. The reason for this is that, by reviewing the successful jump, the low lever jumper has a chance to get a tip for succeeding at stable jumps.

(5. Hardware Configuration)

Next, with reference to FIG. 35, a hardware configuration of an information processing device according to an embodiment of the present disclosure is explained. FIG. 35 is a block diagram illustrating a hardware configuration example of an information processing device according to the embodiment of the present disclosure.

The information processing device 900 includes a central processing unit (CPU) 901, read only memory (ROM) 903, and random access memory (RAM) 905. In addition, the information processing device 900 may include a host bus 907, a bridge 909, an external bus 911, an interface 913, an input device 915, an output device 917, a storage device 919, a drive 921, a connection port 923, and a communication device 925. Moreover, the information processing device 900 may include an imaging device 933, and a sensor 935, as necessary. The information processing device 900 may include a processing circuit such as a digital signal processor (DSP), an application-specific integrated circuit (ASIC), or a field-programmable gate array (FPGA), alternatively or in addition to the CPU 901.

The CPU 901 serves as an arithmetic processing apparatus and a control apparatus, and controls the overall operation or a part of the operation of the information processing device 900 according to various programs recorded in the ROM 903, the RAM 905, the storage device 919, or a removable recording medium 927. The ROM 903 stores programs, operation parameters, and the like used by the CPU 901. The RAM 905 transiently stores programs used when the CPU 901 is executed, and various parameters that change as appropriate when executing such programs. The CPU 901, the ROM 903, and the RAM 905 are connected with each other via the host bus 907 configured from an internal bus such as a CPU bus or the like. The host bus 907 is connected to the external bus 911 such as a Peripheral Component Interconnect/Interface (PCI) bus via the bridge 909.

The input device 915 is a device operated by a user such as a mouse, a keyboard, a touch panel, a button, a switch, and a lever. The input device 915 may be a remote control device that uses, for example, infrared radiation and another type of radiowave. Alternatively, the input device 915 may be an external connection device 929 such as a mobile phone that corresponds to an operation of the information processing device 900. The input device 915 includes an input control circuit that generates input signals on the basis of information which is input by a user to output the generated input signals to the CPU 901. A user inputs various types of data to the information processing device 900 and instructs the information processing device 900 to perform a processing operation by operating the input device 915.

The output device 917 includes an apparatus that can report acquired information to a user visually, audibly, or haptically. The output device 917 may be, for example, a display device such as a liquid crystal display (LCD) or an organic electro-luminescence (EL) display, an audio output device such as a speaker or a headphone, or a vibrator. The output device 917 outputs a result obtained through a process performed by the information processing device 900, in the form of video such as text and an image, sounds such as voice and audio sounds, or vibration.

The storage device 919 is an apparatus for data storage that is an example of a storage unit of the information processing device 900. The storage device 919 includes, for example, a magnetic storage device such as a hard disk drive (HDD), a semiconductor storage device, an optical storage device, or a magneto-optical storage device. The storage device 919 stores therein the programs and various data executed by the CPU 901, various data acquired from an outside, and the like.

The drive 921 is a reader/writer for the removable recording medium 927 such as a magnetic disk, an optical disc, a magneto-optical disk, and a semiconductor memory, and built in or externally attached to the information processing device 900. The drive 921 reads out information recorded on the mounted removable recording medium 927, and outputs the information to the RAM 905. The drive 921 writes the record into the mounted removable recording medium 927.

The connection port 923 is a port used to connect devices to the information processing device 900. The connection port 923 may include a Universal Serial Bus (USB) port, an IEEE1394 port, and a Small Computer System Interface (SCSI) port. The connection port 923 may further include an RS-232C port, an optical audio terminal, a High-Definition Multimedia Interface (HDMI) (registered trademark) port, and so on. The connection of the external connection device 929 to the connection port 923 makes it possible to exchange various data between the information processing device 900 and the external connection device 929.

The communication device 925 is a communication interface including, for example, a communication device for connection to a communication network 931. The communication device 925 may be, for example, a communication card for a wired or wireless local area network (LAN), Bluetooth (registered trademark), a near field communication (NFC), or a wireless USB (WUSB). The communication device 925 may also be, for example, a router for optical communication, a router for asymmetric digital subscriber line (ADSL), or a modem for various types of communication. For example, the communication device 925 transmits and receives signals in the Internet or transits signals to and receives signals from another communication device by using a predetermined protocol such as TCP/IP. The communication network 931 to which the communication device 925 connects is a network established through wired or wireless connection. The communication network 931 may include, for example, the Internet, a home LAN, infrared communication, radio communication, or satellite communication.

The imaging device 933 is an apparatus that captures an image of a real space by using an image sensor such as a charge coupled device (CCD) and a complementary metal oxide semiconductor (CMOS), and various members such as a lens for controlling image formation of a subject image onto the image sensor, and generates the captured image. The imaging device 933 may capture a still image or a moving image.

The sensor 935 is various sensors such as an acceleration sensor, an angular velocity sensor, a geomagnetic sensor, an illuminance sensor, a temperature sensor, a barometric sensor, a pressure sensor, a distance sensor, and a sound sensor (microphone). The sensor 935 acquires information regarding a state of the information processing device 900 such as a posture of a housing of the information processing device 900, and information regarding an environment surrounding the information processing device 900 such as luminous intensity and noise around the information processing device 900. The sensor 935 may include a global navigation satellite system (GNSS) receiver that receives GNSS signals to measure latitude, longitude, and altitude of the apparatus.

The example of the hardware configuration of the information processing device 900 has been described. Each of the structural elements described above may be configured by using a general purpose component or may be configured by hardware specialized for the function of each of the structural elements. The configuration may be changed as necessary in accordance with the state of the art at the time of working of the present disclosure.

(6. Supplement)

The embodiments of the present disclosure may include, for example, the above-described information processing device, the above-described system, the information processing method executed by the information processing device or the system, a program for causing the information processing device to exhibits its function, and a non-transitory physical medium having the program stored therein.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1) An information processing device including:
an information acquisition unit configured to acquire action information of a user, and space information and time information that are associated with the action information; and
a map representation processing unit configured to consider the time information when executing map representation of the action information on a basis of the space information.

(2) The information processing device according to (1), in which the map representation processing unit considers a relationship between a time indicated by the time information and a reference time.

(3) The information processing device according to (2), in which the map representation processing unit reduces an influence of the action information on the map representation as a difference between the time indicated by the time information and the reference time increases.

(4) The information processing device according to (3),
in which the action information includes a score of each category defined when an action of the user is classified into one of a plurality of categories,
the map representation processing unit decides a category of a representative action associated with common space information in the map representation by giving a weight that decreases as the difference between the time indicated by the time information and the reference time increases, to the score included in action information associated with the common space information, and summing the scores.

(5) The information processing device according to (3), in which the map representation processing unit executes the map representation on a basis of the action information associated with time information indicating a time of which a difference from the reference time is smaller than a threshold value.

(6) The information processing device according to (2), in which, when the time information has a common attribute with the reference time, the map representation processing unit increases an influence of the action information on the map representation.

(7) The information processing device according to any one of (1) to (6),
in which the action information includes first action information associated with first time information and second action information associated with second time information, and
the map representation processing unit considers a temporal context of a time indicated by the first time information and a time indicated by the second time information when executing a map representation of at least one the first action information or the second action information.

(8) The information processing device according to (7),
in which the first action information is associated with first space information,
the second action information is associated with second space information that is different from the first space information, and,
in the map representation, the map representation processing unit expresses a movement from a position indicated by the first space information to a position indicated by the second space information when the second time information indicates a time that is later than the first time information.

(9) The information processing device according to any one of (1) to (8),
in which the action information includes information related to an action score for evaluating an action, and
the map representation processing unit further considers the information related to the action score when executing the map representation.

(10) The information processing device according to (9),
in which the action information includes information related to a skill level of the user estimated on a basis of the score, and
the map representation processing unit further considers information related to the skill level when executing the map representation.

(11) The information processing device according to (10),
in which the action information includes information related to a score indicating a negative evaluation on an action of the user, and
the map representation processing unit corrects the score indicating the negative evaluation to be higher as the skill level increases.

(12) The information processing device according to (10) or (11), in which the action information includes information related to a score indicating a positive evaluation on an action of the user, and the map representation processing unit corrects the score indicating the positive evaluation to be lower as the skill level increases.

(13) The information processing device according to any one of (10) to (12), in which the map representation processing unit specifies a facility at which an action indicated by the action information is executed on a basis of the space information, and generates information including an evaluation of each facility in accordance with the skill level of the user.

(14) The information processing device according to any one of (1) to (13), in which the map representation processing unit estimates, on a basis of a distance between a position indicated by first space information associated with the action information and a position indicated by second space information that is not associated with the action information, action information associated with the second space information.

(15) The information processing device according to any one of (1) to (14),
   in which the action information includes a first action information series associated with a first series of the space information and a second action information series associated with a second series of the space information, and the second action information series is associated with time information indicating a time that is earlier than the first action information series, and
   when a first traveling route indicated by the first series of the space information partially coincides with a second traveling route indicated by the second series of the space information, the map representation processing unit provides navigation to a user associated with the first action information series on a basis of the second action information series associated with the second series of the space information indicating the remaining part of the second traveling route.

(16) The information processing device according to any one of (1) to (15),
   in which the action information includes information indicating a detected action of the user, and
   the map representation processing unit adjusts a setting for detecting an action of the user on a basis of a tendency of the detected action at each position indicated by the space information indicated by a result of the map representation.

(17) An information processing method including:
   acquiring action information of a user, and space information and time information that are associated with the action information; and
   considering, by a processor, the time information when executing map representation of the action information on a basis of the space information.

(18) A program causing a computer to achieve:
   a function of acquiring action information of a user, and space information and time information that are associated with the action information; and
   a function of considering the time information when executing map representation of the action information on a basis of the space information.

Additionally, the present technology may also be configured as below.

(1) An information processing device including:
   a sensor data reception unit configured to receive sensor data provided by a sensor that is mounted on a user or a piece of equipment used by the user,
   an action detection unit configured to detect an action of the user on the basis of the sensor data; and
   an apparatus control unit configured to control an apparatus related with the user or the action in accordance with the detected action.

(2) The information processing device according to (1), in which the action detection unit detects the action occurring in a series of states of the user.

(3) The information processing device according to (2), in which the apparatus control unit executes control over the apparatus differently for a first section corresponding to a section in which the action has been detected and a second section in which no action has been detected in the series of states.

(4) The information processing device according to (3),
   in which the apparatus has a function of recording a video or an image of the action, and
   the apparatus control unit controls the apparatus such that the video or the image is specified in the first section.

(5) The information processing device according to (4),
   in which the sensor data includes data indicating a height of the user,
   the action includes a jump, and
   the apparatus control unit controls the apparatus such that the image is recorded at least at a peak of the height of the user in the first section in which the jump has been detected.

(6) The information processing device according to (3),
   in which the apparatus has a function of recording a video or an image of the action, and
   the apparatus control unit controls the apparatus such that the video or the image is recorded to have a first quality for the first section and recorded to have a second quality that is lower than the first quality for the second section.

(7) The information processing device according to (6),
   in which the first quality includes a first compression ratio, a first frame rate, a first frame size, or a first level of collection of sound, and
   the second quality includes a second compression ratio that is higher than the first compression ratio, a second frame rate that is lower than the first frame rate, a second frame size that is smaller than the first frame size, or a second level of collection of sound that is lower than the first level of collection of sound.

(8) The information processing device according to any one of (3) to (7),
   in which the apparatus has a function of recording the sensor data, and
   the apparatus control unit controls the apparatus such that the sensor data is recorded for the first section.

(9) The information processing device according to any one of (3) to (7),
   in which the apparatus has a function of recording the sensor data, and
   the apparatus control unit controls the apparatus such that the sensor data is recorded at a first sampling rate for the first section, and the sensor data is recorded at a second sampling rate that is lower than the first sampling rate for the second section.

(10) The information processing device according to any one of (3) to (9),
   in which the apparatus has a function of providing additional sensor data to be used for generating information regarding the action, and
   the apparatus control unit controls the apparatus such that the additional sensor data is provided for the first section.

(11) The information processing device according to any one of (1) to (10), in which the apparatus control unit controls the apparatus in accordance with a history of the detected action.

(12) The information processing device according to (11), in which the apparatus control unit compares a latest history of the action detected until the apparatus is newly activated to a past history of the action detected until the apparatus was activated in the past, and a setting of the apparatus corresponding to the past history similar to the latest history is also applied to the newly activated apparatus.

(13) The information processing device according to any one of (1) to (12),
in which the apparatus has a function of presenting information to the user,
the action includes an action of a specific type occurring in a situation requiring caution from the user,
the apparatus control unit controls the apparatus such that, when the action of the specific type is detected, content or a presentation method of the information is changed.

(14) The information processing device according to (13), in which the apparatus control unit controls the apparatus such that the content of the information is changed to relate to the situation.

(15) The information processing device according to (13), in which the apparatus control unit controls the apparatus such that information presented using an image is not presented or is presented using a sound or vibration.

(16) The information processing device according to any one of (1) to (15),
in which the apparatus has a function of processing the video or the image of the action, and
the apparatus control unit controls the apparatus such that the video or the image is processed for an action corresponding to a section in which the action is detected.

(17) The information processing device according to (16), in which the processing of the video or the image by the apparatus includes generation of data for providing a free viewpoint video, a free viewpoint image, or three-dimensional object data on the basis of the video or the image.

(18) An information processing method including:
receiving sensor data provided by a sensor mounted on a user or a piece of equipment used by the user,
detecting an action of the user on the basis of the sensor data; and
controlling, by a processor, an apparatus related to the user or the action in accordance with the detected action.

(19) A program causing a computer to realize:
a function of receiving sensor data provided by a sensor mounted on a user or a piece of equipment used by the user;
a function of detecting an action of the user on the basis of the sensor data; and
a function of controlling an apparatus related to the user or the action in accordance with the detected action.

REFERENCE SIGNS LIST 100 information processing device
101 transmission unit
102 reception unit
103 sensor device control unit
104 sensor data analysis unit
105 feature amount extraction unit
106 action detection unit
107 analysis result processing unit
108 clustering processing unit
109 scoring processing unit
112 service control unit

The invention claimed is:

1. An information processing device comprising:
an information acquisition unit configured to acquire
action information of a user including a score of each category into which an action of the user is classified from among a plurality of categories, and
space information and time information that are associated with the action information; and
a map representation processing unit configured to initiate display of a map representation of the action information within the associated space information,
wherein the map representation of the action information includes an indication of a category of each representative action associated with common space information,
wherein the map representation processing unit decides the category of each representative action based on a plurality of scores acquired within the associated common space information during a time period of the associated time information,
wherein the map representation processing unit decides the category of each representative action associated with the common space information based on a relationship between a time indicated by the associated time information and a reference time,
wherein the map representation processing unit decides the category of each representative action associated with the common space information by reducing an influence of the action information on the representative action indicated in the map representation as a difference between the time indicated by the associated time information and the reference time increases,
wherein the map representation processing unit decides the category of each representative action associated with the common space information in the map representation by giving a weight that decreases as the difference between the time indicated by the time information and the reference time increases, to each score of the plurality of scores included in action information associated with the common space information, and summing the weighted scores, and
wherein the information acquisition unit and the map representation processing unit are each implemented via at least one processor.

2. The information processing device according to claim 1,
wherein the action information includes information related to an action score for evaluating an action, and
the map representation processing unit further initiates display of the information related to the action score when executing the map representation.

3. The information processing device according to claim 2,
wherein the action information includes information related to a skill level of the user estimated on a basis of the action score, and
the map representation processing unit further initiates display of information related to the skill level when executing the map representation.

4. The information processing device according to claim 3,
wherein the action information includes information indicating a negative evaluation on an action score of the user, and the map representation processing unit corrects the action score based on the information indicating the negative evaluation by a correction amount that is higher as the skill level increases.

5. The information processing device according to claim 3, wherein the action information includes information indicating a positive evaluation on an action of the user, and the map representation processing unit corrects the action score based on the information indicating the positive evaluation by a correction amount that is lower as the skill level increases.

6. The information processing device according to claim 3, wherein the map representation processing unit specifies a facility at which the action indicated by the action information is executed on a basis of the space information, and generates information including an evaluation of each facility in accordance with the skill level of the user.

7. The information processing device according to claim 1, wherein the action information includes first action information associated with first time information and second action information associated with second time information, and the map representation processing unit initiates display indicating a temporal context of a time indicated by the first time information and a time indicated by the second time information when executing a map representation of at least one the first action information or the second action information.

8. The information processing device according to claim 7, wherein the first action information is associated with first space information,
the second action information is associated with second space information that is different from the first space information, and,
in the map representation, the map representation processing unit initiates the display indicating the temporal context by expressing a movement from a position indicated by the first space information to a position indicated by the second space information when the second time information indicates a time that is later than the first time information.

9. The information processing device according to claim 1, wherein the map representation processing unit initiates the display of the map representation on a basis of the action information associated with time information indicating a time of which a difference from the reference time is smaller than a threshold value.

10. The information processing device according to claim 1, wherein, when the associated time information has a common attribute with the reference time, the map representation processing unit increases an influence of the action information on the decision of the category of each representative action indicated in the map representation.

11. The information processing device according to claim 1, wherein the action information includes first action information associated with first time information and second action information associated with second time information, and
the map representation processing unit estimates, on a basis of a distance between a position indicated by first space information associated with the first action information and a position indicated by second space information that is not associated with the first action information, the second action information associated with the second space information.

12. The information processing device according to claim 1, wherein the action information includes a first action information series associated with a first series of the space information and a second action information series associated with a second series of the space information, and the second action information series is associated with time information indicating a time that is earlier than the first action information series, and
when a first traveling route indicated by the first series of the space information partially coincides with a second traveling route indicated by the second series of the space information, the map representation processing unit provides navigation to a user associated with the first action information series on a basis of the second action information series associated with the second series of the space information indicating a remaining part of the second traveling route.

13. The information processing device according to claim 1, wherein the action information includes information indicating a detected action of the user in real-time, and
the map representation processing unit adjusts a setting for detecting the action of the user on a basis of a probability of the detected action occurring at each position indicated by the space information indicated by a result of the map representation.

14. The information processing device according to claim 1, wherein the indication of the category of each representative action comprises a visual pattern.

15. An information processing method, executed by at least one processor, the method comprising:
acquiring, by the at least one processor,
action information of a user including a score of each category into which an action of the user is classified from among a plurality of categories, and
space information and time information that are associated with the action information; and
initiating display, by the at least one processor, of a map representation of the action information within the associated space information,
wherein the map representation of the action information includes an indication of a category of each representative action associated with common space information,
wherein the category of each representative action is decided based on a plurality of scores acquired within the associated common space information during a time period of the associated time information,
wherein the category of each representative action associated with the common space information is decided based on a relationship between a time indicated by the associated time information and a reference time,
wherein the category of each representative action associated with the common space information is decided by reducing an influence of the action information on the representative action indicated in the map representation as a difference between the time indicated by the associated time information and the reference time increases, and
wherein the category of each representative action associated with the common space information in the map representation is decided by giving a weight that decreases as the difference between the time indicated by the time information and the reference time increases, to each score of the plurality of scores included in action information associated with the common space information, and summing the weighted scores.

16. A non-transitory computer-readable medium having embodied thereon a program, which when executed by a computer causes the computer to execute a method, the method comprising:

acquiring
- action information of a user including a score of each category into which an action of the user is classified from among a plurality of categories, and
- space information and time information that are associated with the action information; and initiating display of a map representation of the action information within the associated space information, wherein the map representation of the action information includes an indication of a category of each representative action associated with common space information, wherein the category of each representative action is decided based on a plurality of scores acquired within the associated common space information during a time period of the time information when executing map representation of the action information on a basis of the space information, wherein the category of each representative action associated with the common space information is decided based on a relationship between a time indicated by the associated time information and a reference time, wherein the category of each representative action associated with the common space information is decided by reducing an influence of the action information on the representative action indicated in the map representation as a difference between the time indicated by the associated time information and the reference time increases, and wherein the category of each representative action associated with the common space information in the map representation is decided by giving a weight that decreases as the difference between the time indicated by the time information and the reference time increases, to each score of the plurality of scores included in action information associated with the common space information, and summing the weighted scores.

* * * * *